(12) United States Patent
Li et al.

(10) Patent No.: US 9,713,188 B2
(45) Date of Patent: Jul. 18, 2017

(54) SERVICE DATA TRANSMISSION METHOD AND SYSTEM, AND DEVICE

(71) Applicant: Huawei Technologies Co., Ltd., Shenzhen (CN)

(72) Inventors: Zhiming Li, Shanghai (CN); Shuhui Hu, Shenzhen (CN); Jixing Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 138 days.

(21) Appl. No.: 14/670,047

(22) Filed: Mar. 26, 2015

(65) Prior Publication Data

US 2015/0201447 A1 Jul. 16, 2015

Related U.S. Application Data

(63) Continuation of application No. PCT/CN2013/082980, filed on Sep. 5, 2013.

(30) Foreign Application Priority Data

Sep. 27, 2012 (CN) .......................... 2012 1 0374582

(51) Int. Cl.
*H04W 76/02* (2009.01)
*H04W 36/00* (2009.01)
(Continued)

(52) U.S. Cl.
CPC ..... *H04W 76/026* (2013.01); *H04W 28/0263* (2013.01); *H04W 36/0066* (2013.01); *H04W 88/06* (2013.01)

(58) Field of Classification Search
CPC ............. H04W 36/0066; H04W 88/06; H04W 76/026; H04W 28/0263; H04W 76/02;
(Continued)

(56) References Cited

U.S. PATENT DOCUMENTS 7,301,838 B2* 11/2007 Waller ................... G11C 7/065
365/154
8,064,395 B2* 11/2011 Gasparroni ............. H04L 45/24
370/329
(Continued)

FOREIGN PATENT DOCUMENTS

CN 101784044 A 7/2010
CN 101888678 A 11/2010
(Continued)

OTHER PUBLICATIONS

"3rd Generation Partnership Project; Technical Specification Group Services and System Aspects; Quality of Service (QoS) concept and architecture (Release 11)," 3GPP TS 23.107, V11.0.0, Jun. 2012, 42 pages.

(Continued)

*Primary Examiner* — Meless Zewdu
(74) *Attorney, Agent, or Firm* — Slater Matsil, LLP

(57) ABSTRACT

Embodiments of the present invention disclose a service data transmission method. An AN entity of a first network sends a first request message to an AN entity of a second network corresponding to a target cell in which a UE is located, so as to request the AN entity of the second network to establish a radio bearer for the UE. The AN entity of the first network sends a second request message to the UE, so as to request the UE to establish the radio bearer with the AN entity of the second network. After the AN entity of the second network has established the radio bearer with the UE, the AN entity of the first network transmits service data to the UE by using the AN entity of the second network.

20 Claims, 18 Drawing Sheets

(51) Int. Cl.
*H04W 28/02* (2009.01)
*H04W 88/06* (2009.01)

(58) Field of Classification Search
CPC ..... H04W 28/02; H04W 36/00; H04W 8/085; H04W 8/087; H04W 8/14; H04W 88/00; H04W 88/10; H04W 92/00; H04W 92/02; H04W 92/16; H04W 92/20; H04W 36/14; H04W 36/38; H04W 28/00; H04W 28/0226; H04W 28/0257; H04W 28/0268; H04W 28/0273; H04W 52/286; H04W 88/02; H04W 36/0072; H04W 36/0077
See application file for complete search history.

(56) References Cited

U.S. PATENT DOCUMENTS

| | | | | |
|---|---|---|---|---|
| 8,447,349 B2* | 5/2013 | McCann | ............ | H04W 36/0016 455/552.1 |
| 8,885,612 B2* | 11/2014 | Aramoto | ............... | H04W 36/26 370/332 |
| 8,982,836 B2* | 3/2015 | Zhao | ................ | H04W 36/0011 370/331 |
| 2001/0036823 A1* | 11/2001 | Van Lieshout | ....... | H04W 36/10 455/418 |
| 2007/0025301 A1* | 2/2007 | Petersson | ................ | H04L 47/10 370/338 |
| 2009/0016344 A1* | 1/2009 | Hu | .......................... | H04L 47/41 370/389 |
| 2009/0103454 A1* | 4/2009 | Watanabe | ........... | H04L 12/5695 370/254 |
| 2011/0090794 A1* | 4/2011 | Cherian | ................... | H04L 45/38 370/235 |
| 2011/0310851 A1* | 12/2011 | Klingenbrunn | ..... | H04W 76/041 370/332 |
| 2012/0069797 A1* | 3/2012 | Lim | ...................... | H04W 28/18 370/328 |
| 2012/0092992 A1* | 4/2012 | Pappas | ................ | H04L 47/2491 370/235 |
| 2012/0188980 A1* | 7/2012 | Wang | ................ | H04W 36/0033 370/331 |
| 2012/0218897 A1* | 8/2012 | Aramoto | ........... | H04W 36/0027 370/235 |
| 2013/0094471 A1* | 4/2013 | Zhao | ................. | H04W 36/0011 370/331 |
| 2014/0079007 A1 | 3/2014 | Li et al. | | |

FOREIGN PATENT DOCUMENTS

| | | |
|---|---|---|
| CN | 102215530 A | 10/2011 |
| TW | 201228421 A | 7/2012 |
| WO | 2012068304 A1 | 5/2012 |

OTHER PUBLICATIONS

"3rd Generation Partnership Project; Technical Specification Group Services and System Aspects; Policy and charging control architecture (Release 11)," 3GPP TS 23.203, V11.7.0, Sep. 2012, 178 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401, V11.3.0, Sep. 2012, 283 pages.

"3rd Generation Partnership Project; Technical Specification Group Core Network and Terminals; Mobile radio interface signalling layer 3; General aspects (Release 11)," 3GPP TS 24.007, V11.0.0, Jun. 2012, 149 pages.

"3rd Generation Partnership Project; Technical Specification Group Core Network and Terminals; Mobile radio interface Layer 3 specification; Core network protocols; Stage 3 (Release 11)," 3GPP TS 24.008, V11.4.0, Sep. 2012, 672 pages.

"3rd Generation Partnership Project; Technical Specification Group Core Network and Terminals; Non-Access-Stratum (NAS) protocol for Evolved Packet System (EPS); Stage 3 (Release 11)," 3GPP TS 24.301, V11.4.0, Sep. 2012, 341 pages.

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.1.0, Sep. 2012, 325 pages.

"3rd Generation Partnership Project; Technical Specification Group Radio Access Network; Evolved Universal Terrestrial Radio Access Network (E-UTRAN); S1 Application Protocol (S1AP) (Release 11)," 3GPP TS 36.413, V11.1.0, Sep. 2012, 262 pages.

"Interoperability Specification (IOS) for High Rate Packet Data (HRPD) Radio Access Network Interfaces with Session Control in the Access Network," 3rd Generation Partnership Project 2 ("3GPP2"), 3GPP2 A.S0008-C, Version 4.0, Apr. 2011, 708 pages.

"Interoperability Specification (IOS) for cdma2000 Access Network Interfaces—Part 2 Transport (3G-IOS v5.0.3)," 3rd Generation Partnership Project 2 ("3GPP2"), 3GPP2 A.S0012-C, Version 4.0, Aug. 2012, 74 pages.

"Interoperability Specification (IOS) for Femtocell Access Points," 3rd Generation Partnership Project 2 ("3GPP2"), 3GPP2 A.S0024-0, Version 1.0, Mar. 2010, 64 pages.

"cdma2000 High Rate Packet Data Air Interface Specification," 3rd Generation Partnership Project 2 ("3GPP2"), 3GPP2 C.S0024-A, Version 3.0, Sep. 2006, 1164 pages.

"E-UTRAN—eHRPD Connectivity and Interworking: Core Network Aspects," 3rd Generation Partnership Project 2 ("3GPP2"), 3GPP2 X.50057-A, Version 1.0, Apr. 2011, 269 pages.

\* cited by examiner

An AN entity of a first network sends a first request message to an AN entity of a second network corresponding to a target cell in which a UE is located, so as to request the AN entity of the second network to establish a radio bearer for the UE, where the first request message includes an identifier of the UE and a QoS parameter of the radio bearer — 101

The AN entity of the first network sends a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network — 102

After the AN entity of the second network has established the radio bearer with the UE, the AN entity of the first network transmits service data to the UE by using the AN entity of the second network, where the service data is data corresponding to a service identified by the TFT information — 103

FIG. 1

An AN entity of a first network sends a first request message to an AN entity of a second network corresponding to a target cell in which a UE is located, so as to request the AN entity of the second network to establish a radio bearer for the UE, where the first request message includes an identifier of the UE and a QoS parameter of the radio bearer — 201

The AN entity of the first network sends a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network — 202

The AN entity of the first network sends service data to the AN entity of the second network, to enable the AN entity of the second network to send the service data to the UE — 203

FIG. 2

SERVICE DATA TRANSMISSION METHOD AND SYSTEM, AND DEVICE

This application is a continuation of International Application No. PCT/CN2013/082980, filed on Sep. 5, 2013, which claims priority to Chinese Patent Application No. 201210374582.0, filed on Sep. 27, 2012, both of which are hereby incorporated by reference in their entireties.

TECHNICAL FIELD

The present invention relates to the communications field, and in particular, to a service data transmission method and system, and a device.

BACKGROUND

To meet challenges of wireless broadband technologies and maintain leading advantages of The 3rd Generation Partnership Project (3GPP) networks, 3GPP has developed Long Term Evolution (LTE) networks on the basis of the 3GPP networks. Currently, 3GPP and The 3rd Generation Partnership Project 2 (3GPP2) have defined an interconnection standard between an LTE network and an evolved high rate packet data (eHRPD) network of Code Division Multiple Access (CDMA). The architecture of the standard supports access of a user equipment (UE) to an Evolved Packet Core network (EPC) of an LTE network by using an eHRPD network, and supports a handover of the UE between an LTE network system and an eHRPD network system.

However, in the current interconnection architecture for an LTE network and an eHRPD network, a UE can only transmit service data in one network at one moment.

SUMMARY

Embodiments of the present invention provide a service data transmission method and system, and a device, so as to implement that a UE transmits service data in an LTE network and an eHRPD network at the same time.

A first aspect of the present invention provides a service data transmission method. An access network (AN) entity of a first network sends a first request message to an AN entity of a second network corresponding to a target cell in which a UE is located, so as to request the AN entity of the second network to establish a radio bearer for the UE. The first request message includes an identifier of the UE and a QoS parameter of the radio bearer. The AN entity of the first network sends a second request message to the UE, so as to request the UE to establish the radio bearer with the AN entity of the second network. The second request message includes at least one of the following: an identifier of the radio bearer, the quality of service (QoS) parameter of the radio bearer, Traffic Flow Template (TFT) information, an indication message, and information about the target cell. The indication message is used for indicating that the radio bearer is to be established in the second network. After the AN entity of the second network has established the radio bearer with the UE, the AN entity of the first network transmits service data to the UE by using the AN entity of the second network. The service data is data corresponding to a service identified by the TFT information.

In a first possible implementation manner, the transmitting, by the AN entity of the first network, service data to the UE by using the AN entity of the second network includes: receiving, by the AN entity of the first network, the service data sent by the AN entity of the second network, where the service data is obtained after the AN entity of the second network receives a local IP data packet from the UE and decapsulates the local IP data packet, and the local IP data packet is obtained after the UE encapsulates the data of the service identified by the TFT information.

With reference to the first aspect, in a second possible implementation manner, the first request message further includes information about an IP flow tunnel corresponding to an interface of the AN entity of the first network, and the transmitting, by the AN entity of the first network, service data by using the AN entity of the second network includes transmitting, by the AN entity of the first network, the service data to the AN entity of the second network through an IP flow tunnel corresponding to a preconfigured or dynamically configured interface; where the service data is a data packet after Generic Routing Encapsulation (GRE) encapsulation is performed, a value of GRE key information of a GRE header in the data packet is first GRE key information, a source User Datagram Protocol (UDP) port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

With reference to the first aspect or the first possible implementation manner of the first aspect or the second possible implementation manner of the first aspect, in a third possible implementation manner, before the sending, by an AN entity of a first network, a first request message to an AN entity of a second network corresponding to a target cell in which a UE is located, the method further includes sending, by the AN entity of the first network, an indication message to the UE, where the indication message is used for specifying that the UE performs inter-system measurement; receiving, by the AN entity of the first network, a measurement result sent by the UE, where the measurement result is a result of measurement performed by the UE according to the indication message, and the measurement result includes results of measurement performed on multiple cells; and selecting, by the AN entity of the first network from the multiple cells, a cell with the strongest signal as the target cell of the UE.

With reference to the first aspect or the first possible implementation manner of the first aspect or the second possible implementation manner of the first aspect, in a fourth possible implementation manner, the first request message further includes cell list information, and before the sending, by an AN entity of a first network, a first request message to an AN entity of a second network corresponding to a target cell in which a UE is located, the method further includes sending, by the AN entity of the first network, an indication message to the UE, where the indication message is used for instructing the UE to perform inter-system measurement; and receiving, by the AN entity of the first network, a measurement result sent by the UE, where the measurement result is a result of measurement performed by the UE according to the indication message, and the measurement result includes the cell list information; and after the sending, by an AN entity of a first network, a first request message to an AN entity of a second network corresponding to a target cell, and before the sending, by the AN entity of the first network, a second request message to the UE. The method further includes receiving, by the AN entity of the first network, the information about the target cell sent by the AN entity of the second network, where the target cell is a cell selected by the AN entity of the second network from the cell list information.

A second aspect of the present invention provides a service data transmission method, including receiving, by an AN entity of a second network, a request message sent by an AN entity of a first network, where the request message is used for requesting the AN entity of the second network to establish a radio bearer for a UE, and the request message includes an identifier of the UE and a QoS parameter of the radio bearer; establishing, by the AN entity of the second network, the radio bearer with the UE according to the QoS parameter of the radio bearer; and transmitting, by the AN entity of the second network, service data between the AN entity of the first network and the UE.

In a first possible implementation manner, the second network is an eHRPD network, and the establishing, by the AN entity of the second network, the radio bearer with the UE according to the QoS parameter of the radio bearer includes establishing, by the AN entity of the second network, a Radio Link Protocol RLP connection with the UE, where a QoS parameter of eHRPD used in the process of establishing an RLP connection is obtained through mapping according to the QoS parameter of the radio bearer.

With reference to the second aspect or the first possible implementation manner of the second aspect, in a second possible implementation manner, the transmitting, by the AN entity of the second network, service data between the AN entity of the first network and the UE includes sending, by the AN entity of the second network, a local IP address to the UE; receiving, by the AN entity of the second network, the service data sent by the AN entity of the first network, and encapsulating the received service data into a local IP data packet, where an address of the local IP data packet is the local IP address; and sending, by the AN entity of the first network, the encapsulated local IP data packet to the UE.

With reference to the second aspect, in a third possible implementation manner, the transmitting, by the AN entity of the second network, service data between the AN entity of the first network and the UE includes receiving, by the AN entity of the second network, the service data sent by the AN entity of the first network; and sending, by the AN entity of the second network, the received service data to the UE.

With reference to the second aspect, in a fourth possible implementation manner, the second network is an eHRPD network, and before the establishing, by the AN entity of the second network, the radio bearer with the UE according to the QoS parameter of the radio bearer, the method further includes performing, by the AN entity of the second network, mapping on the QoS parameter of the radio bearer to obtain a QoS parameter of eHRPD; and sending, by the AN entity of the second network, the mapped QoS parameter of eHRPD to the AN entity of the first network, so that the AN entity of the first network sends the mapped QoS parameter of eHRPD to the UE, to enable the UE to establish an RLP connection with the AN entity of the second network by using the mapped QoS parameter of eHRPD.

A third aspect of the present invention provides a service data transmission method, including receiving, by a UE, a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network; establishing, by the UE, the radio bearer with the AN entity of the second network; and transmitting, by the UE, service data to the AN entity of the first network by using the AN entity of the second network, where the service data is data corresponding to a service identified by the TFT information.

In a first possible implementation manner, the second network is an eHRPD network, and the establishing, by the UE, the radio bearer with the AN entity of the second network includes establishing, by the UE, a Radio Link Protocol RLP connection with the AN entity of the second network, where a QoS parameter of eHRPD used in the process of establishing an RLP connection is obtained through mapping according to the QoS parameter of the radio bearer.

With reference to the first possible implementation manner of the third aspect, in a second possible implementation manner, after the receiving, by a UE, a request message sent by an AN entity of a first network, and before the establishing, by the UE, the radio bearer with the AN entity of the second network, the method further includes receiving, by the UE, the QoS parameter of eHRPD sent by the AN entity of the first network, where the QoS parameter of eHRPD is received by the AN entity of the first network from the AN entity of the second network, and the QoS parameter of eHRPD is obtained through mapping performed by the AN entity of the second network according to the QoS parameter of the radio bearer.

With reference to the first possible implementation manner of the third aspect, in a third possible implementation manner, after the receiving, by a UE, a request message sent by an AN entity of a first network, and before the establishing, by the UE, the radio bearer with the AN entity of the second network, the method further includes performing, by the UE, mapping according to the QoS parameter of the radio bearer to obtain the QoS parameter of eHRPD.

With reference to the third aspect or the first possible to the third possible implementation manners of the third aspect, in a fourth possible implementation manner, the transmitting, by the UE, service data to the AN entity of the first network by using the AN entity of the second network includes receiving, by the UE, a local IP address sent by the AN entity of the second network; and sending, by the UE, a local IP data packet to the AN entity of the second network, where the local IP data packet is a local IP data packet obtained after the UE encapsulates the service data, and an address of the local IP data packet is the local IP address.

With reference to the fourth possible implementation manner of the third aspect, in a fifth possible implementation manner, after the receiving, by the UE, a local IP address sent by the AN entity of the second network, and before the sending, by the UE, a local IP data packet to the AN entity of the second network, the method further includes selecting, by the UE according to the service identified by the TFT information, the data corresponding to the service; and encapsulating, by the UE, the selected data into the local IP data packet whose address is the local IP address.

A fourth aspect of the present invention provides an AN entity, where the AN entity is an AN entity of a first network, and includes: a first request unit, a second request unit, and a service data transmission unit. The first request unit is configured to send a first request message to an AN entity of a second network corresponding to a target cell in which a UE is located, so as to request the AN entity of the second network to establish a radio bearer for the UE, where the first request message includes an identifier of the UE and a QoS parameter of the radio bearer. The second request unit is configured to send a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network. The service data transmission unit is configured to: after the AN entity of the second network has established the radio bearer with the UE, transmit service data to the UE by using the AN entity of the second network, where the service data is data corresponding to a service identified by the TFT information.

In a first possible implementation manner, the service data transmission unit is further configured to receive the service data sent by the AN entity of the second network, where the service data is obtained after the AN entity of the second network receives a local IP data packet from the UE and decapsulates the local IP data packet, and the local IP data packet is obtained after the UE encapsulates the data of the service identified by the TFT information.

In a second possible implementation manner, the first request message further includes information about an IP flow tunnel corresponding to an interface of the AN entity of the first network, and the service data transmission unit is further configured to transmit the service data to the AN entity of the second network through an IP flow tunnel corresponding to a preconfigured or dynamically configured interface; where the service data is a data packet after GRE encapsulation is performed, a value of GRE key information of a GRE header in the data packet is first GRE key information, a source UDP port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

With reference to the fourth aspect or the first possible implementation manner of the fourth aspect or the second possible implementation manner of the fourth aspect, in a third possible implementation manner, the AN entity further includes a first indication message sending unit, configured to send an indication message to the UE, where the indication message is used for specifying that the UE performs inter-system measurement; a first measurement result receiving unit, configured to receive a measurement result sent by the UE, where the measurement result is a result of measurement performed by the UE according to the indication message, and the measurement result includes results of measurement performed on multiple cells; and a target cell determining subunit, configured to select, from the multiple cells, a cell with the strongest signal as the target cell of the UE.

With reference to the fourth aspect or the first possible implementation manner of the fourth aspect or the second possible implementation manner of the fourth aspect, in a fourth possible implementation manner, the first request message further includes cell list information, and the AN entity further includes a second indication message sending unit, configured to send an indication message to the UE, where the indication message is used for instructing the UE to perform inter-system measurement; a second measurement result receiving unit, configured to receive a measurement result sent by the UE, where the measurement result is a result of measurement performed by the UE according to the indication message, and the measurement result includes the cell list information; and a target cell information receiving unit, configured to receive the information about the target cell sent by the AN entity of the second network, where the target cell is a cell selected by the AN entity of the second network from the cell list information.

A fifth aspect of the present invention provides an AN entity, where the AN entity is an AN entity of a second network, and includes: a request message receiving unit, an establishment unit, and a transmission unit. The request message receiving unit is configured to receive a request message sent by an AN entity of a first network, where the request message is used for requesting the AN entity of the second network to establish a radio bearer for a UE, and the request message includes an identifier of the UE and a QoS parameter of the radio bearer. The establishment unit is configured to establish the radio bearer with the UE according to the QoS parameter of the radio bearer. The transmission unit is configured to transmit, by the AN entity of the second network, service data between the AN entity of the first network and the UE.

In a first possible implementation manner, the establishment unit is further configured to establish a Radio Link Protocol RLP connection with the UE, where a QoS parameter of eHRPD used in the process of establishing an RLP connection is obtained through mapping according to the QoS parameter of the radio bearer.

With reference to the fifth aspect or the first possible implementation manner of the fifth aspect, in a second possible implementation manner, the AN entity further includes an IP address sending unit, configured to send a local IP address to the UE.

With reference to the second possible implementation manner of the fifth aspect, in a third possible implementation manner, the transmission unit includes: a first service data receiving unit, configured to receive the service data sent by the AN entity of the first network, and encapsulate the received service data into a local IP data packet, where an address of the local IP data packet is the local IP address; and a first service data sending unit, configured to send the encapsulated local IP data packet to the UE.

With reference to the second possible implementation manner of the fifth aspect, in a fourth possible implementation manner, the transmission unit includes a second service data receiving unit, configured to receive a local IP address data packet sent by the UE, and decapsulate the received local IP data packet to obtain the service data, where an address corresponding to the local IP data packet is the local IP address; and a second service data sending unit, configured to send the service data obtained after decapsulation to the AN entity of the first network.

In a fifth possible implementation manner, the second network is an eHRPD network, and the AN entity further includes a mapping unit, configured to perform mapping on the QoS parameter of the radio bearer to obtain a QoS parameter of eHRPD; and a QoS parameter sending unit, configured to send the mapped QoS parameter of eHRPD to the AN entity of the first network, so that the AN entity of the first network sends the mapped QoS parameter of eHRPD to the UE, to enable the UE to establish an RLP connection with the AN entity of the second network by using the mapped QoS parameter of eHRPD.

A sixth aspect of the present invention provides a UE, including: a request message receiving unit, a bearer establishment unit, and a service data transmission unit. The request message receiving unit is configured to receive a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network. The bearer establishment unit is configured to establish the radio bearer with the AN entity of the second network. The service data transmission unit is configured to transmit service data to the AN entity of the first network by using the AN entity of the second network, where the service data is data corresponding to a service identified by the TFT information.

In a first possible implementation manner, the bearer establishment unit is further configured to establish a Radio Link Protocol RLP connection with the AN entity of the second network, where a QoS parameter of eHRPD used in the process of establishing an RLP connection is obtained through mapping according to the QoS parameter of the radio bearer.

In a second possible implementation manner, the UE further includes a QoS parameter receiving unit, configured to receive a QoS parameter of eHRPD sent by the AN entity of the first network, where the QoS parameter of eHRPD is received by the AN entity of the first network from the AN entity of the second network, and the QoS parameter of eHRPD is obtained through mapping performed by the AN entity of the second network according to the QoS parameter of the radio bearer.

In a third possible implementation manner, the UE further includes a mapping unit, configured to perform mapping according to the QoS parameter of the radio bearer to obtain a QoS parameter of eHRPD.

With reference to the sixth aspect or the first to the third possible implementation manners of the sixth aspect, in a fourth possible implementation manner, the UE further includes an IP address receiving unit, configured to receive a local IP address sent by the AN entity.

With reference to the fourth possible implementation manner of the sixth aspect, in a fifth possible implementation manner, the service data transmission unit is further configured to send a local IP data packet to the AN entity of the second network, where the local IP data packet is a local IP data packet obtained after the UE encapsulates the service data, and an address of the local IP data packet is the local IP address.

With reference to the fourth possible implementation manner of the sixth aspect, in a sixth possible implementation manner, the service data transmission unit is further configured to receive a local IP data packet sent by the AN entity of the second network, where the local IP data packet is a local IP data packet obtained after the AN of the second network encapsulates the service data, the service data is received from the AN entity of the first network, and an address of the local IP data packet is the local IP address.

A seventh aspect of the present invention provides a service data transmission system, including: the foregoing AN entity of a first network, the foregoing AN entity of a second network, and the foregoing UE.

An eighth aspect of the present invention provides an interface, where the interface is an interface on an AN entity of a first network, the interface is configured to send a request message to an AN entity of a second network corresponding to a target cell in which a UE is located, so as to request the AN entity of the second network to establish a radio bearer for the UE, where the request message includes an identifier of the UE and a QoS parameter of the radio bearer; and the target cell in which the UE is located is located in coverage of the AN entity of the second network; the interface is further configured to receive a response message returned by the AN entity of the second network, where the response message indicates that the AN entity of the second network has established the radio bearer with the UE. The interface is further configured to transmit service data of the UE between the AN entity of the first network and the AN entity of the second network.

A ninth aspect of the present invention provides an interface, where the interface is an interface on an AN entity of a second network, the interface is configured to receive a request message sent by an AN entity of a first network, where the request message is used for requesting the AN entity of the second network to establish a radio bearer for a UE, and the request message includes an identifier of the UE and a QoS parameter of the radio bearer; and a target cell in which the UE is located is located in coverage of the AN entity of the second network. The interface is further configured to send a response message to the AN entity of the first network, where the response message indicates that the AN entity of the second network has established the radio bearer with the UE. The interface is further configured to transmit service data of the UE between the AN entity of the second network and the AN entity of the first network.

In the technical solutions, an AN entity of a first network sends a first request message to an AN entity of a second network corresponding to a target cell in which a UE is located, so as to request the AN entity of the second network to establish a radio bearer for the UE; the AN entity of the first network sends a second request message to the UE, so as to request the UE to establish the radio bearer with the AN entity of the second network; and after the AN entity of the second network has established the radio bearer with the UE, the AN entity of the first network transmits service data to the UE by using the AN entity of the second network. In this way, it may be implemented that a UE transmits service data in an LTE network and an eHRPD network at the same time.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic flowchart of a service data transmission method according to an embodiment of the present invention;

FIG. 2 is a schematic flowchart of another service data transmission method according to an embodiment of the present invention;

DETAILED DESCRIPTION OF ILLUSTRATIVE EMBODIMENTS

Figure 3:
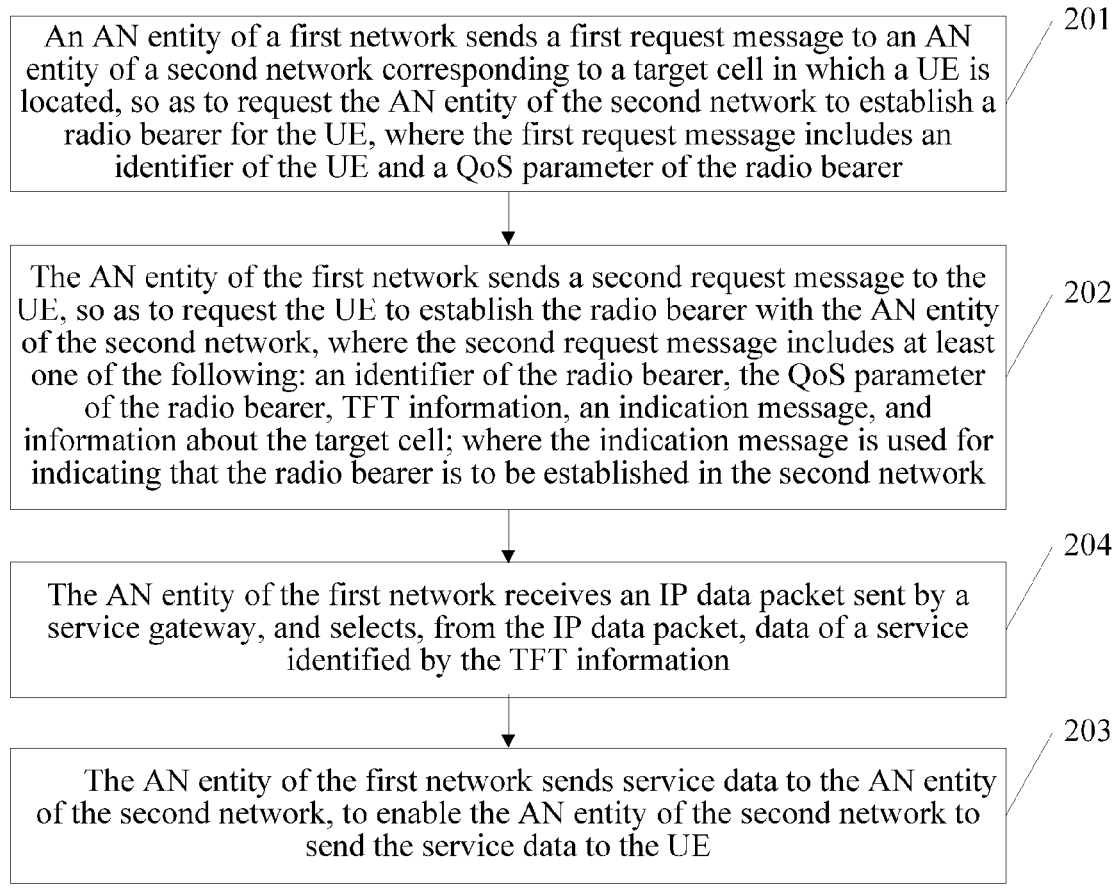
FIG. 3 is a schematic flowchart of another service data transmission method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

FIG. 1 is a schematic flowchart of a service data transmission method according to an embodiment of the present invention, and as shown in FIG. 1, the method includes the following steps.

101. An AN entity of a first network sends a first request message to an AN entity of a second network corresponding to a target cell in which a UE is located, so as to request the AN entity of the second network to establish a radio bearer for the UE, where the first request message includes an identifier of the UE and a QoS parameter of the radio bearer.

Optionally, the first network is an LTE network, the second network is an eHRPD network, the AN entity of the first network may be a base station in the LTE network, and the target cell is a cell in the eHRPD network.

It should be noted that the AN entity of the second network may manage multiple cells including the target cell, and the AN entity of the first network may determine, when the target cell of the UE is not selected, the AN entity of the second network according to preconfigured information, a measurement result sent by the UE or position information of the UE and other information.

102. The AN entity of the first network sends a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network.

Optionally, after the UE receives the second request message and the AN entity of the second network receives the first request message, the radio bearer may be established between the UE and the AN entity of the second network, and service data is transmitted on the established radio bearer.

103. After the AN entity of the second network has established the radio bearer with the UE, the AN entity of the first network transmits service data to the UE by using the AN entity of the second network, where the service data is data corresponding to a service identified by the TFT information.

It should be noted that, that the AN entity of the first network transmits service data to the UE by using the AN entity of the second network may be understood as follows: The AN entity of the first network sends the service data to the AN entity of the second network, and the AN entity of the second network then sends the received service data to the UE; or, the UE sends the service data to the AN entity of the second network, and the AN entity of the second network then sends the received the service data to the AN entity of the first network.

As an optional implementation manner, while the AN entity of the first network transmits the service data to the UE by using the AN entity of the second network, the UE may further directly transmit the service data to the AN entity of the first network.

As an optional implementation manner, the base station may specifically be an evolved NodeB (Evolved Node, eNB), and the AN entity may specifically be an evolved access network (Evolved Access Network, eAN) entity.

It should be noted that, in this embodiment, an interface configured in the present invention may be used for transmission of a message and/or service data transmitted between the AN entity of the first network and the AN of the second network.

In the technical solution, an AN entity of a first network sends a first request message to an AN entity of a second network corresponding to a target cell in which a UE is located, so as to request the AN entity of the second network to establish a radio bearer for the UE; the AN entity of the first network sends a second request message to the UE, so as to request the UE to establish the radio bearer with the AN entity of the second network; and after the AN entity of the second network has established the radio bearer with the UE, the AN entity of the first network transmits service data to the UE by using the AN entity of the second network. In this way, it may be implemented that a UE transmits service data in an LTE network and an eHRPD network at the same time.

FIG. 2 is a schematic flowchart of another service data transmission method according to an embodiment of the present invention, and as shown in FIG. 2, the method includes the following steps.

201. An AN entity of a first network sends a first request message to an AN entity of a second network corresponding to a target cell in which a UE is located, so as to request the AN entity of the second network to establish a radio bearer for the UE, where the first request message includes an identifier of the UE and a QoS parameter of the radio bearer.

As an optional implementation manner, in this embodiment of the present invention, an interface configured in the present invention may be used to accomplish transmission and exchange of a message, information, and service data between the AN entity of the first network and the AN entity of the second network.

Optionally, step 201 may specifically be that the AN entity of the first network sends, by using a preconfigured or dynamically configured interface, the first request message to the AN entity of the second network corresponding to the target cell.

202. The AN entity of the first network sends a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network.

Optionally, the indication message may specifically be an indicator.

Optionally, the information about the target cell may specifically include: carrier information of the target cell, pilot number (Pilot Number, PN) information of the target cell, and other information.

As an optional implementation manner, the second request message may further include a mapping relationship between an Evolved Packet System (EPS) bearer identifier as well as an EPS bearer and a radio bearer.

In this implementation manner, the AN entity of the first network sends the mapping relationship between an EPS bearer identifier as well as an EPS bearer and a radio bearer to the UE, so that the UE learns about a correspondence between a radio bearer and an EPS bearer in step 202, where the mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to more desirably transmit or process data corresponding to the service.

Optionally, the EPS bearer identifier and the TFT information included in the second request message may specifically be sent by a mobile management entity (Mobility Management Entity, MME), or may be sent by the MME in the form of a session request message (for example, Session Management Request). In other words, the AN entity of the first network receives a session request message (for example, Session Management Request) sent by the MME, where the session request message (for example, Session Management Request) includes the EPS bearer identifier and the TFT information.

Optionally, the AN entity of the first network may further receive a QoS parameter of a bearer corresponding to the EPS bearer identifier sent by an MME, or the QoS parameter of the bearer included in the session request message (for example, Session Management Request); and the AN entity of the first network may perform, after receiving the QoS parameter of the bearer, mapping on the QoS parameter to obtain the QoS parameter of the radio bearer, and refer to the following embodiments for details.

Optionally, the second request message sent to the UE in step 202 may specifically include:

the session request message (for example, Session Management Request), a radio bearer identifier, the QoS parameter of the radio bearer corresponding to the radio bearer identifier, the indication message, and the information about the target cell, where the indication message indicates that the radio bearer is to be established in the second network; the session request message (for example, Session Management Request) includes the EPS bearer identifier and the TFT information; and the session request message (for example, Session Management Request) may further include a QoS parameter of a bearer corresponding to the EPS bearer identifier.

After acquiring the second request message, the UE may acquire the session request message (for example, Session Management Request), and then parse the session request message (for example, Session Management Request) to obtain the EPS bearer identifier and the TFT information.

As an optional implementation manner, step 202 may specifically be sending a Radio Resource Control protocol (Radio Resource Control, RRC) connection reconfiguration request (for example, Connection Reconfiguration Request) to the UE, where the RRC connection reconfiguration request (for example, Connection Reconfiguration Request) carries the second request message. Alternatively, step 202 may specifically be sending a newly defined RRC message to the UE, where the newly defined RRC message carries the second request message.

Optionally, the identifier of the UE may specifically be an International Mobile Subscriber Identification Number (IMSI).

As an optional implementation manner, the second network is an eHRPD network, and in this implementation manner, step 202 may specifically include:

performing, by the AN entity of the first network, mapping according to the QoS parameter of the radio bearer to obtain a QoS parameter of eHRPD; and sending, by the AN entity of the first network, the mapped QoS parameter of eHRPD to the UE, to enable the UE to establish a Radio Link Protocol RLP connection with the AN entity of the second network by using use the mapped QoS parameter of eHRPD.

In this implementation manner, it may be implemented that the radio bearer established by the UE with the AN entity of the second network is an RLP connection.

203. The AN entity of the first network sends service data to the AN entity of the second network, to enable the AN entity of the second network to send the service data to the UE.

Optionally, step 203 may specifically be that the AN entity of the first network sends the service data to the AN entity of the second network by using a preconfigured or dynamically configured interface.

Optionally, a message or service data may specifically be transmitted to the AN entity by using two different interfaces in step 201 and step 203.

Optionally, the AN entity of the first network may specifically send the service data to the AN entity in the form of an IP data packet. That is, the AN entity of the first network sends an IP data packet of data of a service identified by the TFT information to the AN entity of the second network.

In this way, it may be implemented that the AN entity of the first network transmits the service data to the AN entity of the second network, and the AN entity of the second network may transmit, after receiving the service data, the received service data to the UE, so as to implement that the UE transmits the service data between two networks at the same time.

As an optional implementation manner, as shown in FIG. 3, before step 203 is executed, the method may further include the following steps

204. The AN entity of the first network receives an IP data packet sent by a service gateway, and selects, from the IP data packet, data of a service identified by the TFT information.

Optionally, step 204 may specifically include receiving, by the AN entity of the first network, multiple IP data packets sent by the service gateway, and selecting, from the multiple IP data packets, an IP data packet of the data of the service identified by the TFT information.

By using step 203, the selected IP data packet of the data of the service identified by the TFT information is then sent to the AN entity of the second network.

Optionally, the AN entity of the first network may specifically receive, through a General Packet Radio Service (General Packet Radio Service, GPRS) tunnel protocol (GPRS Tunnel Protocol, GTP) tunnel, the IP data packet sent by the service gateway.

In this step, the data of the service identified by the TFT information is selected from the IP data packet sent by the service gateway, so that the data is sent to the AN entity of the second network in step 203, to enable the AN entity of the second network to transmit the received service data to the UE.

Optionally, the IP data packet sent by the service gateway may belong to multiple pieces of service data. In step 204, filtering is performed by using the TFT information, an IP data packet of the data of the service identified by the TFT information is selected, and by using step 203, the selected IP data packet of the data of the service is then sent to the AN entity of the second network. An IP data packet of other service data may be, by using the prior art, directly sent by the AN entity of the first network to the UE (for example, sent in an LTE network). In this way, it may be implemented that the IP data packet sent by the service gateway is sent to the UE in two manners (for example, in one manner, sent to the UE by using the AN entity of the second network, and in the other manner, directly sent to the UE by the AN entity of the first network), so as to implement that the UE transmits service data in an LTE network and an eHRPD network at the same time.

As an optional implementation manner, before step 201, the method may further include: selecting, by the AN entity of the first network, the target cell of the UE from the second network (for example, eHRPD network).

Optionally, the step of selecting, by the AN entity of the first network, the target cell of the UE from the second network may specifically include:

sending, by the AN entity of the first network, an indication message to the UE, where the indication message is used for specifying that the UE performs inter-system measurement;

receiving, by the AN entity of the first network, a measurement result sent by the UE, where the measurement result is a result of measurement performed by the UE according to the indication message, and the measurement result includes measurement results of multiple cells; and selecting, by the AN entity of the first network from the multiple cells, a cell with the strongest signal as the target cell of the UE.

In this implementation manner, it may be implemented that the AN entity of the first network selects a suitable cell for the UE according to the measurement result of the UE.

Optionally, the step of selecting, by the AN entity of the first network, the target cell of the UE from the second network may specifically include:

selecting, by the AN entity of the first network according to signal intensity of cells of the second network and position information of the UE, from cells covering the position information, a cell with the strongest signal as the target cell of the UE.

In this implementation manner, the AN entity of the first network may select, according to signal intensity of the cells of the second network and the position information of the UE, a suitable cell for the UE.

As an optional implementation manner, the first request message may further include cell list information, and before step 201, the method may further include:

sending, by the AN entity of the first network, an indication message to the UE, where the indication message is used for specifying that the UE performs inter-system measurement; and receiving, by the AN entity of the first network, a measurement result sent by the UE, where the measurement result is a result of measurement performed by the UE according to the indication message, and the measurement result includes the cell list information.

Optionally, after step 201, and before step 202, the method may further include:

receiving, by the AN entity of the first network, the information about the target cell sent by the AN entity of the second network, where the target cell is a cell selected by the AN entity from the cell list information.

Optionally, the AN entity of the second network may specifically analyze the measurement result in the cell list information to select a cell most suitable for the UE as the target cell of the UE, or the AN entity of the second network may specifically analyze the measurement result in the cell list information, and select, in combination with idle network resources of cells, a cell most suitable for the UE as the target cell of the UE. For example, a cell with the strongest signal for the UE is selected as the target cell of the UE.

In this implementation manner, it may be implemented that the target cell is selected by the AN entity of the second network.

In the technical solution, on the basis of the foregoing embodiment, it may be implemented that an AN entity of a first network sends service data to an AN entity of a second network, and the AN entity of the second network may send, after receiving the service data, the service data to a UE, so as to implement that the UE transmits service data in an LTE network and an eHRPD network at the same time.

Figure 4:
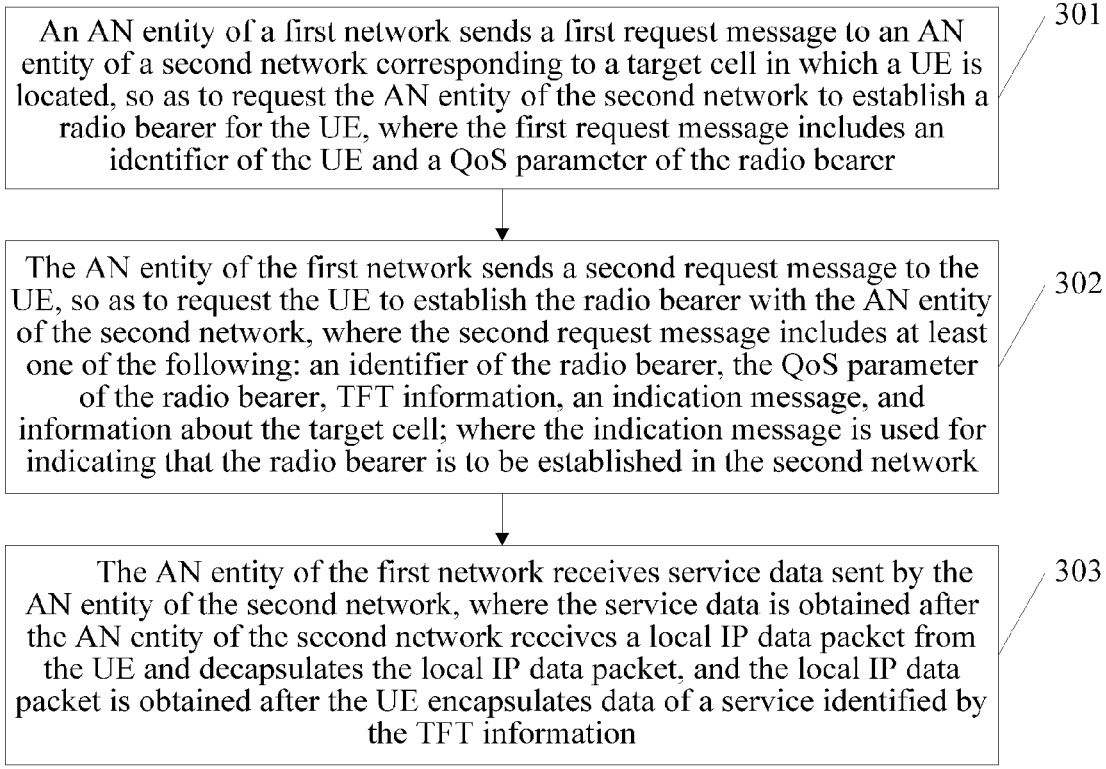
FIG. 4 is a schematic flowchart of another service data transmission method according to an embodiment of the present invention.

FIG. 4 is a schematic flowchart of another service data transmission method according to an embodiment of the present invention, and as shown in FIG. 4, the method includes the following steps.

301. An AN entity of a first network sends a first request message to an AN entity of a second network corresponding to a target cell in which a UE is located, so as to request the AN entity of the second network to establish a radio bearer for the UE, where the first request message includes an identifier of the UE and a QoS parameter of the radio bearer.

As an optional implementation manner, in this embodiment of the present invention, an interface configured in the present invention may be used to accomplish transmission and exchange of a message, information, and service data between the AN entity of the first network and the AN entity of the second network.

Optionally, step 301 may specifically be that the AN entity of the first network sends, by using a preconfigured or dynamically configured interface, the first request message to the AN entity of the second network corresponding to the target cell.

302. The AN entity of the first network sends a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network.

As an optional implementation manner, the second request message may further include a mapping relationship between an EPS bearer identifier as well as an EPS bearer and a radio bearer.

In this implementation manner, the mapping relationship between an EPS bearer identifier as well as an EPS bearer and a radio bearer is sent to the UE, so that the UE learns about a correspondence between a radio bearer and an EPS bearer in step 302, where the mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to more desirably transmit or process data corresponding to the service.

Optionally, the EPS bearer identifier and the TFT information included in the second request message may specifically be sent by an MME, or may be sent by the MME in the form of a session request message (for example, a Session Management Request). In other words, the AN entity of the first network receives a session request message (for example, Session Management Request) sent by the MME, where the session request message (for example, Session Management Request) message includes the EPS bearer identifier and the TFT information.

Optionally, the AN entity of the first network may further receive a QoS parameter of a bearer corresponding to the EPS bearer identifier sent by an MME, or the QoS parameter of the bearer included in the session request message (for example, Session Management Request). The AN entity of the first network may perform mapping, after receiving the QoS parameter of the bearer, on the QoS parameter to obtain the QoS parameter of the radio bearer, and refer to the following embodiments for details.

Optionally, the second request message sent to the UE in step 302 may specifically include:

the session request message (for example, Session Management Request), a radio bearer identifier, the QoS parameter of the radio bearer corresponding to the radio bearer identifier, the indication message, and the information about the target cell, where the indication message indicates that the radio bearer is to be established in the second network; the session request message (for example, Session Management Request) includes the EPS bearer identifier and the TFT information; and the session request message (for example, Session Management Request) may further include a QoS parameter of a bearer corresponding to the EPS bearer identifier.

After acquiring the second request message, the UE may acquire the session request message (for example, Session Management Request), and then parse the session request message (for example, Session Management Request) to obtain the EPS bearer identifier and the TFT information.

As an optional implementation manner, step 302 may specifically be sending a Radio Resource Control protocol (for example, Radio Resource Control, RRC) connection reconfiguration request (for example, Connection Reconfiguration Request) to the UE, where the RRC connection reconfiguration request (for example, Connection Reconfiguration Request) carries the second request message. Alternatively, step 302 may specifically be sending a newly defined RRC message to the UE, where the newly defined RRC message carries the second request message.

Optionally, the identifier of the UE may specifically be an IMSI.

303. The AN entity of the first network receives service data sent by the AN entity of the second network, where the service data is obtained after the AN entity of the second network receives a local IP data packet from the UE and decapsulates the local IP data packet, and the local IP data packet is obtained after the UE encapsulates data of a service identified by the TFT information.

Optionally, step 303 may specifically be that the AN entity of the first network receives, by using a preconfigured or dynamically configured interface, the service data sent by the AN entity of the second network.

Optionally, a message or service data may specifically be transmitted to the AN entity by using two different interfaces in step 301 and step 303.

Optionally, when an IP data packet is transmitted between the UE and the AN entity of the second network, a data packet of the UE received by the AN entity of the second network in step 303 is an IP data packet, and when a local IP data packet is transmitted between the UE and the AN entity of the second network, a data packet of the UE received by the AN entity of the second network in step 303 is a local IP data packet. For details, refer to the following the embodiments.

Optionally, that the AN entity of the first network receives service data sent by the AN entity of the second network may specifically be that the AN entity of the first network receives an IP data packet of the service data sent by the AN entity of the second network.

In this way, it may be implemented that, the AN entity of the first network receives the service data sent by the AN entity, the service data sent by the AN entity of the second network is the local IP data packet sent by the UE and received by the AN entity of the second network, and the local IP data packet is decapsulated to obtain the service data. Therefore, it is implemented that the AN entity of the first network receives the service data sent by the UE to the AN entity of the second network. Therefore, it is implemented that a UE transmits service data in an LTE network and an eHRPD network at the same time.

As an optional implementation manner, after step 303, the method further includes sending, by the AN entity of the first network, the service to a service gateway.

Optionally, the AN entity of the first network may specifically send, to the service gateway through a GTP tunnel (for example, S1-GTP), the service sent by the AN and received by the AN entity of the first network.

In the technical solution, on the basis of the foregoing embodiment, it may be implemented that an AN entity of a first network receives service data sent by an AN entity of a second network, where the service data sent by the AN entity of the second network is service data transmitted between the AN entity of the second network and the UE, so as to implement that the UE transmits service data in an LTE network and an eHRPD network at the same time.

Figure 5:
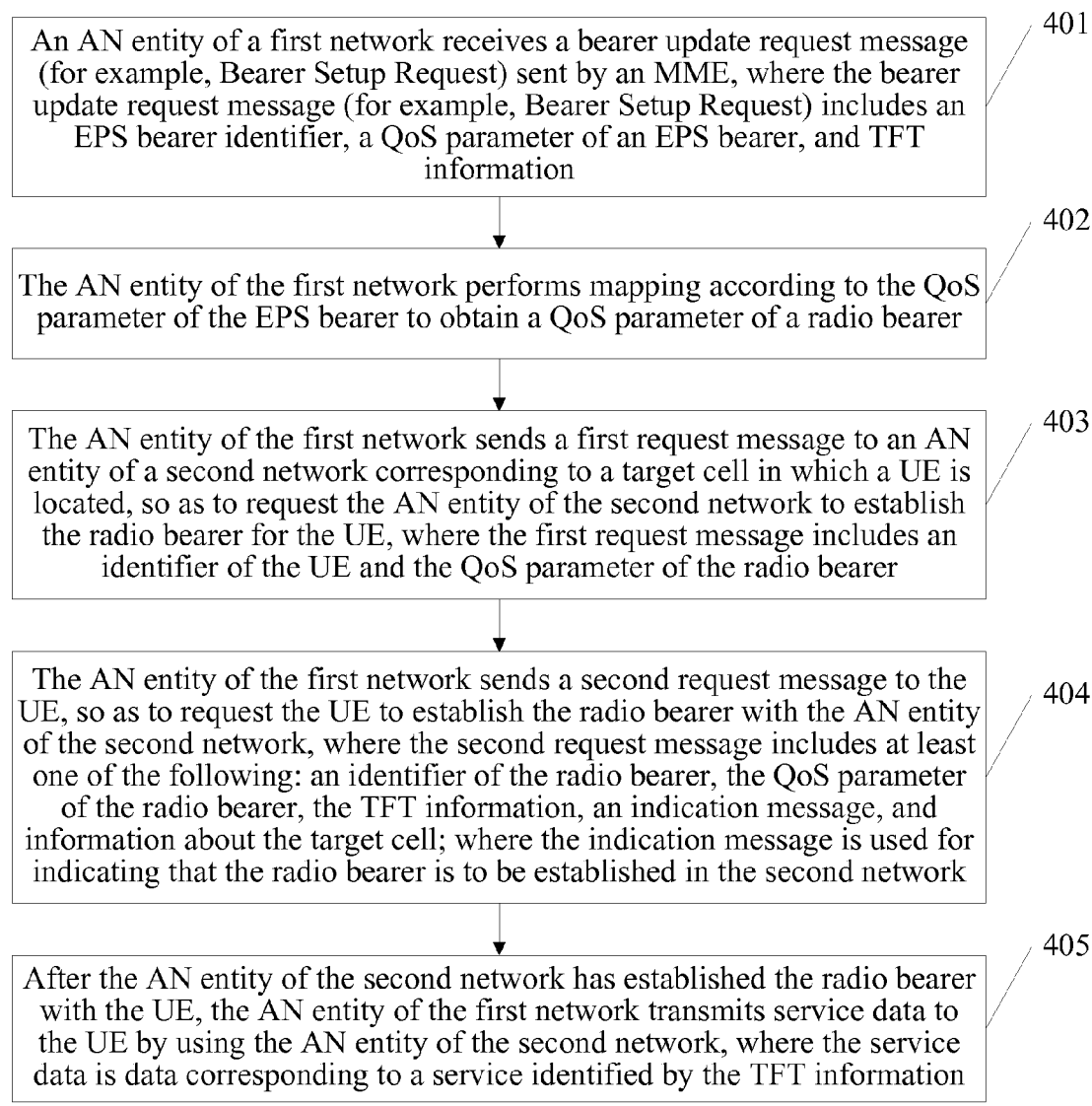
FIG. 5 is a schematic flowchart of another service data transmission method according to an embodiment of the present invention.

FIG. 5 is a schematic flowchart of another service data transmission method according to an embodiment of the present invention, and as shown in FIG. 5, the method includes the following steps.

401. An AN entity of a first network receives a bearer update request message (for example, Bearer Setup Request) sent by an MME, where the bearer update request message (for example, Bearer Setup Request) includes an EPS bearer identifier, a QoS parameter of an EPS bearer, and TFT information.

As an optional implementation manner, the bearer update request message (for example, Bearer Setup Request) sent by the MME may specifically include a session request message (for example, Session Management Request), where the session request message (for example, Session Management Request) may specifically include the EPS bearer identifier, the QoS parameter of the bearer, and the TFT information.

Optionally, the bearer update request message (for example, Bearer Setup Request) may specifically further include an S1-tunnel endpoint identifier (for example, Tunnel Endpoint Identifier, TEID). In this way, the AN entity of the first network may specifically learn, by using the S1-TEID, which transmission tunnel the bearer specifically corresponds to.

Optionally, the EPS bearer identifier included in the bearer update request message (for example, Bearer Setup Request) sent by the MME may specifically be allocated by the MME to a UE, whereas the QoS parameter of the bearer and the TFT information may specifically be sent by a service gateway and received by the MME. For example, the service gateway sends a create bearer request message (for example, Create Bearer Request) to the MME, where the create bearer request message (for example, Create Bearer Request) includes the QoS parameter and the TFT information of the EPS bearer. Currently, the MME further receives an identifier of the UE at the same time, and at the same time the MME further sends the identifier of the UE to the AN entity of the first network, to enable the AN entity of the first network to determine the UE.

It should be noted that, for an implementation manner in which the AN entity of the first network receives an update bearer request message sent by the MME, and the MME receives a message that is sent by the service gateway and includes quality of service information and the TFT information, refer to an existing process of establishing a dedicated bearer in an LTE network for details, which are not elaborated herein.

402. The AN entity of the first network performs mapping according to the QoS parameter of the EPS bearer to obtain a QoS parameter of a radio bearer.

As an optional implementation manner, step 402 may further include:

performing, by the AN of the first network, mapping on the QoS parameter of the bearer to obtain the QoS parameter of the radio bearer, and generating a mapping relationship between the bearer and the radio bearer.

403. The AN entity of the first network sends a first request message to an AN entity of a second network corresponding to a target cell in which a UE is located, so as to request the AN entity of the second network to establish the radio bearer for the UE, where the first request message includes an identifier of the UE and the QoS parameter of the radio bearer.

As an optional implementation manner, in this embodiment of the present invention, an interface configured in the present invention may be used to accomplish transmission and exchange of a message, information, and service data between the AN entity of the first network and the AN entity of the second network.

Optionally, step 403 may specifically be that the AN of the first network sends, by using a preconfigured or dynamically configured interface, the first request message to the AN entity of the second network corresponding to the target cell.

404. The AN entity of the first network sends a second request message to the UE, so as to request the UE to establish the radio bearer with the AN entity of the second network, where the second request message includes at least one of the following: an identifier of the radio bearer, the QoS parameter of the radio bearer, the TFT information, an indication message, and information about the target cell;

where the indication message is used for indicating that the radio bearer is to be established in the second network.

As an optional implementation manner, the second request message may further include a mapping relationship between an EPS bearer identifier as well as an EPS bearer and a radio bearer.

In this implementation manner, the mapping relationship between an EPS bearer identifier as well as an EPS bearer and a radio bearer is sent to the UE, so that the UE learns about a correspondence between a radio bearer and an EPS bearer in step 404, where the mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to more desirably transmit or process data corresponding to the service.

Optionally, after the UE receives the second request message and the AN entity receives the first request message, a bearer may be established between the UE and the AN entity, and service data is transmitted on the established bearer.

As an optional implementation manner, after the UE establishes the radio bearer with the AN entity of the second network, the AN entity of the first network may receive an acknowledgment message sent by the AN entity of the second network, where the acknowledgment message indicates that the UE has established a radio bearer connection with the AN entity of the second network; and at the same time may further return information about an interface (for example, information about an IP flow tunnel) by using which the AN entity of the second network and the AN entity of the first network perform communication.

Optionally, after receiving the acknowledgment message sent by the AN entity of the second network, the AN entity of the first network may further send a bearer update response message (for example, Bearer Setup Response) to the MME to notify the MME that the bearer has been updated.

Optionally, when the bearer update request message (for example, Bearer Setup Request) sent by the MME may specifically include a session request message (for example, Session Management Request), where the session request message (for example, Session Management Request) may specifically include the EPS bearer identifier, a QoS parameter of a bearer, and the TFT information. The AN entity of the first network may further receive a session response message (for example, Session Management Response) sent by the UE, and when the AN entity of the first network receives the session response message (for example, Session Management Response), the AN entity of the first network may further return the session response message (for example, Session Management Response) to the MME.

Optionally, after the MME receives a session response message (for example, Session Management Response) sent by the AN entity of the first network, the MME further may send a create bearer response message (for example, Create Bearer Response) to a service gateway. After the service gateway receives the create bearer response message (for example, Create Bearer Response), the service gateway may further send the create bearer response message (for example, Create Bearer Response) to a packet data gateway.

405. After the AN entity of the second network has established the radio bearer with the UE, the AN entity of the first network transmits service data to the UE by using the AN entity of the second network, where the service data is data corresponding to a service identified by the TFT information.

As an optional implementation manner, the first request message further includes information about an IP flow tunnel corresponding to an interface of the AN entity of the first network, and step 405 may specifically include:

transmitting, by the AN entity of the first network through an IP flow tunnel (for example, IP Flow Tunnel) corresponding to a preconfigured or dynamically configured interface, the service data to the AN entity of the second network; where the service data is a data packet after Generic Routing Encapsulation (Generic Routing Encapsulation, GRE) encapsulation is performed, a value of GRE key information (for example, key) of a GRE header in the data packet is first GRE key information, a source User Datagram Protocol (User Datagram Protocol, UDP) port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

Optionally, the preconfigured or dynamically configured interface may specifically be negotiated and configured by the AN entity of the first network and the AN entity of the second network by using a specific interface, and configuration information of an IP flow tunnel of the interface between the AN entity of the first network and the AN entity of the second network may be configured in the process of configuration, where the configuration information includes a UDP port number and an IP address of a side of the AN entity of the first network, a UDP port number and an IP address of a side of the AN entity of the second network, and first GRE key information and second GRE key information; and the AN entity of the first network and the AN entity of the second network may both store the configuration information of the IP flow tunnel.

The AN entity of the first network may further set a mapping relationship between first GRE key information and a first GTP tunnel (for example, S1-GTP) identifier, and a mapping relationship between second GRE key information and a second GTP tunnel (for example, S1-GTP) identifier; where the first GTP tunnel (for example, S1-GTP) identifier represents that a service gateway sends the service data to the AN entity of the first network, and the second GTP tunnel (for example, S1-GTP) identifier represents that the AN entity of the first network sends the service data to the service gateway.

The AN entity of the second network may further set a mapping relationship between first GRE key information and a radio bearer (for example, RLP connection) identifier, and a mapping relationship between second GRE key information and a radio bearer identifier; the AN entity sends the service data to the UE over the radio bearer by using the data packet received by a flow tunnel identified by the first GRE key information; and the AN entity receives, over the radio bearer, a service from the UE, and sends the received data packet to the AN entity of the first network through a flow tunnel identified by the second GRE key information (for example, key).

Optionally, step 405 may specifically include:

sending, by the AN entity of the first network through an IP flow tunnel (for example, IP Flow Tunnel) of a preconfigured or dynamically configured interface, a data packet including the service data to the AN entity of the second network, where the data packet is a data packet after GRE encapsulation is performed, a value of GRE key information of a GRE header in the data packet is first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network.

After acquiring the data of the service identified by the TFT information from a GTP tunnel, the AN entity of the first network may select, by using the mapping relationship between first GRE key information and a first GTP tunnel identifier, an IP flow tunnel corresponding to the service data, next, perform GRE encapsulation on the service, where a value of a GRE key of the GRE header of the encapsulated data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network, and send the encapsulated data packet to the AN entity of the second network through the selected IP flow tunnel.

After acquiring the data packet, the AN entity of the second network decapsulates the data packet to obtain the UDP ports, the IP addresses, the first GRE key information, and the data corresponding to the service (which may be referred to as service data for short) included in the data packet, next, determines a radio bearer corresponding to the service by using the mapping relationship between first GRE key information and a radio bearer identifier, and transmits the service data to the UE by using the determined radio bearer. Certainly, when the service data is transmitted to the UE by using the radio bearer, the service data may be encapsulated into a local IP data packet, and the local IP data packet is transmitted to the UE.

Optionally, step 405 may specifically include:

receiving, by the AN entity of the first network by using a preconfigured or dynamically configured interface, a data packet including the service data sent by the AN entity of the second network through an IP flow tunnel; where the data packet is a data packet after GRE encapsulation is performed, a value of GRE key information of a GRE header in the data packet is second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network.

After acquiring, from the radio bearer, the data of the service identified by the TFT information (for example, specifically, IP data packet sent by the UE may be acquired, and the IP data packet is then decapsulated to obtain the service data), the AN entity of the second network may select, by using the mapping relationship between second GRE key information and a radio bearer identifier, an IP flow tunnel corresponding to the service, next, perform GRE encapsulation on the corresponding service data, where a value of a GRE key of the GRE header of the encapsulated data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network, and send the encapsulated data packet to the AN entity of the first network through the selected IP flow tunnel.

After acquiring the data packet, the AN entity of the first network decapsulates the data packet to obtain the UDP ports, the IP addresses, the second GRE key information, and the data corresponding to the service (which may be referred to as service data for short) included in the data packet, next, determines a GTP tunnel corresponding to the service by using the mapping relationship between second GRE key information and a second GTP tunnel identifier, and transmits the service data to a service gateway through the determined GTP tunnel.

Optionally, the preconfigured or dynamically configured interface may specifically be an XX-3 interface, and the specific interface may specifically be an XX-1 interface.

It should be noted that, the foregoing implementation manners may specifically be applied to the embodiments.

As an optional implementation manner, the interface used in step 403 and the interface used in step 405 may specifically be two different interfaces. For example, the interface used in step 403 is XX-1, and the interface used in step 405 is XX-3. Certainly, the AN entity of the second network also transmits a message or service data to the AN entity of the first network by using a corresponding interface.

In the technical solution, on the basis of the foregoing embodiment, a step of implementing that an AN entity of a first network receives a bearer update request message sent by an MME, and according to the bearer update request message, send a first request message to the AN entity and send a second request message to a UE is added, so as to implement that the UE transmits service data in an LTE network and an eHRPD network at the same time.

Figure 6:
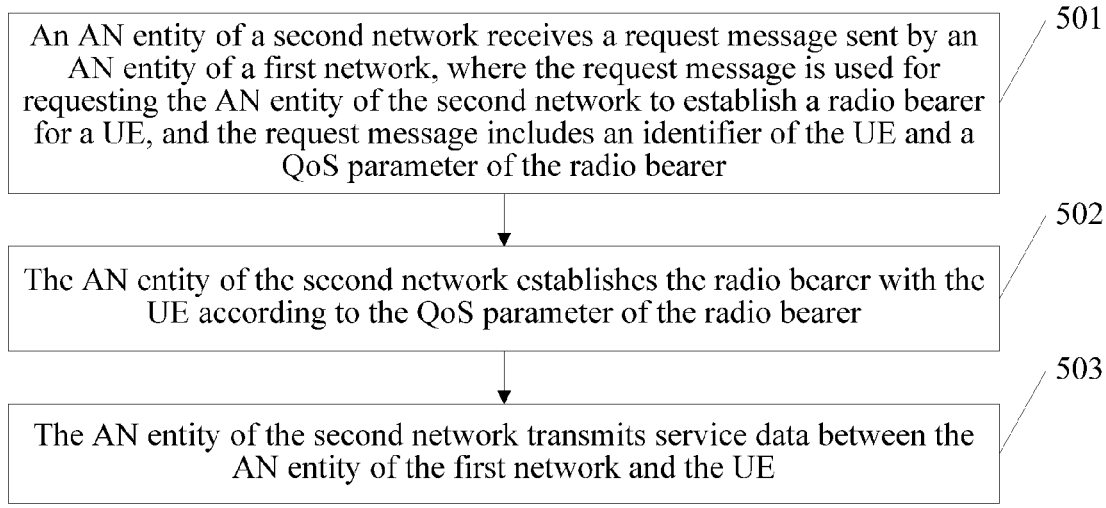
FIG. 6 is a schematic flowchart of another service data transmission method according to an embodiment of the present invention.

FIG. 6 is a schematic flowchart of another service data transmission method according to an embodiment of the present invention, and as shown in FIG. 6, the method includes the following steps.

501. An AN entity of a second network receives a request message sent by an AN entity of a first network, where the request message is used for requesting the AN entity of the second network to establish a radio bearer for a UE, and the request message includes an identifier of the UE and a QoS parameter of the radio bearer.

502. The AN entity of the second network establishes the radio bearer with the UE according to the QoS parameter of the radio bearer.

503. The AN entity of the second network transmits service data between the AN entity of the first network and the UE.

As an optional implementation manner, the first network is an LTE network, the second network is an eHRPD network, the AN entity of the first network may be a base station in the LTE network, and a target cell is a cell in the eHRPD network.

Optionally, the radio bearer with the UE may specifically be established in the second network.

In the technical solution, an AN entity of a second network receives a request message sent by an AN entity of a first network, where the request message is used for requesting the AN entity of the second network to establish a radio bearer for a UE, and the request message includes an identifier of the UE and a QoS parameter of the radio bearer; the AN entity of the second network establishes the radio bearer with the UE according to the QoS parameter of the radio bearer; and the AN entity of the second network transmits service data between the AN entity of the first network and the UE. In this way, it may be implemented that a UE transmits service data between two networks at the same time.

Figure 7:
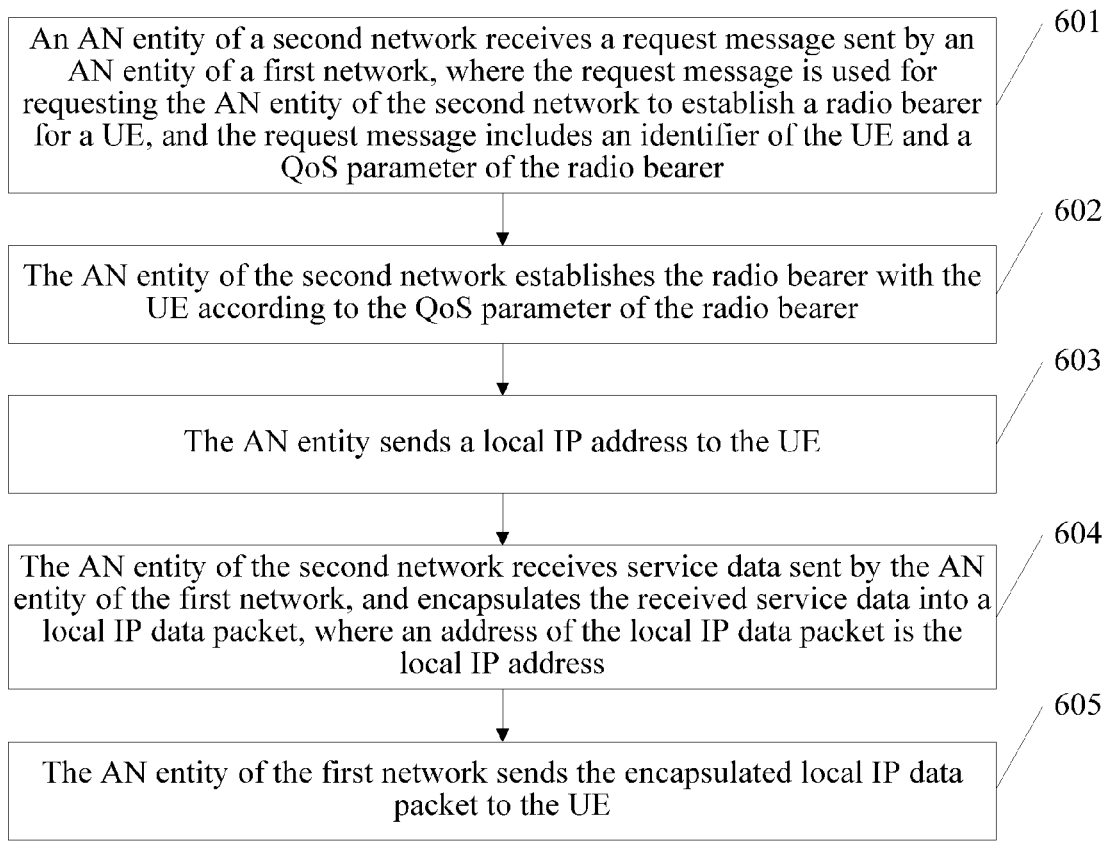
FIG. 7 is a schematic flowchart of another service data transmission method according to an embodiment of the present invention.

FIG. 7 is a schematic flowchart of another service data transmission method according to an embodiment of the present invention, and as shown in FIG. 7, the method includes the following steps.

601. An AN entity of a second network receives a request message sent by an AN entity of a first network, where the request message is used for requesting the AN entity of the second network to establish a radio bearer for a UE, and the request message includes an identifier of the UE and a QoS parameter of a radio bearer.

As an optional implementation manner, in the embodiment of the present invention, an interface configured in the present invention may be used to accomplish transmission and exchange of a message, information, and service data between the AN entity of the first network and the AN entity of the second network.

Optionally, step 601 may specifically be that the AN entity of the second network receives, by using a preconfigured or dynamically configured interface, the request message sent by the AN entity of the first network.

602. The AN entity of the second network establishes the radio bearer with the UE according to the QoS parameter of the radio bearer.

As an optional implementation manner, the second network is an eHRPD network, and step 602 may specifically include:

establishing, by the AN entity of the second network, a Radio Link Protocol RLP connection with the UE, where a QoS parameter of eHRPD used in the process of establishing an RLP connection is obtained through mapping according to the QoS parameter of the radio bearer.

It should be noted that, a process that the AN entity establishes an RLP connection with the UE is common knowledge, which is not elaborated herein. However, in the present invention, the QoS parameter of eHRPD used in the process that the AN entity establishes an RLP connection with the UE is obtained by performing mapping on the QoS parameter of the radio bearer, where the QoS parameter of the radio bearer is sent by the AN entity of the second network.

Optionally, in this implementation manner, the used QoS parameter of eHRPD may specifically be the QoS parameter of eHRPD used by the UE, and may specifically be obtained after the UE performs mapping by using the QoS parameter of the radio bearer, where the QoS parameter of the radio bearer is sent by the AN entity of the first network.

As an optional implementation manner, the second network is an eHRPD network, and step 602 may specifically include:

performing, by the AN entity of the second network, mapping on the QoS parameter of the radio bearer to obtain the QoS parameter of eHRPD; and sending, by the AN entity of the second network, the mapped QoS parameter of eHRPD to the AN entity of the first network, so that the AN entity of the first network sends the mapped QoS parameter of eHRPD to the UE, to enable the UE to establish an RLP connection with the AN entity of the second network by using the mapped QoS parameter of eHRPD.

In this implementation manner, the QoS parameter of eHRPD used to establish an RLP connection may specifically be obtained after the AN entity of the second network performs mapping on the received QoS parameter of the radio bearer, where the QoS parameter of the radio bearer is sent by the AN entity of the first network.

As an optional implementation manner, when the QoS parameter of the radio bearer is a BE type, SO=59 in a main service connection (for example, Main Service connection) in the RLP connection established in step 602, and a corresponding reservation label (for example, Reservation Label) is 0xFF. When the QoS parameter of the radio bearer is an RTP type, SO=67 in a main service connection (for example, Main Service connection) in the RLP connection established in step 602, and a corresponding reservation label (for example, Reservation Label) is 0xXX.

603. The AN entity sends a local IP (for example, Local IP) address to the UE.

As an optional implementation manner, the local IP address sent to the UE may specifically be a local IP address allocated by the AN entity of the second network to the UE.

As an optional implementation manner, the local IP address sent to the UE may further specifically be a local IP address sent by another device and received by the AN entity of the second network, that is, the local IP address sent to the UE is allocated by the another device to the UE.

604. The AN entity of the second network receives service data sent by the AN entity of the first network, and encapsulates the received service data into a local IP data packet, where an address of the local IP data packet is the local IP address.

Optionally, step 604 may specifically be that the AN entity of the second network receives, by using a preconfigured or dynamically configured interface, the service data sent by the AN entity of the first network.

Optionally, a message or service data may specifically be transmitted to the AN entity of the first network by using two different interfaces in step 601 and step 604.

Optionally, that the AN entity of the second network receives service data sent by the AN entity of the first network in step 604 specifically may be that the AN entity of the second network receives an IP data packet of the service data sent by the AN entity of the first network. That is, the service data is transmitted between the AN entity of the second network and the AN entity of the first network by using an IP data packet.

Optionally, step 604 may specifically be performing encapsulation in an IP-local IP manner.

605. The AN entity of the first network sends the encapsulated local IP data packet to the UE.

As an optional implementation manner, step 605 may specifically be sending the encapsulated IP data packet to the UE by establishing a main service connection (for example, Main Service connection) in an RLP connection.

After receiving the IP data packet, the UE may decapsulate the IP data, that is, remove a local IP header, and upload the service data obtained through decapsulation to an application corresponding to the service.

As an optional implementation manner, a value of Supported High Layer Protocols (for example, Supported Higher Layer Protocols) in a configured attribute in the RLP connection established in step 602 is 0x02 (for example, IPv4) or 0x03 (for example, IPv6).

Step 604 may specifically include receiving, by the AN entity of the second network, the service data sent by the AN entity of the first network; or, receiving, by the AN entity of the second network, an IP data packet of a service sent by the AN entity of the first network.

Step 605 may specifically include sending, by the AN entity of the second network, the received service data to the UE, or, sending, by the AN entity of the second network to the UE, an IP data packet of the received service data.

As a data packet carried by an RLP connection bearer whose value of Supported High Layer Protocols (for example, Supported Higher Layer Protocols) is 0x02 (for example, IPv4) or 0x03 (for example, IPv6) is IP data, in this case, the AN entity of the second network does not need to encapsulate an IP data packet sent by the AN entity of the first network into a local IP data packet. Also, on the side of the UE, the UE does not need to encapsulate a service that needs to be sent to the AN entity of the second network into a local IP data packet. The service data may be transmitted between the UE and the AN entity of the second network by using an IP data packet.

As an optional implementation manner, the request message may further include cell list information. After step 601, and before step 602, the method may further include:

selecting, by the AN entity of the second network, a target cell of the UE from the cell list information; and sending, by the AN entity of the second network, information about the target cell to the AN entity of the first network.

Optionally, the AN entity of the second network may specifically analyze a measurement result in the cell list information to select a cell most suitable for the UE as the target cell of the UE, or the AN entity of the second network may specifically analyze a measurement result in the cell list information, and select, in combination with idle network resources of cells, a cell most suitable for the UE as the target cell of the UE. For example, a cell with the strongest signal for the UE is selected as the target cell of the UE.

In this implementation manner, it may be implemented that the target cell is selected by the AN entity of the second network.

In the technical solution, on the basis of the foregoing embodiment, it may be implemented that an AN entity of a second network receives service data sent by an AN entity of a first network, and encapsulates the received service into an IP data packet whose address is a local IP address; and the AN entity sends the encapsulated IP data packet to a UE. Therefore, it is implemented that a UE transmits service data before two networks at the same time.

Figure 8:
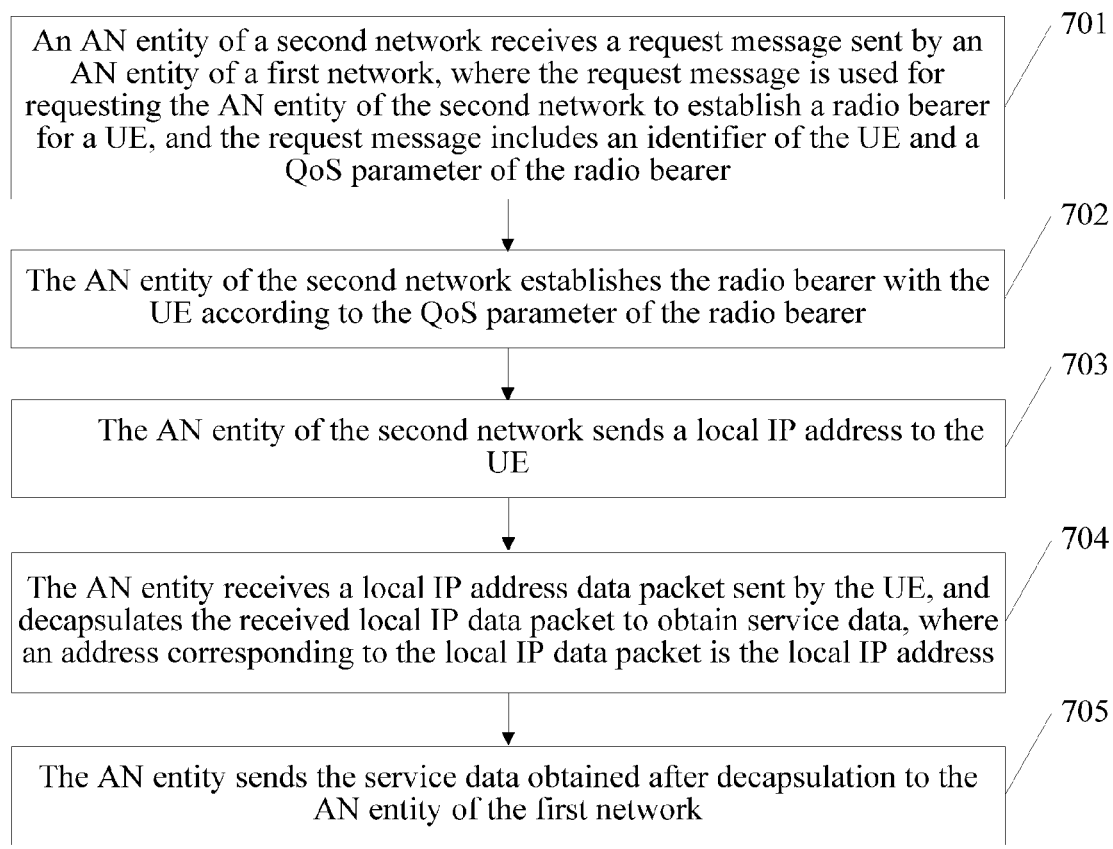
FIG. 8 is a schematic flowchart of another service data transmission method according to an embodiment of the present invention.

FIG. 8 is a schematic flowchart of another service data transmission method according to an embodiment of the present invention, and as shown in FIG. 8, the method includes the following steps.

701. An AN entity of a second network receives a request message sent by an AN entity of a first network, where the request message is used for requesting the AN entity of the second network to establish a radio bearer for a UE, and the request message includes an identifier of the UE and a QoS parameter of the radio bearer.

As an optional implementation manner, in this embodiment of the present invention, an interface configured in the present invention may be used to accomplish transmission and exchange of a message, information, and service data between the AN entity of the first network and the AN entity of the second network.

Optionally, step 701 may specifically be that the AN entity of the second network receives, by using a preconfigured or dynamically configured interface, a request message sent by the AN entity of the first network, where the request message is used for requesting establishment of a bearer for the UE in an eHRPD network.

702. The AN entity of the second network establishes the radio bearer with the UE according to the QoS parameter of the radio bearer.

As an optional implementation manner, the second network is an eHRPD network, and step 702 may specifically include:

establishing, by the AN entity of the second network, a Radio Link Protocol RLP connection with the UE, where a QoS parameter of eHRPD used in the process of establishing an RLP connection is obtained through mapping according to the QoS parameter of the radio bearer.

As an optional implementation manner, the second network is an eHRPD network, and step 702 may specifically include:

performing, by the AN entity of the second network, mapping on the QoS parameter of the radio bearer to obtain a QoS parameter of eHRPD; and sending, by the AN entity of the second network, the mapped QoS parameter of eHRPD to the AN entity of the first network, so that the AN entity of the first network sends the mapped QoS parameter of eHRPD to the UE, to enable the UE to establish an RLP connection with the AN entity of the second network by using the mapped QoS parameter of eHRPD.

703. The AN entity of the second network sends a local IP address to the UE.

704. The AN entity receives a local IP address data packet sent by the UE, and decapsulates the received local IP data packet to obtain service data, where an address corresponding to the local IP data packet is the local IP address.

705. The AN entity sends the service data obtained after decapsulation to the AN entity of the first network.

Optionally, step 705 may specifically be that the AN of the second network sends, by using a preconfigured or dynamically configured interface, the service data obtained after decapsulation to the AN entity of the first network.

Optionally, a message or service data may specifically be transmitted to the AN entity by using two different interfaces in step 701 and step 705.

Optionally, step 704 may specifically include:

receiving, by the AN entity of the second network, the local IP data packet sent by the UE, and performing processing of conversion of a local IP data packet into an IP data packet on the received local IP data packet to obtain an IP data packet; where the address of the local IP data packet is the local IP address.

Optionally, step 705 may specifically include:

sending, by the AN entity of the second network, the IP data packet obtained through the processing to the AN entity of the first network.

In this implementation manner, it may be implemented that service data is transmitted between the AN entity of the second network and the AN of the first network by using an IP data packet.

In the technical solution, on the basis of the foregoing embodiment, it may be implemented that an AN of a second network receives a local IP data packet sent by a UE, and decapsulates the received local IP data packet, and the AN of the second network sends service data obtained after decapsulation to an AN entity of a first network. Therefore, it is implemented that a UE transmits service data before two networks at the same time.

Figure 9:
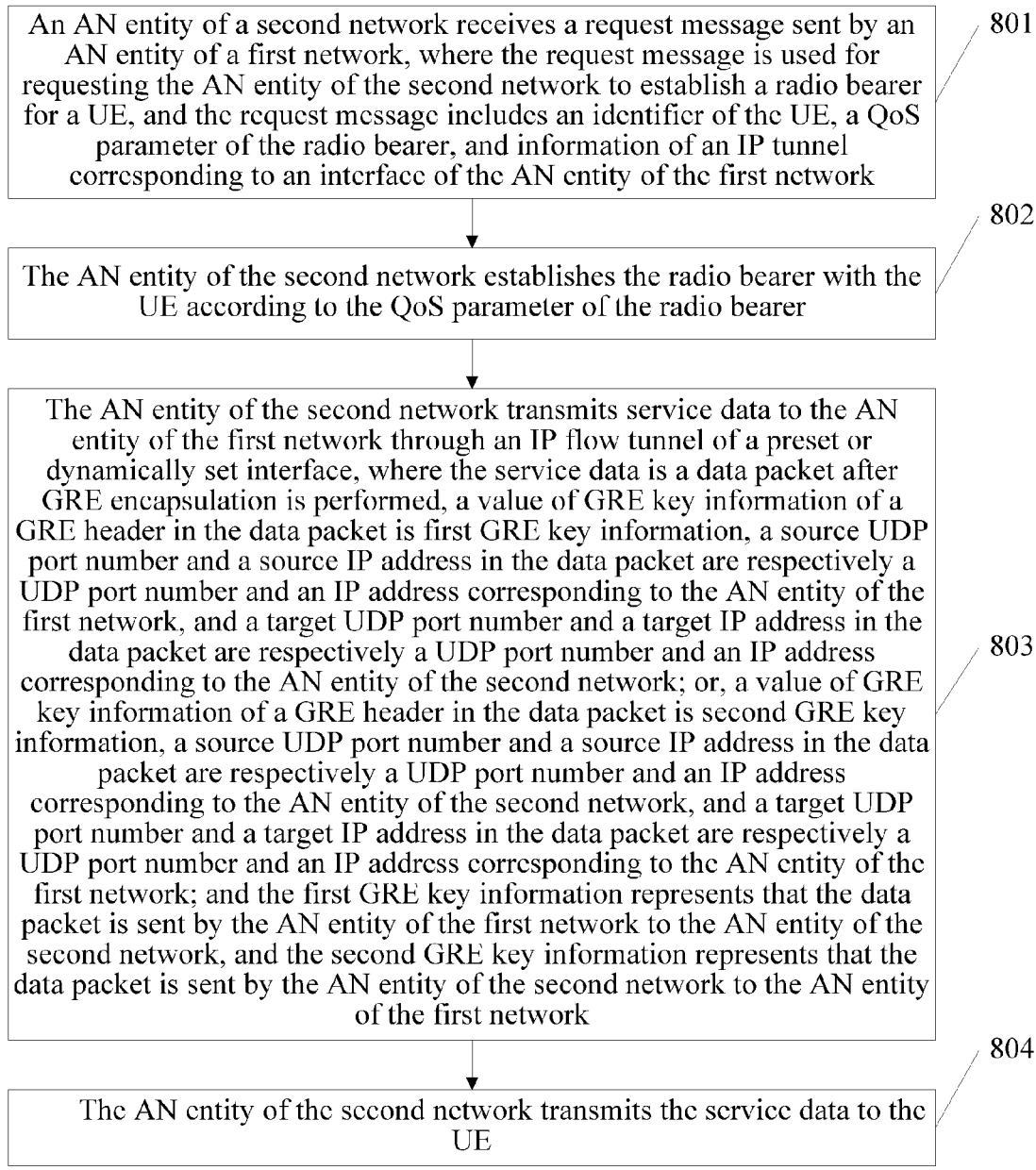
FIG. 9 is a schematic flowchart of another service data transmission method according to an embodiment of the present invention.

FIG. 9 is a schematic flowchart of another service data transmission method according to an embodiment of the present invention, and as shown in FIG. 9, the method includes the following steps.

801. An AN entity of a second network receives a request message sent by an AN entity of a first network, where the request message is used for requesting the AN entity of the second network to establish a radio bearer for a UE, and the request message includes an identifier of the UE, a QoS parameter of the radio bearer, and information about an IP tunnel corresponding to an interface of the AN entity of the first network.

As an optional implementation manner, in this embodiment of the present invention, an interface configured in the present invention may be used to accomplish transmission and exchange of a message, information, and service data between the AN entity of the first network and the AN entity of the second network.

Optionally, step 801 may specifically be that the AN entity receives, by using a preconfigured or dynamically configured interface, a request message sent by the AN entity of the first network, where the request message is used for requesting the UE to establish a bearer in an eHRPD network.

802. The AN entity of the second network establishes the radio bearer with the UE according to the QoS parameter of the radio bearer.

As an optional implementation manner, the second network is an eHRPD network, and step 802 may specifically include:

establishing, by the AN entity of the second network, a Radio Link Protocol RLP connection with the UE, where a QoS parameter of eHRPD used in the process of establishing an RLP connection is obtained through mapping according to the QoS parameter of the radio bearer.

As an optional implementation manner, the second network is an eHRPD network, and step 802 may specifically include:

performing, by the AN entity of the second network, mapping on the QoS parameter of the radio bearer to obtain a QoS parameter of eHRPD; and sending, by the AN entity of the second network, the mapped QoS parameter of eHRPD to the AN entity of the first network, so that the AN entity of the first network sends the mapped QoS parameter of eHRPD to the UE, to enable the UE to establish an RLP connection with the AN entity of the second network by using the mapped QoS parameter of eHRPD.

803. The AN entity of the second network transmits the service data to the AN entity of the first network through an IP flow tunnel of a preset or dynamically set interface, where the service data is a data packet after GRE encapsulation is performed, a value of GRE key information of a GRE header in the data packet is first GRE key information, a source UDP port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

Optionally, the preconfigured or dynamically configured interface may specifically be negotiated and configured by the AN entity of the first network and the AN entity of the second network by using a specific interface, and configuration information of an IP flow tunnel of the interface between the AN entity of the first network and the AN entity of the second network may be configured in the process of configuration, where the configuration information includes a UDP port number and an IP address of a side of the AN entity of the first network, a UDP port number and an IP address of a side of the AN entity of the second network, and first GRE key information and second GRE key information; and the AN entity of the first network and the AN entity of the second network may both store the configuration information of the IP flow tunnel.

The AN entity of the first network may further set a mapping relationship between first GRE key information and a first GTP tunnel (for example, S1-GTP) identifier, and a mapping relationship between second GRE key information and a second GTP tunnel (for example, S1-GTP) identifier; where the first GTP tunnel (for example, S1-GTP) identifier represents that a service gateway sends the service data to the AN entity of the first network, and the second GTP tunnel (for example, S1-GTP) identifier represents that the AN entity of the first network sends the service data to the service gateway.

The AN entity of the second network may further set a mapping relationship between first GRE key information and a radio bearer (for example, RLP connection) identifier, and a mapping relationship between second GRE key information and a radio bearer identifier; the AN entity sends the service data to the UE over the radio bearer by using the data packet received by a flow tunnel identified by the first GRE key information; and the AN entity receives a service from the UE over the radio bearer, and sends the received datagram to the AN entity of the first network through a flow tunnel identified by the second GRE key information.

Optionally, step 803 may specifically include:

sending, by the AN entity of the second network through the IP flow tunnel of the preconfigured or dynamically configured interface, a data packet including the service data to the AN entity of the first network; where the data packet is a data packet after GRE encapsulation is performed, the value of GRE key information of the GRE header in the data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network.

After acquiring, from the radio bearer, data of a service identified by TFT information (for example, specifically, IP data packet sent by the UE may be acquired, and the IP data packet is then decapsulated to obtain the service data), the AN entity of the second network may select, by using the mapping relationship between second GRE key information and a radio bearer identifier, an IP flow tunnel corresponding to the service, next, perform GRE encapsulation on the corresponding service data, where a value of a GRE key of the GRE header of the encapsulated data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network, and send the encapsulated data packet to the AN entity of the first network through the selected IP flow tunnel.

After acquiring the data packet, the AN entity of the first network decapsulates the data packet to obtain the UDP ports, the IP addresses, the second GRE key information, and the service data included in the data packet, next, determines a GTP tunnel corresponding to the service (for example, S1-GTP) by using the mapping relationship between second GRE key information and a second GTP tunnel (for example, S1-GTP) identifier, and transmits the service data to a service gateway through the determined GTP tunnel (for example, S1-GTP).

Optionally, step 803 may specifically include:

receiving, by the AN entity of the second network by using the preset interface, a data packet including the service data sent by the AN entity of the first network through an IP flow tunnel; where the data packet is a data packet after GRE encapsulation is performed, the value of GRE key information of the GRE header in the data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network.

After acquiring data of a service identified by TFT information from the GTP tunnel (for example, S1-GTP), the AN entity of the first network may select, by using the mapping relationship between first GRE key information and a first GTP tunnel (for example, S1-GTP) identifier, an IP flow tunnel corresponding to the service data, next, perform GRE encapsulation on the corresponding service, where a value of a GRE key of the GRE header of the encapsulated data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network, and send the encapsulated data packet to the AN entity of the second network through the selected IP flow tunnel.

After acquiring the data packet, the AN entity of the second network decapsulates the data packet to obtain the UDP ports, the IP addresses, the first GRE key information, and the service data included in the data packet, next, determines a radio bearer corresponding to the service by using the mapping relationship between first GRE key information and a radio bearer identifier, and transmits the service data to the UE by using the determined radio bearer. Certainly, when the service data is transmitted to the UE by using the radio bearer, the service data may be encapsulated into a local IP data packet, and the local IP data packet is transmitted to the UE.

Optionally, the preconfigured or dynamically configured interface may specifically be an XX-3 interface, and the specific interface may specifically be an XX-1 interface.

As an optional implementation manner, the interface used in step 801 and the interface used in step 802 may specifically be two different interfaces. For example, the interface used in step 801 is XX-1, and the interface used in step 803 is XX-3. Certainly, the AN entity of the second network also transmits a message or service data to the AN entity of the first network by using a corresponding interface.

804. The AN entity of the second network transmits the service data to the UE.

For example, the AN entity of the second network receives the service data sent by the AN of the first network and sends the service data to the UE, or, the AN entity of the second network receives the service data sent by the UE, and then transmits, by using step 803, the received service data to the AN entity of the first network. Therefore, step 803 and step 804 are not limited to a time order. For a manner in which the AN entity of the second network transmits the service data to the UE, refer to the manner provided in the foregoing embodiment for details.

In the technical solution, on the basis of the foregoing embodiment, it is implemented that an AN entity of a second network transmits service data with an AN entity of a first network through an IP flow tunnel of a preconfigured or dynamically configured interface, and at the same time it may be implemented that a UE transmits service data in an LTE network and an eHRPD network at the same time.

Figure 10:
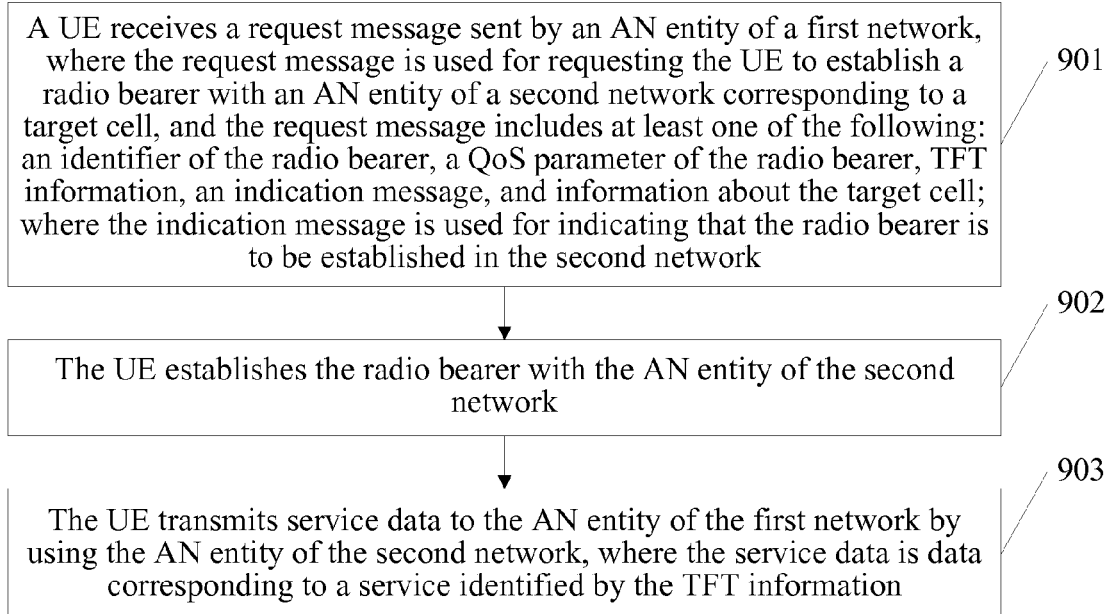
FIG. 10 is a schematic flowchart of another service data transmission method according to an embodiment of the present invention.

FIG. 10 is a schematic flowchart of another service data transmission method according to an embodiment of the present invention, and as shown in FIG. 10, the method includes the following steps.

901. A UE receives a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network.

902. The UE establishes the radio bearer with the AN entity of the second network.

903. The UE transmits service data to the AN entity of the first network by using the AN entity of the second network, where the service data is data corresponding to a service identified by the TFT information.

As an optional implementation manner, the first network is an LTE network, the second network is an eHRPD network, the AN entity of the first network may be a base station in the LTE network, and the target cell is a cell in the eHRPD network.

In the technical solution, a UE receives a request message sent by an AN entity of a first network, where the request message is used for requesting the UE to establish a radio bearer with an AN entity of a second network corresponding to a target cell, the UE establishes the radio bearer with the AN entity of the second network, and the UE transmits service data to the AN entity of the first network by using the AN entity of the second network. In this way, it may be implemented that a UE transmits service data in an LTE network and an eHRPD network at the same time.

Figure 11:
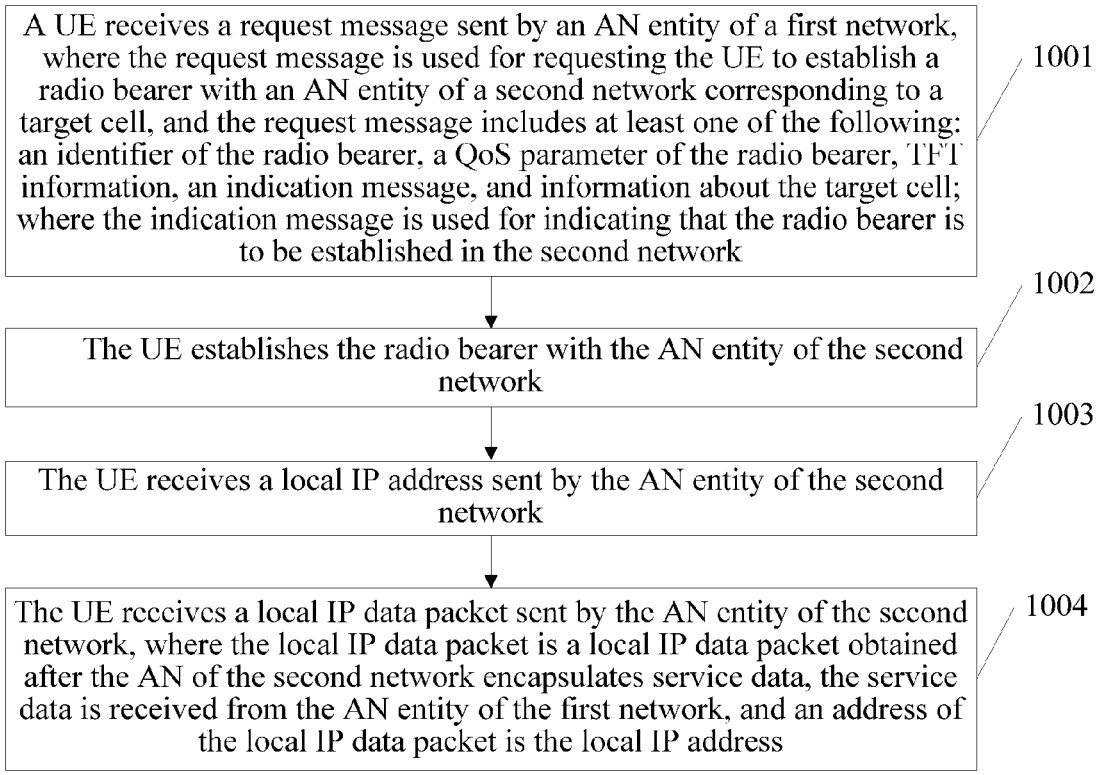
FIG. 11 is a schematic flowchart of another service data transmission method according to an embodiment of the present invention.

FIG. 11 is a schematic flowchart of another service data transmission method according to an embodiment of the present invention, and as shown in FIG. 11, the method includes the following steps.

1001. A UE receives a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network.

Optionally, the information about target cell may specifically include: carrier information of the target cell, PN information of the target cell, and other information.

As an optional implementation manner, the request message may further include a mapping relationship between an EPS bearer identifier as well as an EPS bearer and a radio bearer.

In this implementation manner, as the UE receives the mapping relationship between an EPS bearer identifier as well as an EPS bearer and a radio bearer sent by the AN entity of the first network, the UE may learn about a correspondence between a radio bearer and an EPS bearer in step 1001, where the mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to more desirably transmit or process data of the service.

Optionally, the request message sent by the AN entity of the first network and received by the UE in step 1001 may specifically include:

a session request message (for example, Session Management Request), a radio bearer identifier, the QoS parameter of the radio bearer corresponding to the radio bearer identifier, the indication message, and the information about the target cell, where the indication message indicates that the radio bearer is to be established in the second network; the session request message (for example, Session Management Request) includes the EPS bearer identifier and the TFT information; and the session request message (for example, Session Management Request) may further include a QoS parameter of a bearer corresponding to the EPS bearer identifier.

After acquiring the request message, the UE may acquire the session request message (for example, Session Management Request), and then parse the session request message (for example, Session Management Request) to obtain the EPS bearer identifier and the TFT information.

1002. The UE establishes the radio bearer with the AN entity of the second network.

As an optional implementation manner, the second network is an eHRPD network, and step 1002 may specifically include:

establishing, by the UE, a Radio Link Protocol RLP connection with the AN entity of the second network, where a QoS parameter of eHRPD used in the process of establishing an RLP connection is obtained through mapping according to the QoS parameter of the radio bearer.

Optionally, in this implementation manner, after step 1001, and before step 1002, the method may further include:

performing, by the UE, mapping according to the QoS parameter of the radio bearer to obtain the QoS parameter of eHRPD.

In this implementation manner, the QoS parameter of eHRPD used by the UE is obtained through mapping performed by the UE.

As an optional implementation manner, after step 1001, and before step 1002, the method may further include:

receiving, by the UE, the QoS parameter of eHRPD sent by the AN entity of the first network, where the QoS parameter of eHRPD is received by the AN entity of the first network from the AN entity of the second network, and the QoS parameter of eHRPD is obtained through mapping performed by the AN entity of the second network according to the QoS parameter of the radio bearer.

In this implementation manner, the QoS parameter of eHRPD used by the UE is obtained through mapping performed by the AN of the second network.

1003. The UE receives a local IP address sent by the AN entity of the second network.

1004. The UE receives a local IP data packet sent by the AN entity of the second network, where the local IP data packet is a local IP data packet obtained after the AN of the second network encapsulates the service data, the service data is received from the AN entity of the first network, and an address of the local IP data packet is the local IP address.

After receiving the service data sent by the AN entity of the first network, the AN entity of the second network may perform local IP encapsulation on the service to obtain a local IP data packet, where an address of the encapsulated local IP data packet is a local IP address allocated to the UE, and the AN entity of the second network sends the encapsulated local IP data packet to the UE.

Optionally, after receiving the local IP data packet, the UE may decapsulate the local IP data packet, that is, remove a local IP header.

As an optional implementation manner, a value of Supported High Layer Protocols (for example, Supported Higher Layer Protocols) in a configured attribute of the RLP connection established in step 1002 is 0x02 (for example, IPv4) or 0x03 (for example, IPv6); and step 1004 may specifically include:

receiving, by the UE, an IP data packet sent by the AN entity of the second network, where the IP data packet is an IP data packet sent by the AN entity of the first network and received by the AN, and the IP data packet is an IP data packet of a service identified by the TFT information.

As a data packet carried by an RLP connection bearer whose value of Supported High Layer Protocols (for example, Supported Higher Layer Protocols) is 0x02 (for example, IPv4) or 0x03 (for example, IPv6) is IP data, in this case, the AN entity does not need to encapsulate an IP data packet sent by the AN entity of the first network into a local IP data packet. Also, on the side of the UE, the UE does not need to encapsulate the service data that needs to be sent to the AN entity of the second network into a local IP data packet. The service data may be transmitted between the UE and the AN entity of the second network by using an IP data packet.

As an optional implementation manner, before step 1001, the method may further include:

receiving, by the UE, an indication message sent by the AN entity of the first network, where the indication message is used for specifying that the UE performs inter-system measurement; and performing, by the UE, inter-system measurement, and sending a report of the measurement to the AN entity of the first network, so that the AN entity of the first network selects, from cells included in a received measurement result, a cell with the strongest signal as the target cell of the UE.

In this implementation manner, it may be implemented that the target cell selected by the AN entity of the first network for the UE is selected by the AN entity of the first network according to the measurement result of the UE.

As an optional implementation manner, that the AN entity of the first network selects the target cell for the UE may further be that the AN entity of the first network selects, according to signal intensity of the eHRPD network cells and position information of the UE, from cells covering the position information, a cell with the strongest signal as the target cell of the UE.

In the technical solution, on the basis of the foregoing embodiment, it is implemented that a UE receives a local IP data packet sent by an AN entity of a first network, where the local IP data packet is service data sent by the AN entity of the first network and received by an AN, and encapsulates the service data into the local IP data packet. In this way, it may be implemented that a UE transmits service data in an LTE network and an eHRPD network at the same time.

Figure 12:
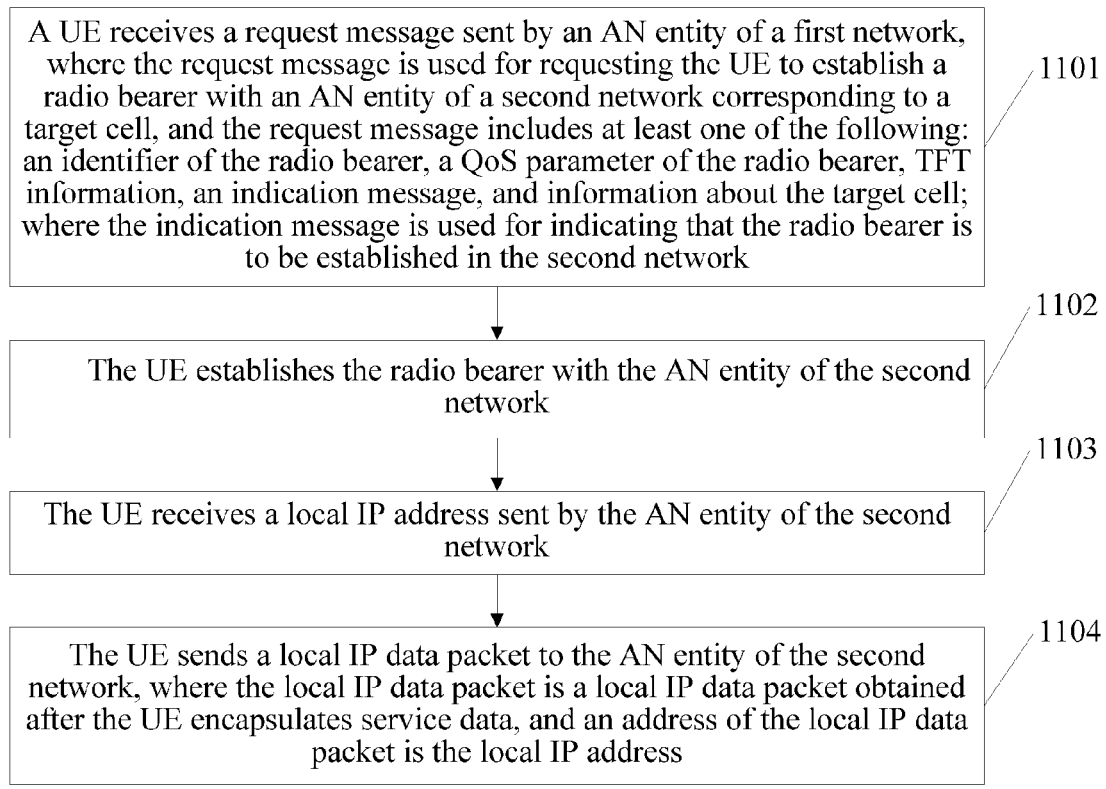
FIG. 12 is a schematic flowchart of another service data transmission method according to an embodiment of the present invention.

FIG. 12 is a schematic flowchart of another service data transmission method according to an embodiment of the present invention, and as shown in FIG. 12, the method includes the following steps.

1101. A UE receives a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network.

1102. The UE establishes the radio bearer with the AN entity of the second network.

As an optional implementation manner, step 1102 may specifically include:

establishing, by the UE, a Radio Link Protocol RLP connection with the AN entity of the second network, where a QoS parameter of eHRPD used in the process of establishing an RLP connection is obtained through mapping according to the QoS parameter of the radio bearer.

1103. The UE receives a local IP address sent by the AN entity of the second network.

1104. The UE sends a local IP data packet to the AN entity of the second network, where the local IP data packet is a local IP data packet obtained after the UE encapsulates service data, and an address of the local IP data packet is the local IP address.

In this way, after receiving the local IP data packet, the AN entity of the second network may decapsulate the local IP data packet, and transmit the service data obtained after decapsulation to the AN entity of the first network.

As an optional implementation manner, after step 1103, and before step 1104, the method may further include:

selecting, by the UE, data of a service identified by the TFT information; and encapsulating, by the UE, the selected service data into the local IP data packet whose address is the local IP address.

Optionally, encapsulation in an IP-local IP form may specifically be performed in this step.

As an optional implementation manner, a value of Supported High Layer Protocols (for example, Supported Higher Layer Protocols) in a configured attribute of the RLP connection established in step 1102 is 0x02 (for example, IPv4) or 0x03 (for example, IPv6); and step 1104 may specifically include:

sending, by the UE, an IP data packet to the AN entity of the second network, where the IP data packet is an IP data packet of data of a service identified by the TFT information.

In this implementation manner, after receiving the IP data packet sent by the UE, the AN entity of the second network may directly send the IP data packet to the AN entity of the first network without decapsulation.

In the technical solution, on the basis of the foregoing embodiment, it is implemented that a UE sends a local IP data packet to an AN entity of a second network. In this way, it may be implemented that a UE transmits service data in an LTE network and an eHRPD network at the same time.

Apparatus embodiments of the present invention are provided below, and the apparatus embodiments of the present invention are used for executing the methods implemented in method Embodiments 1 to 11 of the present invention. For ease of description, only parts related to the embodiments of the present invention are shown, and for specific technical details that are not disclosed, refer to Embodiment 1 of the present invention to Embodiment 11 of the present invention for implementation.

Figure 13:
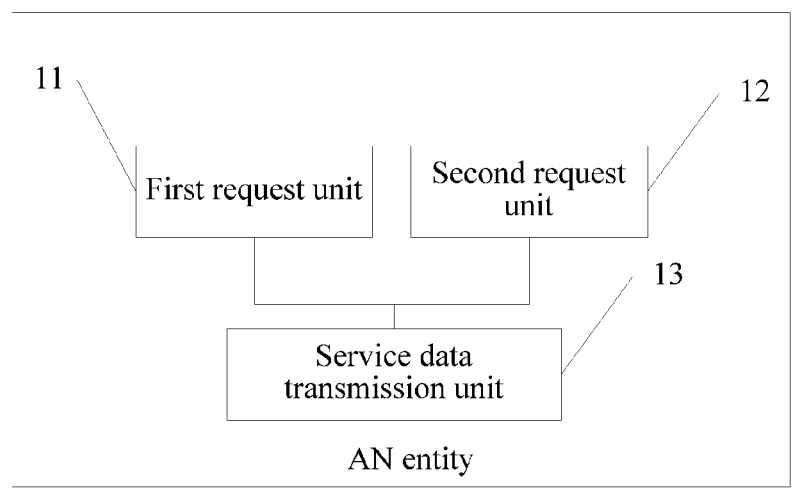
FIG. 13 is a schematic structural diagram of an AN entity according to an embodiment of the present invention.

FIG. 13 is a schematic structural diagram of an AN entity according to an embodiment of the present invention. The AN entity is an AN entity of a first network, and as shown in FIG. 13, includes: a first request unit 11, a second request unit 12, and a service data transmission unit 13.

The first request unit 11 is configured to send a first request message to an AN entity of a second network corresponding to a target cell in which a UE is located, so as to request the AN entity of the second network to establish a radio bearer for the UE, where the first request message includes an identifier of the UE and a QoS parameter of the radio bearer.

The second request unit 12 is configured to send a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network.

The service data transmission unit 13 is configured to: after the AN entity of the second network has established the radio bearer with the UE, transmit service data to the UE by using the AN entity of the second network, where the service data is data corresponding to a service identified by the TFT information.

Optionally, the first network is an LTE network, the second network is an eHRPD network, the AN entity of the first network may be a base station in the LTE network, and the target cell is a cell in the eHRPD network.

It should be noted that, that the AN entity of the first network transmits service data to the UE by using the AN entity of the second network may be understood as follows: The AN entity of the first network sends the service data to the AN entity of the second network, and the AN entity of the second network then sends the received service data to the UE; or, the UE sends the service data to the AN entity of the second network, and the AN entity of the second network then sends the received the service data to the AN entity of the first network.

As an optional implementation manner, while the AN entity of the first network transmits service data to the UE by using the AN entity of the second network, the UE may further transmit service data directly with the AN entity of the first network.

As an optional implementation manner, the base station may specifically be an eNB, and the AN entity may specifically be an eAN entity.

In the technical solution, an AN entity of a first network sends a first request message to an AN entity of a second network corresponding to a target cell in which a UE is located, so as to request the AN entity of the second network to establish a radio bearer for the UE; the AN entity of the first network sends a second request message to the UE, so as to request the UE to establish the radio bearer with the AN entity of the second network; and after the AN entity of the second network has established the radio bearer with the UE, the AN entity of the first network transmits service data to the UE by using the AN entity of the second network. In this way, it may be implemented that a UE transmits service data in an LTE network and an eHRPD network at the same time.

Figure 14:
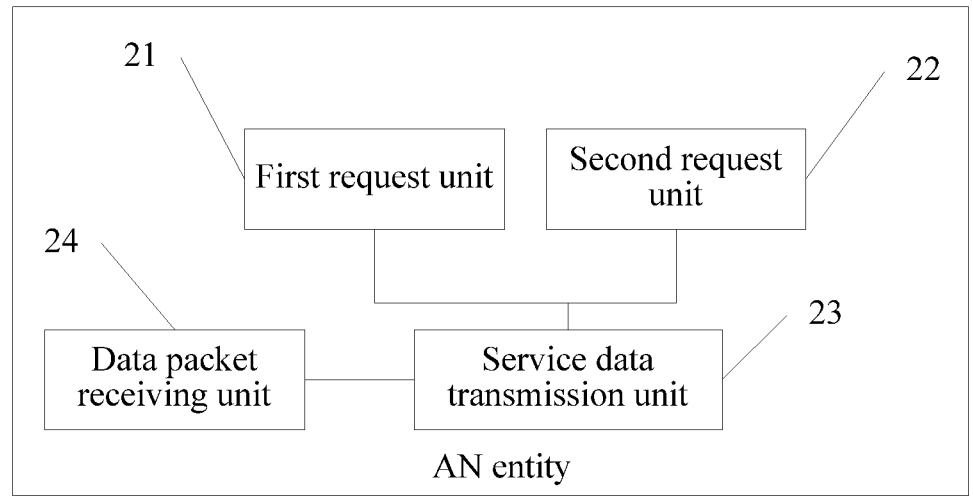
FIG. 14 is a schematic structural diagram of another AN entity according to an embodiment of the present invention.

FIG. 14 is a schematic structural diagram of another AN entity according to an embodiment of the present invention. The AN entity is an AN entity of a first network, and as shown in FIG. 14, includes: a first request unit 21, a second request unit 22, and a service data transmission unit 23, where.

The first request unit 21 is configured to send a first request message to an AN entity of a second network corresponding to a target cell in which a UE is located, so as to request the AN entity of the second network to establish a radio bearer for the UE, where the first request message includes an identifier of the UE and a QoS parameter of the radio bearer;

The second request unit 22 is configured to send a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network.

Optionally, the indication message may specifically be an indicator.

Optionally, the information about target cell may specifically include: carrier information of the target cell, pilot number (for example, Pilot Number, PN) information of the target cell, and other information.

Optionally, after the UE receives the second request message and the AN entity receives the first request message, a bearer may be established between the UE and the AN entity of the second network, and service data is transmitted on the established bearer.

As an optional implementation manner, the second request message may further include a mapping relationship between an EPS bearer identifier as well as an EPS bearer and a radio bearer.

In this implementation manner, the mapping relationship between an EPS bearer identifier as well as an EPS bearer and a radio bearer is sent to the UE, so that the UE learns about a correspondence between a radio bearer and an EPS bearer in the second request unit 22.

The mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to more desirably transmit or process data of the service.

Optionally, the EPS bearer identifier and the TFT information included in the second request message may specifically be sent by a mobile management entity (for example, Mobility Management Entity, MME), or may be sent by the MME in the form of a session request message (for example, a Session Management Request). In other words, the AN entity of the first network receives a session request message (for example, Session Management Request) sent by the MME, where the session request message (for example, Session Management Request) message includes the EPS bearer identifier and the TFT information.

Optionally, the AN entity of the first network may further receive a QoS parameter of a bearer corresponding to the EPS bearer identifier sent by an MME, or the QoS parameter of the bearer included in the session request message (for example, Session Management Request); and the AN entity of the first network may perform mapping, after receiving the QoS parameter of the bearer, on the QoS parameter to obtain the QoS parameter of the radio bearer, and refer to the following embodiments for details.

Optionally, the second request message sent by the second request unit 22 to the UE may specifically include:

the session request message (for example, Session Management Request), a radio bearer identifier, the QoS parameter of the radio bearer corresponding to the radio bearer identifier, the indication message, and the information about the target cell, where the indication message indicates that the radio bearer is to be established in the second network; the session request message (for example, Session Management Request) includes the EPS bearer identifier and the TFT information; and the session request message (for example, Session Management Request) may further include a QoS parameter of a bearer corresponding to the EPS bearer identifier.

After acquiring the second request message, the UE may acquire the session request message (for example, Session Management Request), and then parse the session request message (for example, Session Management Request) to obtain the EPS bearer identifier and the TFT information.

The service data transmission unit 23 is configured to send the service data to the AN entity of the second network, to enable the AN entity of the second network to send the service data to the UE.

Optionally, the service data transmission unit 23 may specifically send a service to the AN entity of the second network in an IP data packet form. That is, the service data transmission unit 23 sends an IP data packet of data of a service identified by the TFT information to the AN entity of the second network.

In this way, it may be implemented that, the AN entity of the first network transmits the service data to the AN entity of the second network, and the AN entity of the second network may transmit, after receiving the service data, the received service data to the UE, so as to implement that the UE transmits the service data between two networks at the same time.

As an optional implementation manner, the AN entity may further include:

a data packet receiving unit 24, configured to receive an IP data packet sent by a service gateway, and select, from the IP data packet, data of a service identified by the TFT information.

Optionally, the data packet receiving unit 24 may specifically be configured to receive multiple IP data packets sent by the service gateway, and select, from the multiple IP data packets, an IP data packet of the data of the service identified by the TFT information.

The service data transmission unit 23 then sends the selected IP data packet of the data of the service identified by the TFT information to the AN entity.

Optionally, the data packet receiving unit 24 may specifically receive, through a GTP tunnel (for example, S1-GTP), the IP data packet sent by the service gateway.

The data packet receiving unit 24 selects, from the IP data packet sent by the service gateway, the service data that needs to be transmitted to the AN entity of the second network, so that the service data transmission unit 23 sends the service data to the AN entity of the second network, to enable the AN entity of the second network to transmit the received service data to the UE.

Optionally, the IP data packet sent by the service gateway may belong to multiple pieces of service data, the data packet receiving unit 24 performs filtering by using the TFT information, and selects an IP data packet of the data of the service identified by the TFT information, and the service data transmission unit 23 sends the selected IP data packet of the data of the service to the AN entity of the second network. An IP data packet of another service may be, by using the prior art, directly sent by the AN entity of the first network to the UE (for example, sent in an LTE network). In this way, it may be implemented that the IP data packet sent by the service gateway is sent to the UE in two manners (for example, in one manner, sent to the UE by using the AN entity of the second network, and in the other manner, directly sent by the AN entity of the first network to the UE), so as to implement that the UE transmits service data in an LTE network and an eHRPD network at the same time.

As an optional implementation manner, the service data transmission unit 23 may further be specifically configured to receive the service data sent by the AN entity of the second network, where the service data is obtained after the AN entity of the second network receives a local IP data packet from the UE and decapsulates the local IP data packet, and the local IP data packet is obtained after the UE encapsulates the data of the service identified by the TFT information.

Optionally, when an IP data packet is transmitted between the UE and the AN entity of the second network, the data packet received by the service data transmission unit 23 is an IP data packet, and when a local IP data packet is transmitted between the UE and the AN entity of the second network, a data packet transmitted by the service data transmission unit 23 is a local IP data packet.

Optionally, that the service data transmission unit 23 receives the service data sent by the AN entity of the second network may specifically be that the service data transmission unit 23 receives an IP data packet of the service data sent by the AN entity of the second network.

Figure 15:
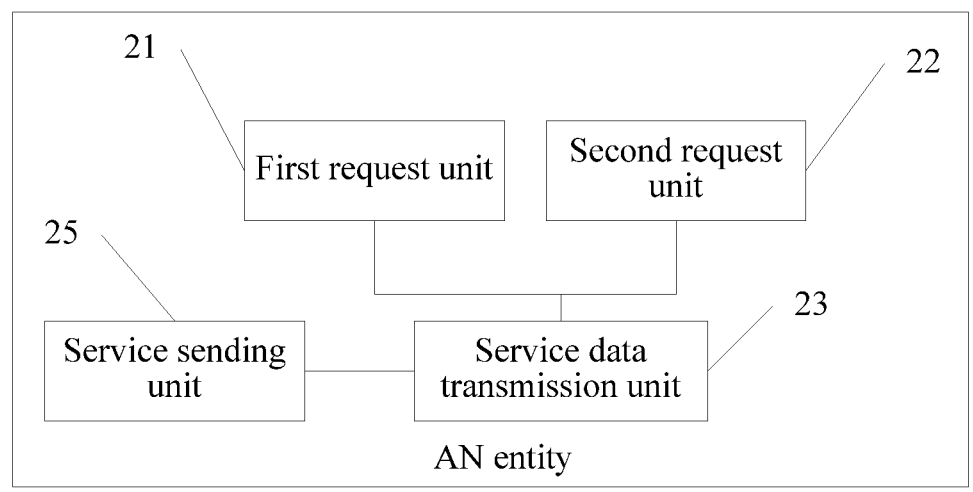
FIG. 15 is a schematic structural diagram of another AN entity according to an embodiment of the present invention.

As an optional implementation manner, as shown in FIG. 15, the AN entity may further include:

a service sending unit 25, configured to send the service data received by the service data transmission unit 23 to the service gateway.

Optionally, the service sending unit 25 may specifically send, to the service gateway through a GTP tunnel (for example, S1-GTP), the service data sent by the AN of the second network and received by the service data transmission unit 23.

As an optional implementation manner, the AN entity may further include:

a target cell selection unit (for example, and not shown), configured to select the target cell of the UE from the second network (for example, eHRPD network).

As an optional implementation manner, the AN entity may further include:

a first indication message sending unit (for example, and not shown), configured to send an indication message to the UE, where the indication message is used for specifying that the UE performs inter-system measurement;

a first measurement result receiving unit (for example, and not shown), configured to receive a measurement result sent by the UE, where the measurement result is a result of measurement performed by the UE according to the indication message, and the measurement result includes measurement results of multiple cells; and a target cell determining subunit (for example, and not shown), configured to select, from the multiple cells, a cell with the strongest signal as the target cell of the UE.

In this implementation manner, it may be implemented that the AN entity of the first network selects a suitable cell for the UE according to the measurement result of the UE.

Optionally, the target cell may specifically be a cell (for example, Sector).

As an optional implementation manner, the target cell selection unit may be further configured to select, according to signal intensity of cells of the second network and position information of the UE, from cells covering the position information, a cell with the strongest signal as the target cell of the UE.

In this implementation manner, the AN entity of the first network may select, according to signal intensity of cells of the second network and the position information of the UE, a suitable cell for the UE.

As an optional implementation manner, the first request message may further include cell list information, and the AN entity may further include:

a second indication message sending unit (for example, and not shown), configured to send an indication message to the UE, where the indication message is used for specifying that the UE performs inter-system measurement;

a second measurement result receiving unit (for example, and not shown), configured to receive a measurement result sent by the UE, where the measurement result is a result of measurement performed by the UE according to the indication message, and the measurement result includes the cell list information; and a target cell information receiving unit (for example, and not shown), configured to the information about target cell sent by the AN entity of the second network, where the target cell is a cell selected by the AN entity from the cell list information.

Optionally, the AN entity of the second network may specifically analyze the measurement result in the cell list information to select a cell most suitable for the UE as the target cell of the UE, or the AN entity of the second network may specifically analyze the measurement result in the cell list information, and select, in combination with idle network resources of cells, a cell most suitable for the UE as the target cell of the UE. For example, a cell with the strongest signal for the UE is selected as the target cell of the UE.

In this implementation manner, it may be implemented that the target cell is selected by the AN entity of the second network.

In the technical solution, on the basis of the foregoing embodiment, it may be implemented that an AN entity of a first network sends service data to an AN entity of a second network, and the AN entity of the second network may send, after receiving the service data, the service data to a UE, so as to implement that the UE transmits service data in an LTE network and an eHRPD network at the same time.

Figure 16:
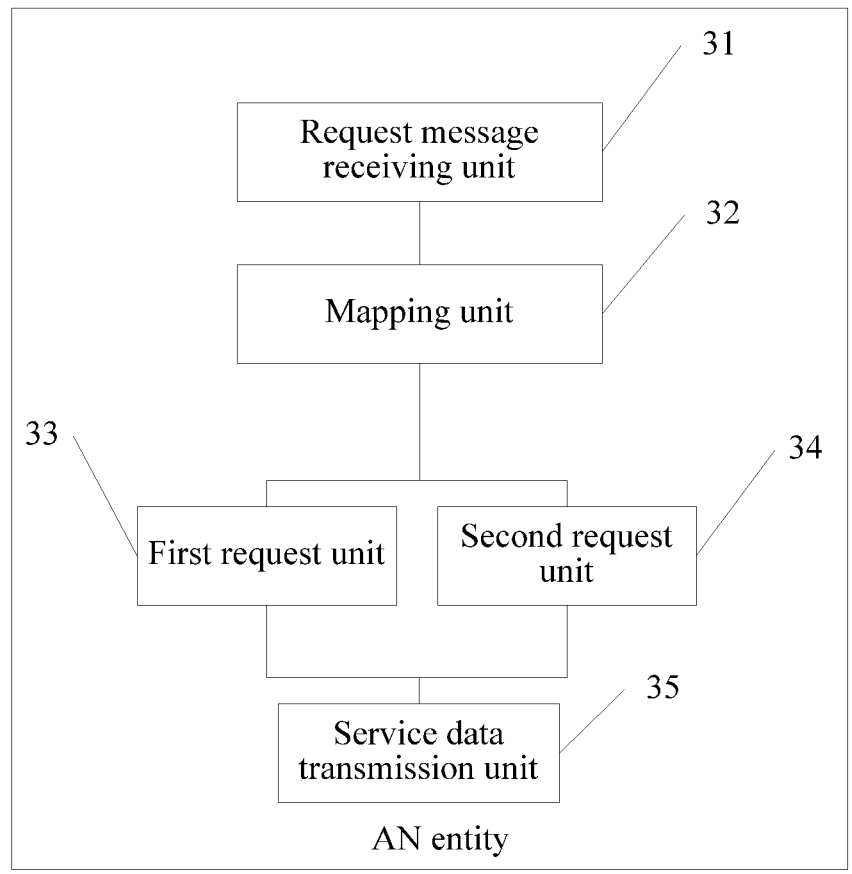
FIG. 16 is a schematic structural diagram of another AN entity according to an embodiment of the present invention.

FIG. 16 is a schematic structural diagram of another AN entity according to an embodiment of the present invention. The AN entity is an AN entity of a first network, and as shown in FIG. 16, includes: a request message receiving unit 31, a mapping unit 32, a first request unit 33, a second request unit 34, and a service data transmission unit 35

The request message receiving unit 31 is configured to receive a bearer update request message (for example, Bearer Setup Request) sent by an MME, where the bearer update request message (for example, Bearer Setup Request) includes an EPS bearer identifier, a QoS parameter of an EPS bearer, and TFT information.

As an optional implementation manner, the bearer update request message (for example, Bearer Setup Request) sent by the MME may specifically include a session request message (for example, Session Management Request), where the session request message (for example, Session Management Request) may specifically include the EPS bearer identifier, the QoS parameter of the bearer, and the TFT information.

Optionally, the bearer update request message (for example, Bearer Setup Request) may specifically further include an S1-tunnel endpoint identifier (for example, Tunnel Endpoint Identifier, TEID). In this way, the AN entity of the first network may specifically learn, by using the S1-TEID, which transmission tunnel the bearer specifically corresponds to.

Optionally, the EPS bearer identifier included in the bearer update request message (for example, Bearer Setup Request) sent by the MME may specifically be allocated by the MME to a UE, and the QoS parameter of the bearer and the TFT information may specifically be sent by a service gateway and received by the MME. Currently, the MME at the same time further receives an identifier of the UE, and at the same time the MME further sends the identifier of the UE to the AN entity of the first network, to enable the AN entity of the first network to determine the UE.

It should be noted that, for an implementation manner in which the AN entity of the first network receives an update bearer request message sent by the MME, and the MME receives a message that is sent by the service gateway and includes quality of service information and the TFT information, refer to an existing process of establishing a dedicated bearer in an LTE network for details, which are not elaborated herein.

The mapping unit 32 is configured to perform mapping according to the QoS parameter of the EPS bearer to obtain a QoS parameter of a radio bearer.

As an optional implementation manner, the mapping unit 32 may further be specifically configured to perform mapping on the QoS parameter of the bearer to obtain the QoS parameter of the radio bearer, and generate a mapping relationship between the bearer and the radio bearer.

The first request unit 33 is configured to send a first request message to an AN entity of a second network corresponding to a target cell in which the UE is located, so as to request the AN entity of the second network to establish a radio bearer for the UE, where the first request message includes the identifier of the UE and the QoS parameter of the radio bearer.

The second request unit 34 is configured to send a second request message to the UE, so as to request the UE to establish the radio bearer with the AN entity of the second network, where the second request message includes at least one of the following: an identifier of the radio bearer, the QoS parameter of the radio bearer, the TFT information, an indication message, and information about the target cell; and the indication message is used for indicating that the radio bearer is to be established in the second network.

As an optional implementation manner, the second request message may further include a mapping relationship between an EPS bearer identifier as well as an EPS bearer and a radio bearer.

In this implementation manner, the mapping relationship between an EPS bearer identifier as well as an EPS bearer and a radio bearer is sent to the UE, so that the UE learns about a correspondence between a radio bearer and an EPS bearer in the second request unit 34, where the mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to more desirably transmit or process data of the service.

The service data transmission unit 35 transmits, after the AN entity of the second network has established the radio bearer with the UE, service data to the UE by using the AN entity of the second network, where the service data is data corresponding to a service identified by the TFT information.

As an optional implementation manner, the first request message further includes information about an IP flow tunnel corresponding to an interface of the AN entity of the first network, and the service data transmission unit 35 may further be specifically configured to transmit the service data to the AN entity of the second network through an IP flow tunnel corresponding to a preconfigured or dynamically configured interface; where the service data is a data packet after GRE encapsulation is performed, a value of GRE key information of a GRE header in the data packet is first GRE key information, a source UDP port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

The preconfigured or dynamically configured interface may specifically be negotiated and configured by the AN entity of the first network and the AN entity of the second network by using a specific interface, and configuration information of an IP flow tunnel of the interface between the AN entity of the first network and the AN entity of the second network may be configured in the process of configuration, where the configuration information includes a UDP port number and an IP address of a side of the AN entity of the first network, a UDP port number and an IP address of a side of the AN entity of the second network, and the first GRE key information and the second GRE key information; and the AN entity of the first network and the AN entity of the second network may both store the configuration information of the IP flow tunnel.

The AN entity of the first network may further set a mapping relationship between first GRE key information and a first GTP tunnel (for example, S1-GTP) identifier, and a mapping relationship between second GRE key information and a second GTP tunnel (for example, S1-GTP) identifier; where the first GTP tunnel (for example, S1-GTP) identifier represents that a service gateway sends the service data to the AN entity of the first network, and the second GTP tunnel (for example, S1-GTP) identifier represents that the AN entity of the first network sends the service data to the service gateway.

The AN entity of the second network may further set a mapping relationship between first GRE key information and a radio bearer (for example, RLP connection) identifier, and a mapping relationship between second GRE key information and a radio bearer identifier; the AN entity sends the service data to the UE over the radio bearer by using the data packet received by a flow tunnel identified by the first GRE key information; and the AN entity receives a service from the UE over the radio bearer, and sends the received datagram to the AN entity of the first network through a flow tunnel identified by the second GRE key information.

Optionally, the service data transmission unit 35 may be further configured to send a data packet including the service data to the AN entity of the second network through an IP flow tunnel of a preconfigured or dynamically configured interface, where the data packet is a data packet after GRE encapsulation is performed, the value of GRE key information of the GRE header in the data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network;

After acquiring data of the service identified by the TFT information from a GTP tunnel (for example, S1-GTP), the AN entity of the first network may select, by using the mapping relationship between first GRE key information and a first GTP tunnel (for example, S1-GTP) identifier, an IP flow tunnel corresponding to the service data, next, perform GRE encapsulation on the corresponding service, where a value of a GRE key of the GRE header of the encapsulated data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network, and send the encapsulated data packet to the AN entity of the second network through the selected IP flow tunnel.

After acquiring the data packet, the AN entity of the second network decapsulates the data packet to obtain the UDP ports, the IP addresses, the first GRE key information, and the service data included in the data packet, next, determines a radio bearer corresponding to the service by using the mapping relationship between first GRE key information and a radio bearer identifier, and transmits the service data to the UE by using the determined radio bearer. Certainly, when the service data is transmitted to the UE by using the radio bearer, the service data may be encapsulated into a local IP data packet, and the local IP data packet is transmitted to the UE.

Optionally, the service data transmission unit 35 may be further configured to receive, by using a preconfigured or dynamically configured interface, a data packet including the service data sent by the AN entity of the second network through the IP flow tunnel; where the data packet is a data packet after GRE encapsulation is performed, the value of GRE key information of the GRE header in the data packet is second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network.

After acquiring, from the radio bearer, data of the service identified by the TFT information (for example, specifically, IP data packet sent by the UE may be acquired, and the IP data packet is then decapsulated to obtain the service data), the AN entity of the second network may select, by using the mapping relationship between second GRE key information and a radio bearer identifier, an IP flow tunnel corresponding to the service, next, perform GRE encapsulation on the corresponding service data, where a value of a GRE key of the GRE header of the encapsulated data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network, and send the encapsulated data packet to the AN entity of the first network through the selected IP flow tunnel.

After acquiring the data packet, the AN entity of the first network decapsulates the data packet to obtain the UDP ports, the IP addresses, the second GRE key information, and the service data included in the data packet, next, determines, by using the mapping relationship between second GRE key information and a second GTP tunnel (for example, S1-GTP) identifier, a GTP tunnel corresponding to the service (for example, S1-GTP), and transmits the service data to a service gateway through the determined GTP tunnel (for example, S1-GTP).

Optionally, the preconfigured or dynamically configured interface may specifically be an XX-3 interface, and the specific interface may specifically be an XX-1 interface.

As an optional implementation manner, the interface used by the first request unit 33 and the interface used by the service data transmission unit 35 may specifically be two different interfaces. For example, the interface used by the first request unit 33 is XX-1, and the interface used by the service data transmission unit 35 is XX-3. Certainly, the AN entity of the second network also transmits a message or service data to the AN entity of the first network by using a corresponding interface.

In the technical solution, on the basis of the foregoing embodiment, it is implemented that service data is transmitted to an AN entity through an IP flow tunnel of a preconfigured or dynamically configured interface, and at the same time, it may be implemented that a UE transmits service data in an LTE network and an eHRPD network at the same time.

Figure 17:
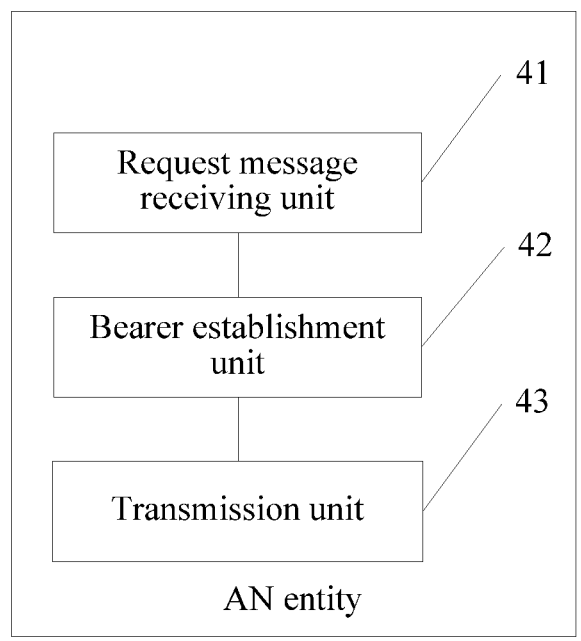
FIG. 17 is a schematic structural diagram of an AN entity according to an embodiment of the present invention.

FIG. 17 is a schematic structural diagram of an AN entity according to an embodiment of the present invention. As shown in FIG. 17, the AN entity includes: a request message receiving unit 41, a bearer establishment unit 42, and a transmission unit 43.

The request message receiving unit 41 is configured to receive a request message sent by an AN entity of a first network, where the request message is used for requesting an AN entity of a second network to establish a radio bearer for a UE, and the request message includes an identifier of the UE and a QoS parameter of the radio bearer.

The bearer establishment unit 42 is configured to establish the radio bearer with the UE according to the QoS parameter of the radio bearer.

The transmission unit 43 is configured to transmit service data between the AN entity of the first network and the UE.

As an optional implementation manner, the first network is an LTE network, the second network is an eHRPD network, the AN entity of the first network may be a base station in the LTE network, and a target cell is a cell in the eHRPD network.

Optionally, the radio bearer may specifically be established with the UE in the second network.

In the technical solution, an AN entity of a second network receives a request message sent by an AN entity of a first network, where the request message is used for requesting the AN entity of the second network to establish a radio bearer for a UE, and the request message includes an identifier of the UE and a QoS parameter of the radio bearer; the AN entity of the second network establishes the radio bearer with the UE according to the QoS parameter of the radio bearer; and the AN entity of the second network transmits service data between the AN entity of the first network and the UE. In this way, it may be implemented that a UE transmits a service before two networks at the same time.

Figure 18:
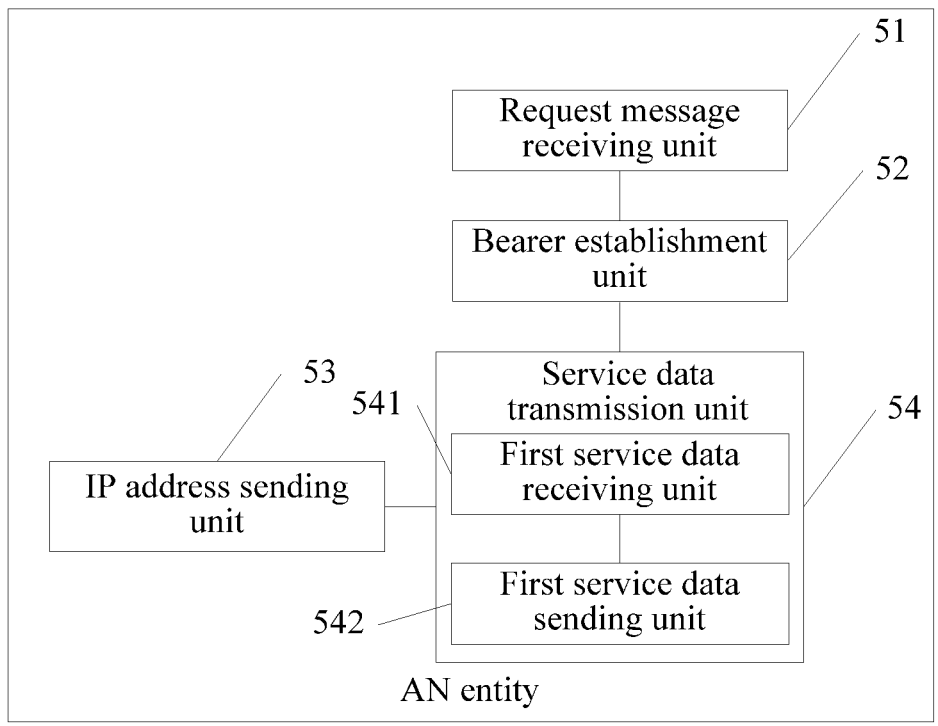
FIG. 18 is a schematic structural diagram of an AN entity according to an embodiment of the present invention.

FIG. 18 is a schematic structural diagram of an AN entity according to an embodiment of the present invention. As shown in FIG. 18, the AN entity includes: a request message receiving unit 51, a bearer establishment unit 52, an IP address sending unit 53, and a transmission unit 54.

The request message receiving unit 51 is configured to receive a request message sent by an AN entity of a first network, where the request message is used for requesting an AN entity of a second network to establish a radio bearer for a UE, and the request message includes an identifier of the UE and a QoS parameter of the radio bearer.

The bearer establishment unit 52 is configured to establish the radio bearer with the UE according to the QoS parameter of the radio bearer.

As an optional implementation manner, the second network is an eHRPD network, and the bearer establishment unit 52 may be further configured to establish a Radio Link Protocol RLP connection with the UE, where a QoS parameter of eHRPD used in the process of establishing an RLP connection is obtained through mapping according to the QoS parameter of the radio bearer.

It should be noted that, a process that the AN entity establishes an RLP connection with the UE is common knowledge, which is not elaborated herein. However, in the present invention, a QoS parameter of eHRPD used in the process that the AN entity establishes an RLP connection with the UE is obtained through mapping according to the QoS parameter of the radio bearer, where the QoS parameter of the radio bearer is sent by the AN entity of the second network.

Optionally, in this implementation manner, the used QoS parameter of eHRPD may specifically be the QoS parameter of eHRPD used by the UE, and may specifically be obtained after the UE performs mapping by using the QoS parameter of the radio bearer, where the QoS parameter of the radio bearer is sent by the AN entity of the first network.

As an optional implementation manner, the second network is an eHRPD network, and the AN entity may further include:

a mapping unit, configured to perform mapping on the QoS parameter of the radio bearer to obtain a QoS parameter of eHRPD; and a QoS parameter sending unit, configured to send the mapped QoS parameter of eHRPD to the AN entity of the first network, so that the AN entity of the first network sends the mapped QoS parameter of eHRPD to the UE, to enable the UE to establish an RLP connection with the AN entity of the second network by using the mapped QoS parameter of eHRPD.

In this implementation manner, the QoS parameter of eHRPD used in establishing an RLP connection may specifically be obtained after the AN entity of the second network performs mapping on the received QoS parameter of the radio bearer, where the QoS parameter of the radio bearer is sent by the AN entity of the first network.

The IP address sending unit 53 is configured to send a local IP address to the UE.

As an optional implementation manner, the local IP address sent to the UE may specifically be a local IP address allocated by the AN entity of the second network to the UE.

As an optional implementation manner, the local IP address sent to the UE may further specifically be a local IP address sent by another device and received by the AN entity of the second network. That is, the local IP address sent to the UE is allocated by the another device to the UE.

The service data transmission unit 54 may include:

a first service data receiving unit 541, configured to receive service data sent by the AN entity of the first network, and encapsulate the received service data into a local IP data packet, where an address of the local IP data packet is the local IP address; and Optionally, the first service data receiving unit 541 may specifically perform encapsulation in an IP-local IP manner.

a first service data sending unit 542, configured to send the encapsulated local IP data packet to the UE.

Figure 19:
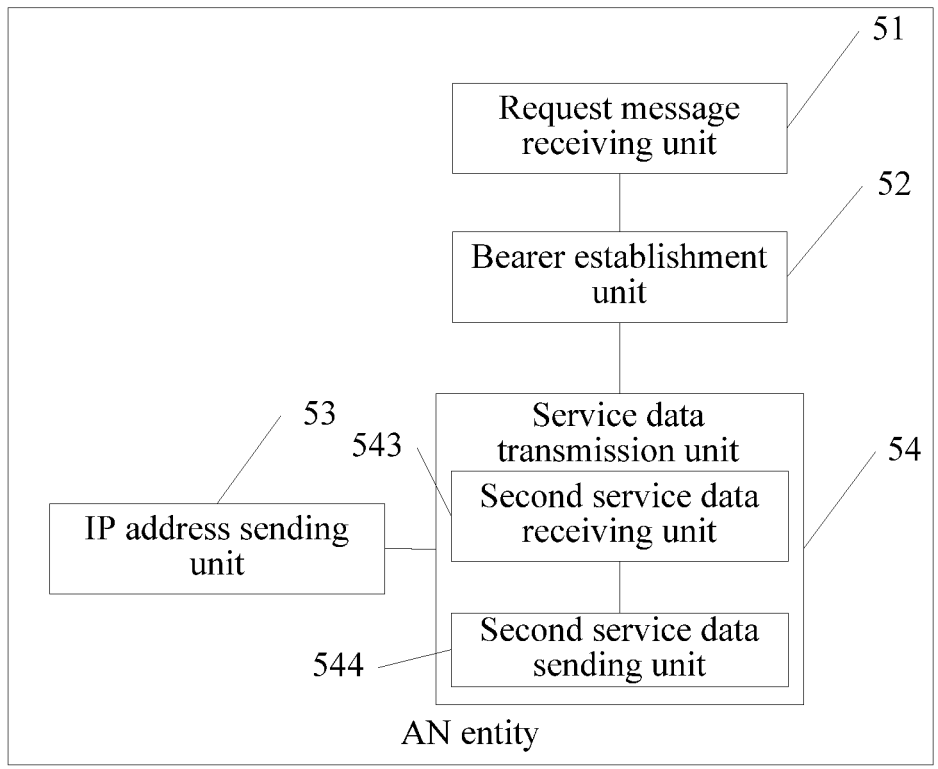
FIG. 19 is a schematic structural diagram of an AN entity according to an embodiment of the present invention.

As an optional implementation manner, as shown in FIG. 19, the transmission unit 54 may further include:

a second service data receiving unit 543, configured to receive a local IP address data packet sent by the UE, and decapsulate the received local IP data packet to obtain the service data, where an address corresponding to the local IP data packet is the local IP address; and a second service data sending unit 544, configured to send the service data obtained after decapsulation to the AN entity of the first network.

Optionally, in this implementation manner, the second service data receiving unit 543 may be further configured to receive the local IP data packet sent by the UE, and perform processing of conversion of a local IP data packet into an IP data packet on the received local IP data packet to obtain an IP data packet; where the address of the local IP data packet is the local IP address.

The second service data sending unit 544 may be further configured to send the IP data packet obtained after the processing to the AN entity of the first network.

In this implementation manner, it may be implemented that the service data is transmitted between the AN entity of the second network and the AN of the first network by using an IP data packet.

As an optional implementation manner, a value of Supported High Layer Protocols (for example, Supported Higher Layer Protocols) in a configured attribute of the RLP connection established by the bearer establishment unit 52 is 0x02 (for example, IPv4) or 0x03 (for example, IPv6).

The first service data receiving unit 541 may be further configured to receive the service data sent by the AN entity of the first network; or, receive an IP data packet of the service data sent by the AN entity of the first network.

The first service data sending unit 542 may be further configured to send the received service data to the UE, or, send the received IP data packet of the service data to the UE.

The second service data receiving unit 543 may be further configured to receive the IP data packet sent by the UE.

The second service data sending unit 544 may be further configured to send, to the AN entity of the first network, the IP data packet sent by the UE.

As a data packet carried by an RLP connection bearer whose value of Supported High Layer Protocols (for example, Supported Higher Layer Protocols) is 0x02 (for example, IPv4) or 0x03 (for example, IPv6) is IP data, in this case, the AN entity of the second network does not need to encapsulate a service sent by the AN entity of the first network into an IP data packet whose address is the local IP address. Also, on the side of the UE, the UE does not need to encapsulate a service that needs to be sent to the AN entity of the second network into an IP data packet whose address is the local IP address. The UE may transmit service data to the AN entity of the second network by using an IP data packet.

As an optional implementation manner, the transmission unit 53 may further be specifically configured to transmit the service data to the AN entity of the first network through an IP flow tunnel of a preset or dynamically set interface, where the service data is a data packet after GRE encapsulation is performed, a value of GRE key information of a GRE header in the data packet is first GRE key information, a source UDP port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

Optionally, the preconfigured or dynamically configured interface may specifically be negotiated and configured by the AN entity of the first network and the AN entity of the second network by using a specific interface, and configuration information of an IP flow tunnel of the interface between the AN entity of the first network and the AN entity of the second network may be configured in the process of configuration, where the configuration information includes a UDP port number and an IP address of a side of the AN entity of the first network, a UDP port number and an IP address of a side of the AN entity of the second network, and the first GRE key information and the second GRE key information; and the AN entity of the first network and the AN entity of the second network may both store the configuration information of the IP flow tunnel.

The AN entity of the first network may further set a mapping relationship between first GRE key information and a first GTP tunnel (for example, S1-GTP) identifier, and a mapping relationship between second GRE key information and a second GTP tunnel (for example, S1-GTP) identifier; where the first GTP tunnel (for example, S1-GTP) identifier represents that a service gateway sends the service data to the AN entity of the first network, and the second GTP tunnel (for example, S1-GTP) identifier represents that the AN entity of the first network sends the service data to the service gateway.

The AN entity of the second network may further set a mapping relationship between first GRE key information and a radio bearer (for example, RLP connection) identifier, and a mapping relationship between second GRE key information and a radio bearer identifier; the AN entity sends the service data to the UE over the radio bearer by using the data packet received by a flow tunnel identified by the first GRE key information; and the AN entity receives a service from the UE over the radio bearer, and sends the received datagram to the AN entity of the first network through a flow tunnel identified by the second GRE key information.

Optionally, the transmission unit 53 may further be specifically configured to send, by using an IP flow tunnel of a preconfigured or dynamically configured interface, a data packet including the service data to the AN entity of the first network; where the data packet is a data packet after GRE encapsulation is performed, the value of GRE key information of the GRE header in the data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network.

After acquiring, from the radio bearer, data of a service identified by TFT information (for example, specifically, IP data packet sent by the UE may be acquired, and the IP data packet is then decapsulated to obtain the service data), the AN entity of the second network may select, by using the mapping relationship between second GRE key information and a radio bearer identifier, an IP flow tunnel corresponding to the service, next, perform GRE encapsulation on the corresponding service data, where a value of a GRE key of the GRE header of the encapsulated data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network, and send the encapsulated data packet to the AN entity of the first network through the selected IP flow tunnel.

After acquiring the data packet, the AN entity of the first network decapsulates the data packet to obtain the UDP ports, the IP addresses, the second GRE key information, and the service included in the data packet, next, determines, by using the mapping relationship between second GRE key information and a second GTP tunnel (for example, S1-GTP) identifier, a GTP tunnel corresponding to the service (for example, S1-GTP), and transmits the service data to a service gateway through the determined GTP tunnel (for example, S1-GTP).

Optionally, the transmission unit 53 may further be specifically configured to receive, by using a preset interface, a data packet including the service data sent by the AN entity of the first network through an IP flow tunnel; where the data packet is a data packet after GRE encapsulation is performed, the value of GRE key information of the GRE header in the data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network.

After acquiring, from a GTP tunnel, data of a service identified by TFT information (for example, S1-GTP), the AN entity of the first network may select, by using the mapping relationship between first GRE key information and a first GTP tunnel (for example, S1-GTP) identifier, an IP flow tunnel corresponding to the service data, next, perform GRE encapsulation on the corresponding service, where a value of a GRE key of the GRE header of the encapsulated data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network, and send the encapsulated data packet to the AN entity of the second network through the selected IP flow tunnel.

After acquiring the data packet, the AN entity of the second network decapsulates the data packet to obtain the UDP ports, the IP addresses, the first GRE key information, and the service data included in the data packet, next, determines, by using the mapping relationship between first GRE key information and a radio bearer identifier, a radio bearer corresponding to the service, and transmits the service data to the UE by using the determined radio bearer. Certainly, when the service data is transmitted to the UE by using the radio bearer, the service data may be encapsulated into a local IP data packet, and the local IP data packet is transmitted to the UE.

Optionally, the preconfigured or dynamically configured interface may specifically be an XX-3 interface, and the specific interface may specifically be an XX-1 interface.

As an optional implementation manner, the interface used by the request message receiving unit 51 and the interface used by the service data transmission unit 53 may specifically be two different interfaces. For example, the interface used by the request message receiving unit 51 is XX-1, and the interface used by the transmission unit 53 is XX-3. Certainly, the AN entity also transmits a message or service data to the AN entity of the first network by using a corresponding interface.

As an optional implementation manner, the request message further includes cell list information, and the AN entity may further include:

a target cell selection unit, configured to select a target cell of the UE from the cell list information; and a target cell information sending unit, configured to send information about the target cell to the AN entity of the first network.

Optionally, the AN entity of the second network may specifically analyze the measurement result in the cell list information to select a cell most suitable for the UE as the target cell of the UE, or the AN entity of the second network may specifically analyze the measurement result in the cell list information, and select, in combination with idle network resources of cells, a cell most suitable for the UE as the target cell of the UE. For example, a cell with the strongest signal for the UE is selected as the target cell of the UE.

In this implementation manner, it may be implemented that the target cell is selected by the AN entity of the second network.

In the technical solution, on the basis of the foregoing embodiment, it is implemented that service data is transmitted to an AN entity of a first network through an IP flow tunnel of a preconfigured or dynamically configured interface, and at the same time, it may be implemented that a UE transmits service data in an LTE network and an eHRPD network at the same time.

Figure 20:
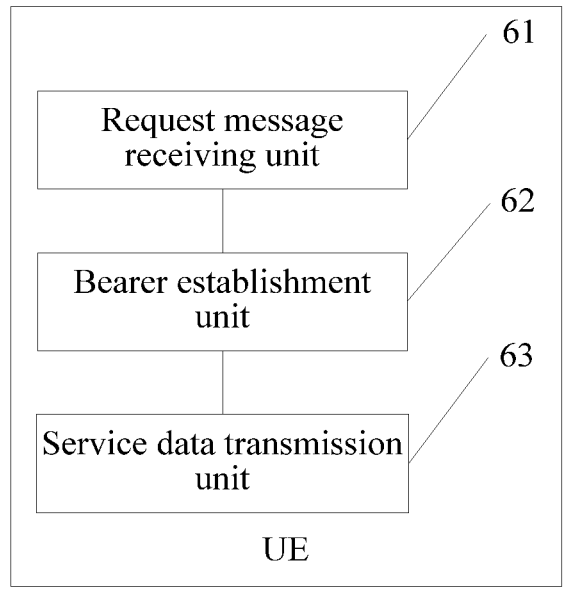
FIG. 20 is a schematic structural diagram of a UE according to an embodiment of the present invention.

FIG. 20 is a schematic structural diagram of a UE according to an embodiment of the present invention, and as shown in FIG. 20, the UE includes: a request message receiving unit 61, a bearer establishment unit 62, and a service data transmission unit 63.

The request message receiving unit 61 is configured to receive a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network.

The bearer establishment unit 62 is configured to establish the radio bearer with the AN entity of the second network.

The service data transmission unit 63 is configured to transmit service data to the AN entity of the first network by using the AN entity of the second network, where the service data is data corresponding to a service identified by the TFT information.

As an optional implementation manner, the first network is an LTE network, the second network is an eHRPD network, the AN entity of the first network may be a base station in the LTE network, and the target cell is a cell in the eHRPD network.

In the technical solution, a UE receives a request message sent by an AN entity of a first network, where the request message is used for requesting the UE to establish a radio bearer with an AN entity of a second network corresponding to a target cell, the UE establishes the radio bearer with the AN entity of the second network, and the UE transmits service data to the AN entity of the first network by using the AN entity of the second network. In this way, it may be implemented that a UE transmits service data in an LTE network and an eHRPD network at the same time.

Figure 21:
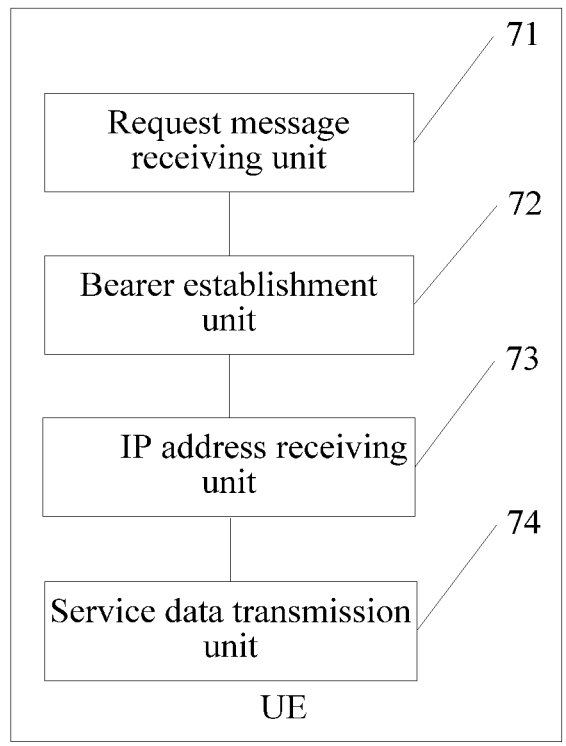
FIG. 21 is a schematic structural diagram of a UE according to an embodiment of the present invention.

FIG. 21 is a schematic structural diagram of a UE according to an embodiment of the present invention, and as shown in FIG. 21, the UE includes: a request message receiving unit 71, a bearer establishment unit 72, an IP address receiving unit 73, and a service data transmission unit 74.

The request message receiving unit 71 is configured to receive a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network.

Optionally, the indication message may specifically be an indicator.

Optionally, the information about target cell may specifically include: carrier information of the target cell, PN information of the target cell, and other information.

As an optional implementation manner, the request message may further include a mapping relationship between an EPS bearer identifier as well as an EPS bearer and a radio bearer.

In this implementation manner, the UE receives the mapping relationship between an EPS bearer identifier as well as an EPS bearer and a radio bearer sent by the AN entity of the first network, and the UE may learn about a correspondence between a radio bearer and an EPS bearer received by the request message receiving unit 71, where the mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to more desirably transmit or process data of the service.

Optionally, the request message sent by the AN entity of the first network and received by the request message receiving unit 71 may specifically include:

a session request message (for example, Session Management Request), a radio bearer identifier, the QoS parameter of the radio bearer corresponding to the radio bearer identifier, the indication message, and the information about the target cell, where the indication message indicates that the radio bearer is to be established in the second network; the session request message (for example, Session Management Request) includes the EPS bearer identifier and the TFT information; and the session request message (for example, Session Management Request) may further include a QoS parameter of a bearer corresponding to the EPS bearer identifier.

After acquiring the request message, the UE may acquire the session request message (for example, Session Management Request), and then parse the session request message (for example, Session Management Request) to obtain the EPS bearer identifier and the TFT information.

The bearer establishment unit 72 is configured to establish the radio bearer with the AN entity of the second network.

As an optional implementation manner, the second network is an eHRPD network, and the bearer establishment unit 72 may be further configured to establish a Radio Link Protocol RLP connection with the AN entity of the second network, where a QoS parameter of eHRPD used in the process of establishing an RLP connection is obtained through mapping according to the QoS parameter of the radio bearer.

As an optional implementation manner, the UE may further include:

a QoS parameter receiving unit (not shown), configured to receive a QoS parameter of eHRPD sent by the AN entity of the first network, where the QoS parameter of eHRPD is received by the AN entity of the first network from the AN entity of the second network, and the QoS parameter of eHRPD is obtained through mapping performed by the AN entity of the second network according to the QoS parameter of the radio bearer.

In this implementation manner, the QoS parameter of eHRPD used by the UE is obtained through mapping performed by the AN of the second network.

As an optional implementation manner, the UE may further include:

a mapping unit (not shown), configured to perform mapping according to the QoS parameter of the radio bearer to obtain a QoS parameter of eHRPD.

In this implementation manner, the QoS parameter of eHRPD used by the UE is obtained through mapping performed by the UE.

The IP address receiving unit 73 is configured to receive a local IP address sent by the AN entity of the second network.

The service data transmission unit 74 is configured to receive a local IP data packet sent by the AN entity of the second network, where the local IP data packet is a local IP data packet obtained after the AN of the second network encapsulates the service data, the service data is received from the AN entity of the first network, and an address of the local IP data packet is the local IP address.

After receiving the service data sent by the AN entity of the first network, the AN entity of the second network may perform local IP encapsulation on the service, and encapsulate the service into a local IP data packet, where an address of the encapsulated local IP data packet is a local IP address allocated to the UE, and the AN entity of the second network sends the encapsulated local IP data packet to the UE.

Optionally, after receiving the local IP data packet, the UE may decapsulate the local IP data packet, that is, remove a local IP header.

As an optional implementation manner, a value of Supported High Layer Protocols (for example, Supported Higher Layer Protocols) in a configured attribute of the RLP connection established by the bearer establishment unit 72 is 0x02 (for example, IPv4) or 0x03 (for example, IPv6).

The service data transmission unit 74 may further be specifically configured to receive an IP data packet sent by the AN entity of the second network, where the IP data packet is an IP data packet sent by the AN entity of the first network and received by the AN, and the IP data packet is an IP data packet of a service identified by the TFT information.

As a data packet carried by an RLP connection bearer whose value of Supported High Layer Protocols (for example, Supported Higher Layer Protocols) is 0x02 (for example, IPv4) or 0x03 (for example, IPv6) is IP data, in this case, the AN entity does not need to encapsulate an IP data packet sent by the AN entity of the first network into a local IP data packet. Also, on the side of the UE, the UE does not need to encapsulate a service that needs to be sent to the AN entity of the second network into a local IP data packet. The UE may transmit service data to the AN entity of the second network by using an IP data packet.

As an optional implementation manner, the service data transmission unit 74 may further be specifically configured to send a local IP data packet to the AN entity of the second network, where the local IP data packet is a local IP data packet obtained after the UE encapsulates the service data, and an address of the local IP data packet is the local IP address.

In this way, after receiving the local IP data packet, the AN entity of the second network may decapsulate the local IP data packet, and transmit the service data obtained after decapsulation to the AN entity of the first network.

Figure 22:
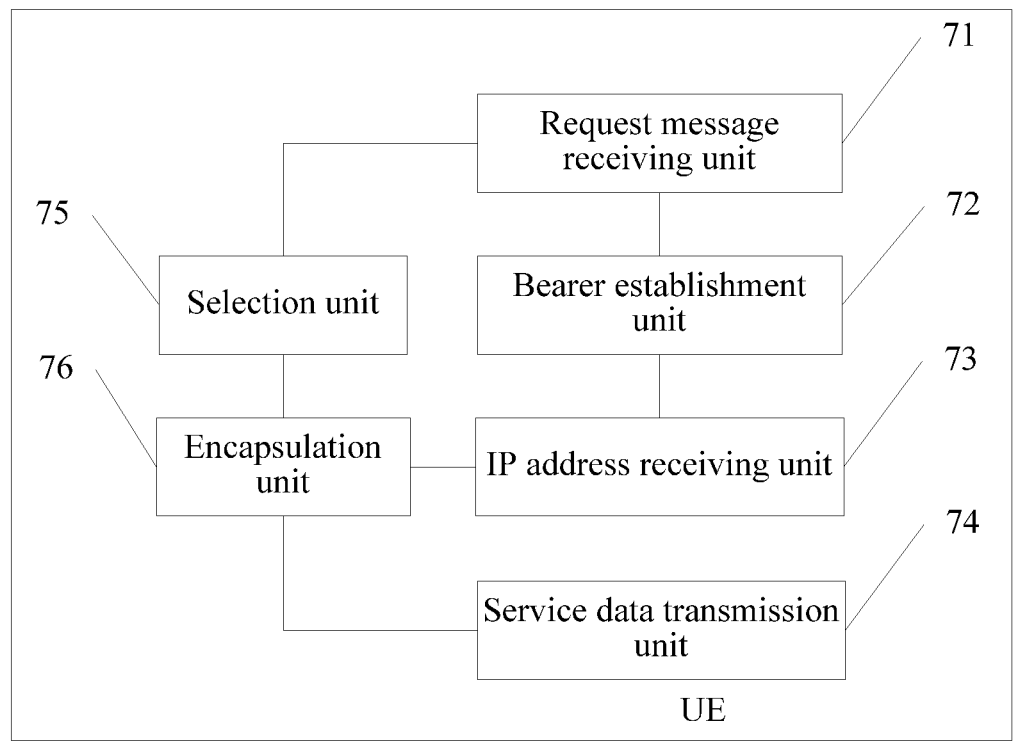
FIG. 22 is a schematic structural diagram of a UE according to an embodiment of the present invention.

Optionally, as shown in FIG. 22, the UE may further include:

a selection unit 75, configured to select data of the service identified by the TFT information; and an encapsulation unit 76, configured to encapsulate the selected service data into the local IP data packet whose address is the local IP address.

Optionally, the encapsulation unit 76 may specifically perform encapsulation in an IP-local IP form.

As an optional implementation manner, a value of Supported High Layer Protocols (for example, Supported Higher Layer Protocols) in a configured attribute of the RLP connection established by the bearer establishment unit 72 is 0x02 (for example, IPv4) or 0x03 (for example, IPv6).

The service data transmission unit 74 may further be specifically configured to send an IP data packet to the AN entity of the second network, where the IP data packet is an IP data packet of data of a service identified by the TFT information.

In this implementation manner, after receiving the IP data packet sent by the UE, the AN entity of the second network may directly send the IP data packet to the AN entity of the first network without needing decapsulation.

As an optional implementation manner, the UE may further include:

an indication message receiving unit (for example, and not shown), configured to receive an indication message sent by the AN entity of the first network, where the indication message is used for specifying that the UE performs inter-system measurement; and a measurement unit (for example, and not shown), configured to perform inter-system measurement, and send a report of the measurement to the AN entity of the first network, so that the AN entity of the first network selects, from cells included in a received measurement result, a cell with the strongest signal as the target cell of the UE.

In this implementation manner, it may be implemented that the target cell selected by the AN entity of the first network for the UE is selected by the AN entity of the first network according to the measurement result of the UE.

As an optional implementation manner, that the AN entity of the first network selects the target cell for the UE may further be that the AN entity of the first network selects, according to signal intensity of the eHRPD network cells and position information of the UE, from cells covering the position information, a cell with the strongest signal as the target cell of the UE.

In the technical solution, on the basis of the foregoing embodiment, it is implemented that a UE receives a local IP data packet sent sent by an AN entity of a first network, where the local IP data packet is service data sent by the AN entity of the first network and received by the AN, and encapsulates the service data into the local IP data packet. In this way, it may be implemented that a UE transmits service data in an LTE network and an eHRPD network at the same time.

Figure 23:
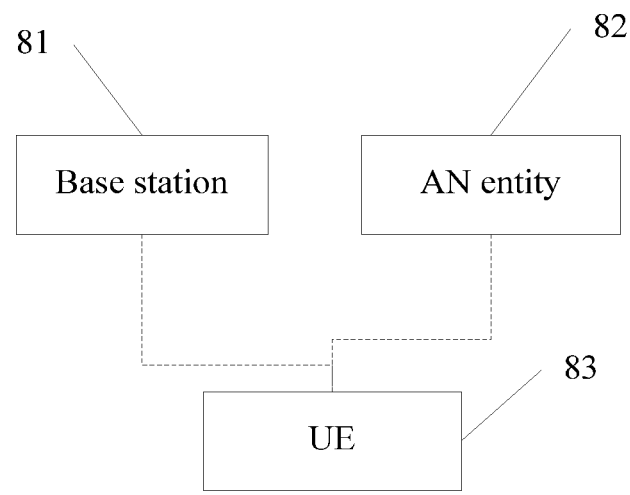
FIG. 23 is a schematic structural diagram of a service data transmission system according to an embodiment of the present invention.

FIG. 23 is a schematic structural diagram of a service data transmission system according to an embodiment of the present invention, and as shown in FIG. 23, the system includes: a first AN entity 81, a second AN entity 82, and a UE 83.

The first AN entity 81 is the AN entity in any implementation manner in the embodiments shown in FIG. 13 to FIG. 15.

The second AN entity 82 is the AN entity in any implementation manner in the embodiments shown in FIG. 16 to FIG. 19.

The UE 83 is the UE in any implementation manner in the embodiments shown in FIG. 20 to FIG. 22.

In the technical solution, a first AN entity sends a first request message to a second AN entity, so as to request an AN entity of a second network to establish a radio bearer for a UE, where the first AN entity sends a second request message to the UE, so as to request the UE to establish the radio bearer with the AN entity of the second network; after the AN entity of the second network has established the radio bearer with the UE, an AN entity of a first network transmits service data to the UE by using the AN entity of the second network. In this way, it may be implemented that a UE transmits service data in an LTE network and an eHRPD network at the same time.

Figure 24:
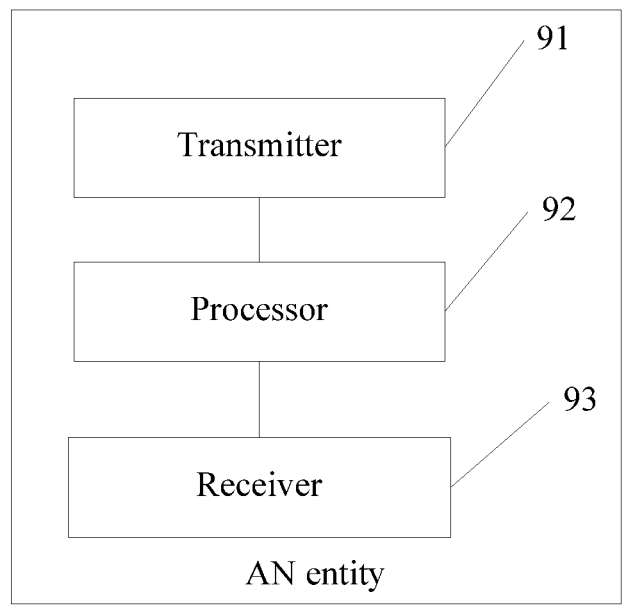
FIG. 24 is a schematic structural diagram of another AN entity according to an embodiment of the present invention.

FIG. 24 is a schematic structural diagram of another AN entity according to an embodiment of the present invention. The AN entity is an AN entity of a first network, and as shown in FIG. 24, includes: a transmitter 91, a processor 92, and a receiver 93.

The processor 92 is configured to execute the following steps:

sending a first request message to an AN entity of a second network corresponding to a target cell in which a UE is located, so as to request the AN entity of the second network to establish a radio bearer for the UE, where the first request message includes an identifier of the UE and a QoS parameter of the radio bearer;

sending a second request message to the UE, so as to request the UE to establish the radio bearer with the AN entity of the second network, where the second request message includes at least one of the following: an identifier of the radio bearer, the QoS parameter of the radio bearer, TFT information, an indication message, and information about the target cell; where the indication message is used for indicating that the radio bearer is to be established in the second network;

after the AN entity of the second network has established the radio bearer with the UE, transmitting service data to the UE by using the AN entity of the second network, where the service data is data corresponding to a service identified by the TFT information.

It should be noted that, the transmitter 91 may specifically be configured to send, to the AN entity of the second network or the UE, information that is processed by the processor 92 and needs to be sent to the AN entity of the second network or the UE, for example, send the first request message to the AN entity of the second network, and for example, send the second request message to the UE.

It should be noted that, the receiver 93 may specifically be configured to receive the information sent by the AN entity of the second network or the UE, and transmit the information that needs to be processed by the processor 92 to the processor 92.

As an optional implementation manner, optionally, the first network is an LTE network, the second network is an eHRPD network, the AN entity of the first network may be a base station in the LTE network, and the target cell is a cell in the eHRPD network.

As an optional implementation manner, the base station may specifically be an eNB, and the AN entity may specifically be an eAN entity.

In the technical solution, an AN entity of a first network sends a first request message to an AN entity of a second network corresponding to a target cell in which a UE is located, so as to request the AN entity of the second network to establish a radio bearer for the UE; the AN entity of the first network sends a second request message to the UE, so as to request the UE to establish the radio bearer with the AN entity of the second network; and after the AN entity of the second network has established the radio bearer with the UE, the AN entity of the first network transmits service data to the UE by using the AN entity of the second network. In this way, it may be implemented that a UE transmits service data in an LTE network and an eHRPD network at the same time.

Figure 25:
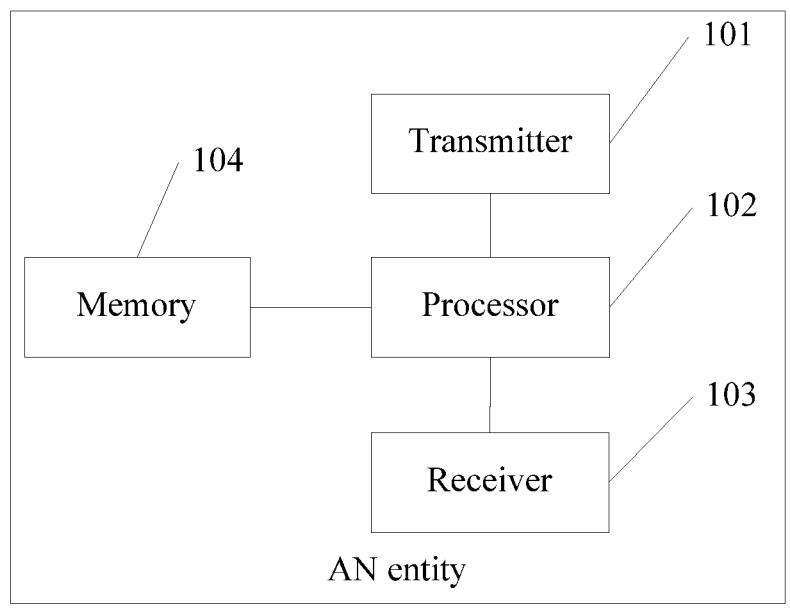
FIG. 25 is a schematic structural diagram of another AN entity according to an embodiment of the present invention.

FIG. 25 is a schematic structural diagram of another AN entity according to an embodiment of the present invention. The AN entity is an AN entity of a first network, and as shown in FIG. 25, includes: a transmitter 101, a processor 102, and a receiver 103.

The processor 102 is configured to execute the following steps:

receiving a bearer update request message (for example, Bearer Setup Request) sent by an MME, where the bearer update request message (for example, Bearer Setup Request) includes an EPS bearer identifier, a QoS parameter of an EPS bearer, and TFT information;

performing mapping according to the QoS parameter of the EPS bearer to obtain a QoS parameter of a radio bearer;

sending a first request message to an AN entity of a second network corresponding to a target cell in which a UE is located, so as to request the AN entity of the second network to establish the radio bearer for the UE, where the first request message includes an identifier of the UE and the QoS parameter of the radio bearer;

sending a second request message to the UE, so as to request the UE to establish the radio bearer with the AN entity of the second network, where the second request message includes at least one of the following: an identifier of the radio bearer, the QoS parameter of the radio bearer, the TFT information, an indication message, and information about the target cell; where the indication message is used for indicating that the radio bearer is to be established in the second network; and after the AN entity of the second network has established the radio bearer with the UE, transmitting service data to the UE by using the AN entity of the second network, where the service data is data corresponding to a service identified by the TFT information.

Optionally, the indication message may specifically be an indicator.

Optionally, the information about target cell may specifically include: carrier information of the target cell, PN information of the target cell, and other information.

As an optional implementation manner, the second request message may further include a mapping relationship between an EPS bearer identifier as well as an EPS bearer and a radio bearer.

Optionally, the EPS bearer identifier and the TFT information included in the second request message may specifically be sent by a mobile management entity (for example, Mobility Management Entity, MME), or may be sent by the MME in the form of a session request message (for example, a Session Management Request). In other words, the AN entity of the first network receives a session request message (for example, Session Management Request) sent by the MME, where the session request message (for example, Session Management Request) message includes the EPS bearer identifier and the TFT information.

Optionally, the AN entity of the first network may further receive a QoS parameter of a bearer corresponding to the EPS bearer identifier sent by an MME, or the QoS parameter of the bearer included in the session request message (for example, Session Management Request); and the AN entity of the first network may perform mapping, after receiving the QoS parameter of the bearer, on the QoS parameter to obtain the QoS parameter of the radio bearer; refer to the following embodiments for details.

As an optional implementation manner, the step of sending a second request message to the UE executed by the processor 102 may specifically include:

sending a Radio Resource Control protocol (for example, Radio Resource Control, RRC) connection reconfiguration request (for example, Connection Reconfiguration Request) to the UE, where the RRC connection reconfiguration request (for example, Connection Reconfiguration Request) carries the second request message. Alternatively, step 202 may specifically be sending a newly defined RRC message to the UE, where the newly defined RRC message carries the second request message.

Optionally, the identifier of the UE may specifically be an IMSI.

As an optional implementation manner, the second network is an eHRPD network, and the step of sending a second request message to the UE executed by the processor 102 may specifically include:

performing mapping according to the QoS parameter of the radio bearer to obtain the QoS parameter of eHRPD; and sending the mapped QoS parameter of eHRPD to the UE, to enable the UE to establish a Radio Link Protocol RLP connection with the AN entity of the second network by using use the mapped QoS parameter of eHRPD.

In this implementation manner, it may be implemented that the radio bearer established by the UE with the AN entity of the second network is an RLP connection.

As an optional implementation manner, the transmitting the service data to the AN entity executed by the processor 102 may specifically include:

transmitting the service data to the AN entity of the second network through an IP flow tunnel corresponding to a preconfigured or dynamically configured interface; where the service data is a data packet after Generic Routing Encapsulation (Generic Routing Encapsulation, GRE) encapsulation is performed, a value of GRE key information of a GRE header in the data packet is first GRE key information, a source User Datagram Protocol (User Datagram Protocol, UDP) port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

Optionally, the step of transmitting a data packet including a service with the AN entity of the second network through an IP flow tunnel of a preconfigured or dynamically configured interface executed by the processor 102 may specifically include:

sending a data packet including the service data to the AN entity of the second network through the IP flow tunnel of the preconfigured or dynamically configured interface, where the data packet is a data packet after GRE encapsulation is performed, the value of GRE key information of the GRE header in the data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network.

After acquiring the data of the service identified by the TFT information, the AN entity of the first network from a GTP tunnel (for example, S1-GTP) may select, by using a mapping relationship between first GRE key information and a first GTP tunnel (for example, S1-GTP) identifier, an IP flow tunnel corresponding to the service data, next, perform GRE encapsulation on the corresponding service, where a value of a GRE key of the GRE header of the encapsulated data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network, and send the encapsulated data packet to the AN entity of the second network through the selected IP flow tunnel.

After acquiring the data packet, the AN entity of the second network decapsulates the data packet to obtain the UDP ports, the IP addresses, the first GRE key information, and the service included in the data packet, next, determines, by using a mapping relationship between first GRE key information and a radio bearer identifier, a radio bearer corresponding to the service, and transmits the service data to the UE by using the determined radio bearer. Certainly, when the service data is transmitted to the UE by using the radio bearer, the service data may be encapsulated into a local IP data packet, and the local IP data packet is transmitted to the UE.

Optionally, the step of transmitting a data packet including a service with the AN entity of the second network through an IP flow tunnel of a preconfigured or dynamically configured interface executed by the processor 102 may specifically include:

receiving, by using the preconfigured or dynamically configured interface, a data packet including the service data sent by the AN entity of the second network through an IP flow tunnel; where the data packet is a data packet after GRE encapsulation is performed, the value of GRE key information of the GRE header in the data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network.

After acquiring, from the radio bearer, the data of the service identified by the TFT information (for example, specifically, IP data packet sent by the UE may be acquired, and the IP data packet is then decapsulated to obtain the service data), the AN entity of the second network may select, by using a mapping relationship between second GRE key information and a radio bearer identifier, an IP flow tunnel corresponding to the service, next, perform GRE encapsulation on the corresponding service data, where a value of a GRE key of the GRE header of the encapsulated data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network, and send the encapsulated data packet to the AN entity of the first network through the selected IP flow tunnel.

After acquiring the data packet, the AN entity of the first network decapsulates the data packet to obtain the UDP ports, the IP addresses, the second GRE key information, and the data corresponding to the service (referred to as the service data for short) included in the data packet, next, determines by using a mapping relationship between second GRE key information and a second GTP tunnel (for example, S1-GTP) identifier, a GTP tunnel corresponding to the service (for example, S1-GTP), and transmits the service data to a service gateway through the determined GTP tunnel (for example, S1-GTP).

Optionally, the preconfigured or dynamically configured interface may specifically be an XX-3 interface, and the specific interface may specifically be an XX-1 interface.

As an optional implementation manner, the step of transmitting service data to the UE by using the AN entity of the second network executed by the processor 102 may specifically include:

sending the service data to the AN entity of the second network, to enable the AN entity of the second network to send the service data to the UE.

In this implementation manner, it may be implemented that the AN entity of the first network sends the service data to the AN entity of the second network.

Optionally, the AN entity of the first network may specifically send the service data to the AN entity of the second network in the form of an IP data packet. That is, the AN entity of the first network sends an IP data packet of the data of the service identified by the TFT information to the AN entity.

In this way, it may be implemented that, the AN entity of the first network transmits the service data to the AN entity of the second network, and the AN entity of the second network may transmit, after receiving the service data, the received service data to the UE, so as to implement that the UE transmits the service data between two networks at the same time.

As an optional implementation manner, after the step of transmitting service data to the UE by using the AN entity of the second network, the processor 102 is further configured to execute the following step:

receiving an IP data packet sent by a service gateway, and selecting, from the IP data packet, the data of the service identified by the TFT information.

In this implementation manner, it may be implemented that the AN entity of the first network sends the service data sent by the service gateway to the AN entity of the second network.

As an optional implementation manner, the step of transmitting service data to the UE by using the AN entity of the second network executed by the processor 102 may specifically include:

receiving the service data sent by the AN entity of the second network, where the service data is obtained after the AN entity of the second network receives a local IP data packet from the UE and decapsulates the local IP data packet, and the local IP data packet is obtained after the UE encapsulates the data of the service identified by the TFT information.

In this implementation manner, it may be implemented that the AN entity of the first network receives the service data sent by the AN entity of the second network, where the service data sent by the AN entity of the second network is a data packet sent by the UE and received by the AN entity of the second network, and decapsulates the data packet to obtain the service data, where the data packet is a data packet obtained after the UE encapsulates the data of the service identified by the TFT information. In this way, it may be implemented that the UE transmits service data between two networks at the same time.

Optionally, after executing the step of receiving the service data sent by the AN entity of the second network, the processor 102 is further configured to execute the following step:

sending the service data to a service gateway.

Optionally, the AN entity of the first network may specifically send, to the service gateway through a GTP tunnel (for example, S1-GTP), a service sent by the AN of the second network and received by the AN entity of the first network.

As an optional implementation manner, before executing the step of sending a first request message to an AN entity of a second network corresponding to a target cell in which a UE is located, the processor 102 is further configured to execute the following step:

selecting the target cell of the UE from the second network (for example, eHRPD network).

Optionally, the step of selecting the target cell of the UE from the second network (for example, eHRPD network) executed by the processor 102 may specifically include:

sending an indication message to the UE, where the indication message is used for specifying that the UE performs inter-system measurement;

receiving a measurement result sent by the UE, where the measurement result is a result of measurement performed by the UE according to the indication message, and the measurement result includes measurement results of multiple cells; and selecting, from the multiple cells, a cell with the strongest signal as the target cell of the UE.

In this implementation manner, it may be implemented that the AN entity of the first network selects a suitable cell for the UE according to the measurement result of the UE.

Optionally, the step of selecting the target cell of the UE from the second network (for example, eHRPD network) executed by the processor 102 may specifically include:

selecting, according to signal intensity of cells of the second network and position information of the UE, from cells covering the position information, a cell with the strongest signal as the target cell of the UE.

In this implementation manner, the AN entity of the first network may select, according to signal intensity of cells of the second network and the position information of the UE, a suitable cell for the UE.

As an optional implementation manner, before executing the step of sending a first request message to an AN entity in which a target cell is located, the processor 102 is further configured to execute the following steps:

sending an indication message to the UE, where the indication message is used for specifying that the UE performs inter-system measurement; and receiving, by the AN entity of the first network, a measurement result sent by the UE, where the measurement result is a result of measurement performed by the UE according to the indication message, and the measurement result includes cell list information.

Optionally, after executing the step of sending a first request message to an AN entity of a second network corresponding to a target cell in which a UE is located, and before executing the step of sending a second request message to the UE, where the second request message is used for requesting establishment of a bearer between the UE and an AN entity of an access network where the target cell is located, the processor 102 is further configured to execute the following step:

receiving the information about target cell sent by the AN entity of the second network, where the target cell is a cell selected by the AN entity from the cell list information.

Optionally, the AN entity of the second network may specifically analyze the measurement result in the cell list information to select a cell most suitable for the UE as the target cell of the UE, or the AN entity of the second network may specifically analyze the measurement result in the cell list information, and select, in combination with idle network resources of cells, a cell most suitable for the UE as the target cell of the UE. For example, a cell with the strongest signal for the UE is selected as the target cell of the UE.

In this implementation manner, it may be implemented that the target cell is selected by an AN entity.

It should be noted that, the transmitter 101 may specifically be configured to send, to the AN entity of the second network or the UE, the information that is processed by the processor 102 and needs to be sent by the AN entity of the second network or the UE, for example, send the first request message to the AN entity of the second network, and for example, send the second request message send to the UE.

It should be noted that, the receiver 101 may specifically be configured to receive the information sent by the AN entity of the second network or the UE, and transmit the information that needs to be processed by the processor 102 to the processor 102.

As an optional implementation manner, the AN entity may further include:

a memory 104, configured to store a program executed by the processor 102.

In the technical solution, on the basis of the foregoing embodiment, a step of receiving a bearer update request message sent by an MME and, according to the bearer update request message, sending a first request message to an AN entity of a second network and sending a second request message to a UE executed by a processor is added, so that it may be implemented that the UE transmits service data in an LTE network and an eHRPD network at the same time.

Figure 26:
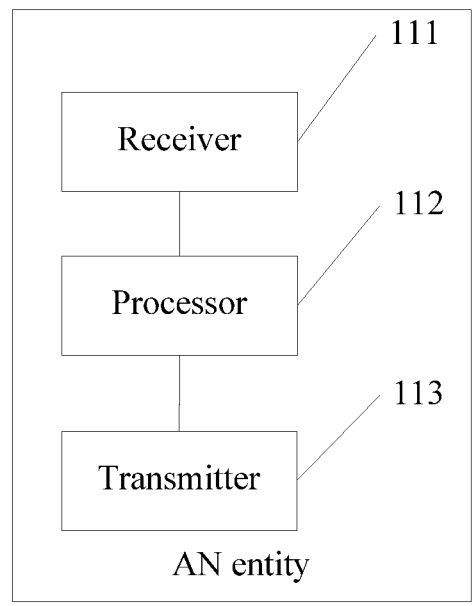
FIG. 26 is a schematic structural diagram of another AN entity according to an embodiment of the present invention.

FIG. 26 is a schematic structural diagram of another AN entity according to an embodiment of the present invention. The AN entity is an AN entity of a second network, and as shown in FIG. 26, includes: a receiver 111, a processor 112, and a memory 113.

The processor 113 is configured to execute the following steps:

receiving a request message sent by an AN entity of a first network a first network, where the request message is used for requesting the AN entity of the second network to establish a radio bearer for a UE, and the request message includes an identifier of the UE and a QoS parameter of the radio bearer;

establishing the radio bearer with the UE according to the QoS parameter of the radio bearer; and transmitting service data between the UE and the AN entity of the first network.

As an optional implementation manner, the first network is an LTE network, the second network is an eHRPD network, the AN entity of the first network may be a base station in the LTE network, and a target cell is a cell in the eHRPD network.

It should be noted that, the transmitter 113 may specifically be configured to send, to the AN entity of the first network or the UE, information that is processed by the processor 112 and needs to be sent to the AN entity of the first network or the UE, for example, send the service to the AN entity of the first network, and for example, send the service to the UE.

It should be noted that, the receiver 111 may specifically be configured to receive the information sent by the AN entity of the first network or the UE, and transmit the information that needs to be processed by the processor 112 to the processor 112.

In the technical solution, an AN entity of a second network receives a request message sent by an AN entity of a first network, where the request message is used for requesting the AN entity of the second network to establish a radio bearer for a UE, and the request message includes an identifier of the UE and a QoS parameter of the radio bearer; the AN entity of the second network establishes the radio bearer with the UE according to the QoS parameter of the radio bearer; and the AN entity of the second network transmits service data between the AN entity of the first network and the UE. In this way, it may be implemented that a UE transmits service data before two networks at the same time.

Figure 27:
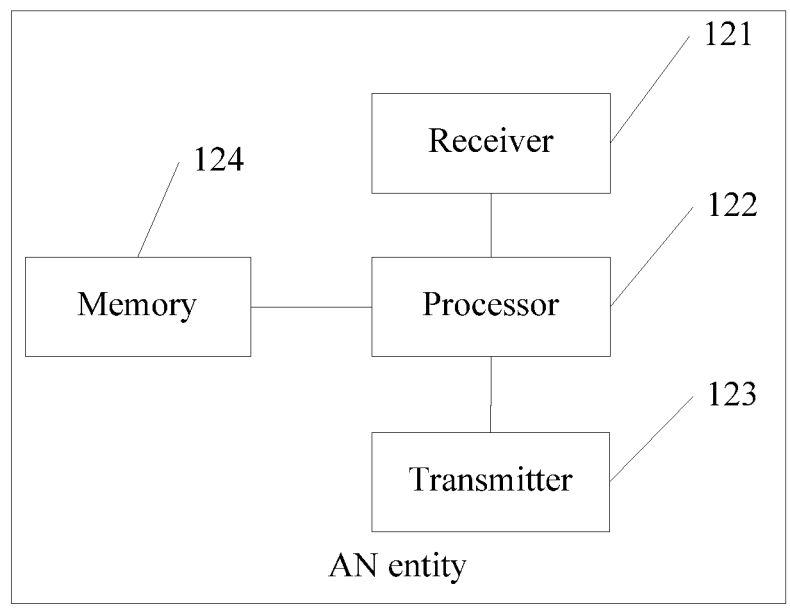
FIG. 27 is a schematic structural diagram of another AN entity according to an embodiment of the present invention.

FIG. 27 is a schematic structural diagram of another AN entity according to an embodiment of the present invention. The AN entity is an AN entity of a second network, and as shown in FIG. 27, includes: a receiver 121, a processor 122, and a transmitter 123.

The processor 122 is configured to execute the following steps:

receiving a request message sent by an AN entity of a first network, where the request message is used for requesting the AN entity of the second network to establish a radio bearer for a UE, and the request message includes an identifier of the UE and a QoS parameter of the radio bearer;

establishing the radio bearer with the UE according to the QoS parameter of the radio bearer; and transmitting service data between the AN entity of the first network and the UE.

As an optional implementation manner, the second network is an eHRPD network, and the step of establishing the radio bearer with the UE according to the QoS parameter of the radio bearer executed by the processor 122 may specifically include:

establishing a Radio Link Protocol RLP connection with the UE, where a QoS parameter of eHRPD used in the process of establishing an RLP connection is obtained through mapping according to the QoS parameter of the radio bearer.

It should be noted that, a process that the AN entity establishes an RLP connection with the UE is common knowledge, which is not elaborated herein. However, in the present invention, a QoS parameter of eHRPD used in a process of establishing an RLP connection between the AN entity and the UE is obtained through mapping from the QoS parameter of the radio bearer, where the QoS parameter of the radio bearer is sent by the AN entity of the second network.

Optionally, in this implementation manner, the used QoS parameter of eHRPD may specifically be the QoS parameter of eHRPD used by the UE, and may specifically be obtained after the UE performs mapping by using the QoS parameter of the radio bearer, where the QoS parameter of the radio bearer is sent by the AN entity of the first network.

As an optional implementation manner, the second network is an eHRPD network, and the step of establishing the radio bearer with the UE according to the QoS parameter of the radio bearer executed by the processor 122 may specifically include:

performing mapping on the QoS parameter of the radio bearer to obtain the QoS parameter of eHRPD; and sending the mapped QoS parameter of eHRPD to the AN entity of the first network, so that the AN entity of the first network sends the mapped QoS parameter of eHRPD to the UE, to enable the UE to establish an RLP connection with the AN entity of the second network by using the mapped QoS parameter of eHRPD.

In this implementation manner, the QoS parameter of eHRPD used to establish an RLP connection may specifically be obtained after the AN entity of the second network performs mapping on the received QoS parameter of the radio bearer, where the QoS parameter of the radio bearer is sent by the AN entity of the first network.

As an optional implementation manner, when the QoS parameter of the radio bearer is a BE type, SO=59 in a main service connection (for example, Main Service connection) in the established RLP connection, and a corresponding reservation label (for example, Reservation Label) is 0xFF. When the QoS parameter of the radio bearer is an RTP type, SO=67 in a main service connection (for example, Main Service connection) in the RLP connection established in step 602, and a corresponding reservation label (for example, Reservation Label) is 0xXX.

As an optional implementation manner, the local IP address sent to the UE may specifically be a local IP address allocated by the AN entity of the second network to the UE.

As an optional implementation manner, the local IP address sent to the UE may further specifically be a local IP address sent by another device and received by the AN entity of the second network. That is, the local IP address sent to the UE is allocated by the another device to the UE.

As an optional implementation manner, the step of transmitting service data between the AN entity of the first network and the UE executed by the processor 122 may specifically include:

receiving the service data sent by the AN entity of the first network, and encapsulating the received service data into a local IP data packet, where an address of the local IP data packet is the local IP address; and sending the encapsulated local IP data packet to the UE.

As an optional implementation manner, a value of Supported High Layer Protocols (for example, Supported Higher Layer Protocols) in a configured attribute of the RLP connection established in the step is 0x02 (for example, IPv4) or 0x03 (for example, IPv6).

As an optional implementation manner, the step of transmitting service data between the AN entity of the first network and the UE executed by the processor 122 may specifically include:

receiving the service data sent by the AN entity of the first network; or, receiving an IP data packet of a service sent by the AN entity of the first network; and sending the received service data to the UE, or, sending the IP data packet of the received service to the UE.

As a data packet carried by an RLP connection bearer whose value of Supported High Layer Protocols (for example, Supported Higher Layer Protocols) is 0x02 (for example, IPv4) or 0x03 (for example, IPv6) is IP data, in this case, the AN entity does not need to encapsulate an IP data packet sent by the AN entity of the first network into a local IP data packet. Also, on the side of the UE, the UE does not need to encapsulate the service that needs to be sent to the AN entity into the local IP data packet. The UE may transmit the service data to the AN entity by using IP data.

As an optional implementation manner, the step of transmitting service data between the AN entity of the first network and the UE executed by the processor 122 may specifically include:

receiving a local IP address data packet sent by the UE, and decapsulating the received local IP data packet to obtain the service data, where an address corresponding to the local IP data packet is the local IP address; and sending the service data obtained after decapsulation to the AN entity of the first network.

In this implementation manner, the AN entity of the second network may transmit the service data sent by the UE to the AN entity of the first network.

As an optional implementation manner, the step of transmitting service data between the AN entity of the first network and the UE executed by the processor 122 may specifically include:

transmitting the service data to the AN entity of the first network through an IP flow tunnel of a preset or dynamically set interface, where the service data is a data packet after GRE encapsulation is performed, a value of GRE key information of a GRE header in the data packet is first GRE key information, a source UDP port number and a source IP address in the data packet are respectively a UDP port number and an IP address corresponding to the AN entity of the first network, and a target UDP port number and a target IP address in the data packet are respectively a UDP port number and an IP address corresponding to the AN entity of the second network; or, a value of GRE key information of a GRE header in the data packet is second GRE key information, a source UDP port number and a source IP address in the data packet are respectively a UDP port number and an IP address corresponding to the AN entity of the second network, and a target UDP port number and a target IP address in the data packet are respectively a UDP port number and an IP address corresponding to the AN entity of the first network; and the first GRE key information represents that the data packet is sent by the AN entity of the first network to the AN entity of the second network, and the second GRE key information represents that the data packet is sent by the AN entity of the second network to the AN entity of the first network; and transmitting the service data to the UE.

Optionally, the step of transmitting the service data to the AN entity of the first network through an IP flow tunnel of a preset or dynamically set interface executed by the processor 122 may specifically include sending, through the IP flow tunnel of the preconfigured or dynamically configured interface, a data packet including the service data to the AN entity of the first network; where the data packet is a data packet after GRE encapsulation is performed, the value of GRE key information of the GRE header in the data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network.

After acquiring, from the radio bearer, data of a service identified by TFT information (for example, specifically, IP data packet sent by the UE may be acquired, and the IP data packet is then decapsulated to obtain the service data), the AN entity of the second network may select, by using a mapping relationship between second GRE key information and a radio bearer identifier, an IP flow tunnel corresponding to the service, next, perform GRE encapsulation on the corresponding service data, where a value of a GRE key of the GRE header of the encapsulated data packet is the second GRE key information, a source UDP port number and a source IP address in the data packet are respectively a UDP port number and an IP address of the AN entity of the second network, and a target UDP port number and a target IP address in the data packet are respectively a UDP port number and an IP address of the AN entity of the first network, and send the encapsulated data packet to the AN entity of the first network through the selected IP flow tunnel.

After acquiring the data packet, the AN entity of the first network decapsulates the data packet to obtain the UDP ports, the IP addresses, the second GRE key information, and the data corresponding to the service (referred to as service data for short) included in the data packet, next, determines, by using a mapping relationship between second GRE key information and a second GTP tunnel (for example, S1-GTP) identifier, a GTP tunnel corresponding to the service (for example, S1-GTP), and transmits the service data to a service gateway through the determined GTP tunnel (for example, S1-GTP).

Optionally, the step of transmitting the service data to the AN entity of the first network through an IP flow tunnel of a preset or dynamically set interface executed by the processor 122 may specifically include:

receiving, by using the preset interface, a data packet including the service data sent by the AN entity of the first network through the IP flow tunnel; where the data packet is a data packet after GRE encapsulation is performed, the value of GRE key information of the GRE header in the data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network.

After acquiring, from a GTP tunnel (for example, S1-GTP), data of a service identified by TFT information, the AN entity of the first network may select, by using a mapping relationship between first GRE key information and a first GTP tunnel (for example, S1-GTP) identifier, an IP flow tunnel corresponding to the service data, next, perform GRE encapsulation on the corresponding service, where a value of a GRE key of the GRE header of the encapsulated data packet is the first GRE key information, a source UDP port number and a source IP address in the data packet are respectively a UDP port number and an IP address of the AN entity of the first network, and a target UDP port number and a target IP address in the data packet are respectively a UDP port number and an IP address of the AN entity of the second network, and send the encapsulated data packet to the AN entity of the second network through the selected IP flow tunnel.

After acquiring the data packet, the AN entity of the second network decapsulates the data packet to obtain the UDP ports, the IP addresses, the first GRE key information, and the service data included in the data packet, next, determines, by using a mapping relationship between first GRE key information and a radio bearer identifier, a radio bearer corresponding to the service, and transmits the service data to the UE by using the determined radio bearer. Certainly, when the service data is transmitted to the UE by using the radio bearer, the service data may be encapsulated into a local IP data packet, and the local IP data packet is transmitted to the UE.

As an optional implementation manner, the request message may further include cell list information. After executing the step of receiving a request message sent by an AN entity of a first network, and before executing the step of establishing the radio bearer with the UE, the processor 122 is further configured to execute the following steps:

selecting a target cell of the UE from the cell list information; and sending information about the target cell to the AN entity of the first network.

Optionally, the AN entity of the second network may specifically analyze the measurement result in the cell list information to select a cell most suitable for the UE as the target cell of the UE, or the AN entity of the second network may specifically analyze the measurement result in the cell list information, and select, in combination with idle network resources of cells, a cell most suitable for the UE as the target cell of the UE. For example, a cell with the strongest signal for the UE is selected as the target cell of the UE.

In this implementation manner, it may be implemented that the target cell is selected by the AN entity of the second network.

It should be noted that, the transmitter 123 may specifically be configured to send, to the AN entity of the first network or the UE, information that is processed by the processor 122 and needs to be sent by the AN entity of the first network or the UE, for example, send the service to the AN entity of the first network, and for example, send the service to the UE.

It should be noted that, the receiver 121 may specifically be configured to receive the information sent by the AN entity of the first network or the UE, and transmit the information that needs to be processed by the processor 122 to the processor 122.

Optionally, the AN entity may further include:

a memory 124, configured to store a program executed by the processor 122.

In the technical solution, on the basis of the foregoing embodiment, it may be implemented that an AN entity sends local IP to a UE, and at the same time, the AN entity transmits the local IP data packet with the UE. Therefore, it is implemented that a UE transmits service data before two networks at the same time.

Figure 28:
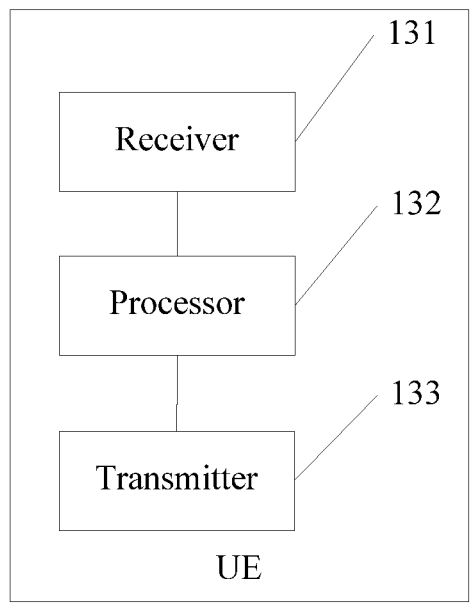
FIG. 28 is a schematic structural diagram of another UE according to an embodiment of the present invention.

FIG. 28 is a schematic structural diagram of another UE according to an embodiment of the present invention, and as shown in FIG. 28, the UE includes a receiver 131, a processor 132, and a transmitter 133.

The processor 132 is configured to execute the following steps:

receiving a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network;

establishing the radio bearer with the AN entity of the second network; and transmitting service data to the AN entity of the first network by using the AN entity of the second network, where the service data is data corresponding to a service identified by the TFT information.

As an optional implementation manner, the first network is an LTE network, the second network is an eHRPD network, the AN entity of the first network may be a base station in the LTE network, and the target cell is a cell in the eHRPD network.

It should be noted that, the transmitter 133 is configured to send, to the AN entity of the first network or the AN entity of the second network, information that is processed by the processor 132 and needs to be sent to the AN entity of the first network or the AN entity of the second network, for example, send the service to the AN entity of the second network.

It should be noted that, the receiver 131 may specifically be configured to receive the information sent by the AN entity of the first network or the AN entity of the second network, and transmit the information that needs to be processed by the processor 132 to the processor 132, for example, receive the request message sent by the AN entity of the first network.

In the technical solution, a UE receives a request message sent by an AN entity of a first network, where the request message is used for requesting the UE to establish a radio bearer with an AN entity of a second network corresponding to a target cell, the UE establishes the radio bearer with the AN entity of the second network, and the UE transmits service data to the AN entity of the first network by using the AN entity of the second network. In this way, it may be implemented that a UE transmits service data in an LTE network and an eHRPD network at the same time.

Figure 29:
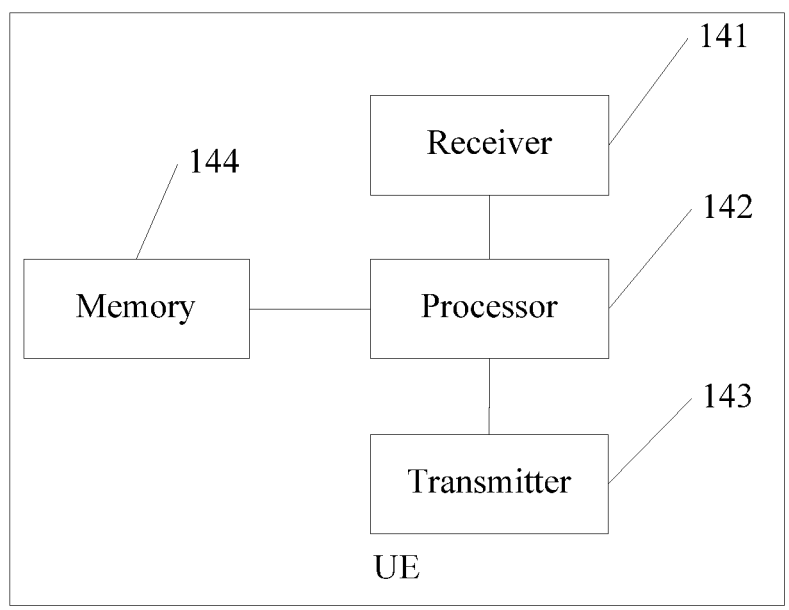
FIG. 29 is a schematic structural diagram of another UE according to an embodiment of the present invention.

FIG. 29 is a schematic structural diagram of another UE according to an embodiment of the present invention, and as shown in FIG. 29, the UE includes: a receiver 141, a processor 142, and a transmitter 143.

The processor 142 is configured to execute the following step:

receiving a request message sent by an AN entity of a first network, where the request message is used for requesting the UE to establish a radio bearer with an AN entity of a second network corresponding to a target cell, and the request message includes at least one of the following: an identifier of the radio bearer, a QoS parameter of the radio bearer, TFT information, an indication message, and information about the target cell; where the indication message is used for indicating that the radio bearer is to be established in the second network;

establishing the radio bearer with the AN entity of the second network;

receiving a local IP address sent by the AN entity of the second network; and transmitting service data to the AN entity of the first network by using the AN entity of the second network, where the service data is data corresponding to a service identified by the TFT information.

Optionally, the indication message may specifically be an indicator.

Optionally, the information about target cell may specifically include: carrier information of the target cell, PN information of the target cell, and other information.

As an optional implementation manner, the request message may further include a mapping relationship between an EPS bearer identifier as well as an EPS bearer and a radio bearer.

In this implementation manner, the UE receives the mapping relationship between an EPS bearer identifier as well as an EPS bearer and a radio bearer sent by the AN entity of the first network, so that the UE may learn of a correspondence between a radio bearer and an EPS bearer, where the mapping relationship between an EPS bearer and a radio bearer is specifically a one-to-one mapping relationship. After acquiring the EPS bearer identification, the UE may acquire, by using the EPS bearer identifier, a service corresponding to the radio bearer, so as to transmit or process data of the service more desirably.

As an optional implementation manner, the second network is an eHRPD network, and the step of establishing the radio bearer with the AN entity of the second network executed by the processor 142 may specifically include:

establishing a Radio Link Protocol RLP connection with the AN entity of the second network, where a QoS parameter of eHRPD used in the process of establishing an RLP connection is obtained through mapping according to the QoS parameter of the radio bearer.

In this implementation manner, after selecting the step of receiving a request message sent by an AN entity of a first network, where the request message is used for requesting the UE to establish a radio bearer with an AN entity of a second network corresponding to a target cell, and before executing the specifically of establishing the radio bearer with the AN entity of the second network, the processor 142 is further configured to perform mapping according to the QoS parameter of the radio bearer to obtain the QoS parameter of eHRPD.

In this implementation manner, the QoS parameter of eHRPD used by the UE is obtained through mapping performed by the UE.

As an optional implementation manner, after selecting the step of receiving a request message sent by an AN entity of a first network, where the request message is used for requesting the UE to establish a radio bearer with an AN entity of a second network corresponding to a target cell, and before executing the specifically of establishing the radio bearer with the AN entity of the second network, the processor 142 is further configured to receive the QoS parameter of eHRPD sent by the AN entity of the first network, where the QoS parameter of eHRPD is received by the AN entity of the first network from the AN entity of the second network, and the QoS parameter of eHRPD is obtained through mapping performed by the AN entity of the second network according to the QoS parameter of the radio bearer.

In this implementation manner, the QoS parameter of eHRPD used by the UE is obtained through mapping performed by the AN of the second network.

As an optional implementation manner, the step of transmitting service data to the AN entity of the first network by using the AN entity of the second network executed by the processor 142 may specifically include:

receiving a local IP data packet sent by the AN entity of the second network, where the local IP data packet is a local IP data packet obtained after the AN of the second network encapsulates the service data, the service data is received from the AN entity of the first network, and an address of the local IP data packet is the local IP address.

After receiving the service data sent by the AN entity of the first network, the AN entity of the second network may perform local IP encapsulation on the service, and encapsulate the service into a local IP data packet, where an address of the encapsulated local IP data packet is a local IP address allocated to the UE, and the AN entity of the second network sends the encapsulated local IP data packet to the UE.

Optionally, after receiving the local IP data packet, the UE may decapsulate the local IP data packet, that is, remove a local IP header.

As an optional implementation manner, a value of Supported High Layer Protocols (for example, Supported Higher Layer Protocols) in a configured attribute of an established RLP connection is 0x02 (for example, IPv4) or 0x03 (for example, IPv6); and the step of transmitting service data to the AN entity of the first network by using the AN entity of the second network executed by the processor 142 may specifically include:

receiving an IP data packet sent by the AN entity of the second network, where the IP data packet is an IP data packet sent by the AN entity of the first network and received by the AN, and the IP data packet is an IP data packet of a service identified by the TFT information.

As an optional implementation manner, the step of transmitting service data to the AN entity of the first network by using the AN entity of the second network executed by the processor 142 may specifically include:

sending the local IP data packet to the AN entity of the second network, where the local IP data packet is a local IP data packet obtained after the UE encapsulates the service data, and an address of the local IP data packet is the local IP address.

In this way, after receiving the local IP data packet, the AN entity of the second network may decapsulate the local IP data packet, and transmit the service data obtained after decapsulation to the AN entity of the first network.

As an optional implementation manner, after executing the step of receiving a local IP address sent by the AN entity of the second network, and before executing the step of transmitting service data to the AN entity of the first network by using the AN entity of the second network, the processor 142 is further configured to execute the following steps:

selecting the data of the service identified by the TFT information; and encapsulating the selected service data into the local IP data packet whose address is the local IP address.

Optionally, encapsulation in an IP-local IP form may specifically be performed in the step.

As an optional implementation manner, the value of Supported High Layer Protocols (for example, Supported Higher Layer Protocols) in a configured attribute of an established RLP connection is 0x02 (for example, IPv4) or 0x03 (for example, IPv6); and the step of transmitting service data to the AN entity of the first network by using the AN entity of the second network executed by the processor 142 may specifically include:

sending an IP data packet to the AN entity of the second network, where the IP data packet is an IP data packet of the data of the service identified by the TFT information.

In this implementation manner, after receiving the IP data packet sent by the UE, the AN entity of the second network may directly send the IP data packet to the AN entity of the first network without needing decapsulation.

As an optional implementation manner, before executing the step of receiving a request message sent by an AN entity of a first network, where the request message is used for requesting the UE to establish a radio bearer with an AN entity of a second network corresponding to a target cell, the processor 142 is further configured to execute the following steps:

receiving an indication message sent by the AN entity of the first network, where the indication message is used for specifying that the UE performs inter-system measurement; and performing inter-system measurement, and sending a report of the measurement to the AN entity of the first network, so that the AN entity of the first network selects, from cells included in a received measurement result, a cell with the strongest signal as the target cell of the UE.

In this implementation manner, it may be implemented that the target cell selected by the AN entity of the first network for the UE is selected by the AN entity of the first network according to the measurement result of the UE.

As an optional implementation manner, that the AN entity of the first network selects the target cell for the UE may further be that the AN entity of the first network selects, according to signal intensity of the eHRPD network cells and position information of the UE, from cells covering the position information, a cell with the strongest signal as the target cell of the UE.

In the technical solution, on the basis of the foregoing embodiment, it is implemented that a UE may transmit a local IP data packet with an AN entity of a second network, where the local IP data packet includes service data transmitted between the AN of the second network and an AN entity of a first network. In this way, it may be implemented that a UE transmits service data in an LTE network and an eHRPD network at the same time.

Figure 30:
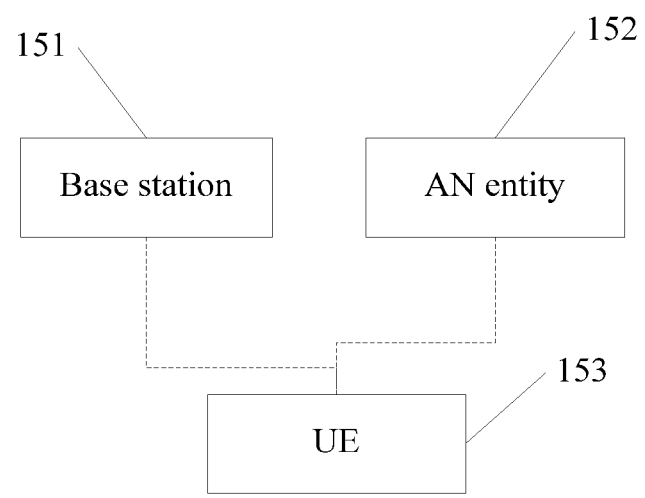
FIG. 30 is a schematic structural diagram of another service data transmission system according to an embodiment of the present invention.

FIG. 30 is a schematic structural diagram of another service data transmission system according to an embodiment of the present invention. As shown in FIG. 30, the system includes: a first AN entity 151, a second AN entity 152, and a UE 153.

The first AN entity 151 is the AN entity in any implementation manner in the embodiment shown in FIG. 24 or FIG. 25.

The second AN entity 152 is the AN entity in any implementation manner in the embodiment shown in FIG. 26 or FIG. 27.

The UE 153 is the UE in any implementation manner in the embodiment shown in FIG. 28 or FIG. 29.

In the technical solution, a first AN entity sends a first request message to a second AN entity, so as to request an AN entity of a second network to establish a radio bearer for a UE, and the first AN entity sends a second request message to the UE, so as to request the UE to establish the radio bearer with the AN entity of the second network; and after the AN entity of the second network has established the radio bearer with the UE, an AN entity of a first network transmits service data to the UE by using the AN entity of the second network. In this way, it may be implemented that a UE transmits service data in an LTE network and an eHRPD network at the same time.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (such as Read-Only Memory, ROM), or a random access memory (such as the RAN entity Random Access Memory, RAM for short).

Only exemplary embodiments of the present invention are disclosed above, and certainly cannot be used to limit the scope of the present invention. Therefore, equivalent changes made according to the claims of the present invention shall still fall within the scope of the present invention.

What is claimed is:

1. A service data transmission method, comprising:
   receiving, by a user terminal, a request message sent by an access network (AN) entity of a first network, wherein the request message is used to request the user terminal to establish a radio bearer with an AN entity of a second network corresponding to a target cell and wherein the request message comprises at least one of the following: an identifier of the radio bearer, a quality of service parameter of the radio bearer, traffic flow template information, an indication message, and information about the target cell, the indication message being used for indicating that the radio bearer is to be established in the second network;
   establishing, by the user terminal, the radio bearer with the AN entity of the second network; and
   transmitting, by the user terminal, service data to the AN entity of the first network by using the AN entity of the second network, wherein the service data is data corresponding to a service identified by the traffic flow template information.

2. The method according to claim 1, wherein the second network is an evolved high rate packet data (eHRPD) network and wherein establishing the radio bearer with the AN entity of the second network comprises establishing, by the user terminal, a Radio Link Protocol (RLP) connection with the AN entity of the second network, wherein a quality of service parameter of the eHRPD used in establishing the RLP connection is obtained through mapping according to the quality of service parameter of the radio bearer.

3. The method according to claim 2, wherein after receiving the request message sent by the AN entity of the first network and before establishing the radio bearer with the AN entity of the second network, the method further comprises:
   receiving, by the user terminal, the quality of service parameter of the eHRPD sent by the AN entity of the first network, wherein the quality of service parameter of the eHRPD is received by the AN entity of the first network from the AN entity of the second network, and the quality of service parameter of the eHRPD is obtained through mapping by the AN entity of the second network according to the quality of service parameter of the radio bearer.

4. The method according to claim 1, wherein transmitting the service data to the AN entity of the first network by using the AN entity of the second network comprises:
   receiving, by the user terminal, a local IP address sent by the AN entity of the second network; and
   sending, by the user terminal, a local IP data packet to the AN entity of the second network, wherein the local IP data packet is a local IP data packet obtained after the user terminal encapsulates the service data and wherein the local IP data packet is addressed to the local IP address.

5. The method according to claim 1, wherein transmitting the service data to the AN entity of the first network by using the AN entity of the second network comprises:

receiving, by the user terminal, a local IP address sent by the AN entity of the second network; and receiving, by the user terminal, a local IP data packet sent by the AN entity of the second network, wherein the local IP data packet is a local IP data packet obtained after the AN of the second network encapsulates the service data, wherein the service data is received from the AN entity of the first network, and wherein the local IP data packet is addressed to the local IP address.

6. An access node (AN) entity comprising:

a processor; and a non-transitory computer-readable storage medium storing a program to be executed by the processor, the program including instructions for:

sending a first request message to an AN entity of a second network corresponding to a target cell in which a user terminal is to be located, so as to request the AN entity of the second network to establish a radio bearer for the user terminal, wherein the first request message comprises an identifier of the user terminal and a quality of service parameter of the radio bearer;

sending a second request message to the user terminal, so as to request the user terminal to establish the radio bearer with the AN entity of the second network, wherein the second request message comprises at least one of the following: an identifier of the radio bearer, the quality of service parameter of the radio bearer, traffic flow template information, an indication message, and information about the target cell, wherein the indication message is used for indicating that the radio bearer is to be established in the second network; and after the AN entity of the second network has established the radio bearer with the user terminal, transmitting service data to the user terminal by using the AN entity of the second network, wherein the service data is data corresponding to a service identified by the traffic flow template information.

7. The AN entity according to claim 6, further comprising a receiver, wherein the receiver is configured to receive the service data sent by the AN entity of the second network, wherein the service data is obtained after the AN entity of the second network receives a local IP data packet from the user terminal and decapsulates the local IP data packet, and the local IP data packet is obtained after the user terminal encapsulates the data of the service identified by the traffic flow template information.

8. The AN entity according to claim 6, wherein the AN entity is an AN entity of a first network and wherein the first request message further comprises information about an IP flow tunnel corresponding to an interface of the AN entity of the first network, and the processor is further configured to transmit the service data to the AN entity of the second network through an IP flow tunnel corresponding to a preconfigured or dynamically configured interface, wherein the service data is a data packet after Generic Routing Encapsulation (GRE) encapsulation is performed, a value of GRE key information of a GRE header in the data packet is first GRE key information, a source User Datagram Protocol (UDP) port number and a source IP address in the data packet correspond to the AN entity of the first network, and a target UDP port number and a target IP address in the data packet correspond to the AN entity of the second network; or, the value of the GRE key information of the GRE header in the data packet is second GRE key information, the source UDP port number and the source IP address in the data packet correspond to the AN entity of the second network, and the target UDP port number and the target IP address in the data packet correspond to the AN entity of the first network; and the first GRE key information represents that the data packet is sent by the AN entity of the first network to the AN entity of the second network, and the second GRE key information represents that the data packet is sent by the AN entity of the second network to the AN entity of the first network.

9. The AN entity according to claim 6, wherein the program includes further instructions for:

sending the indication message to the user terminal, wherein the indication message is used for instructing the user terminal to perform inter-system measurement;

receiving a measurement result sent by the user terminal, wherein the measurement result is the result of measurement performed by the user terminal according to the indication message, and the measurement result comprises results of measurement performed on multiple cells; and selecting, from the multiple cells, a cell with the strongest signal as the target cell of the user terminal.

10. The AN entity according to claim 6, wherein the first request message further comprises cell list information and wherein the program includes further instructions for:

sending the indication message to the user terminal, wherein the indication message is used for instructing the user terminal to perform inter-system measurement; and receiving a measurement result sent by the user terminal, wherein the measurement result is the result of measurement performed by the user terminal according to the indication message, and the measurement result comprises the cell list information; and receiving the information about the target cell sent by the AN entity of the second network, wherein the target cell is a cell selected by the AN entity of the second network from the cell list information.

11. The AN entity according to claim 6, wherein the program includes further instructions for sending the service data to the AN entity of the second network, so that the AN entity of the second network sends the service data to the user terminal.

12. The AN entity according to claim 6, wherein the program includes further instructions for:

performing mapping according to the quality of service parameter of the radio bearer to obtain a quality of service parameter of an evolved high rate packet data (eHRPD); and sending the mapped quality of service parameter of the eHRPD to the user terminal, so that the user terminal establishes a Radio Link Protocol (RLP) connection with the AN entity of the second network by using the mapped quality of service parameter of the eHRPD.

13. A user terminal, comprising:

a processor; and a non-transitory computer-readable storage medium storing a program to be executed by the processor, the program including instructions for:

receiving a request message sent by an access network (AN) entity of a first network, wherein the request message is used for requesting the user terminal to establish a radio bearer with an AN entity of a second network corresponding to a target cell, and wherein the request message comprises at least one of the following: an identifier of the radio bearer, a quality of service parameter of the radio bearer, traffic flow template information, an indication message, and information about the target cell, the indication message being used for indicating that the radio bearer is to be established in the second network;

establishing the radio bearer with the AN entity of the second network; and transmitting service data to the AN entity of the first network by using the AN entity of the second network, wherein the service data is data corresponding to a service identified by the traffic flow template information.

14. The user terminal according to claim 13, wherein the program includes further instructions for establishing a Radio Link Protocol (RLP) connection with the AN entity of the second network, wherein a quality of service parameter of the second network used in establishing an RLP connection is obtained through mapping according to the quality of service parameter of the radio bearer, wherein the second network is an evolved high rate packet data (eHRPD) network.

15. The user terminal according to claim 13, wherein the program includes further instructions for receiving a quality of service parameter of an evolved high rate packet data (eHRPD) network sent by the AN entity of the first network, wherein the quality of service parameter of the eHRPD is received by the AN entity of the first network from the AN entity of the second network, and the quality of service parameter of the eHRPD is obtained through mapping by the AN entity of the second network according to the quality of service parameter of the radio bearer.

16. The user terminal according to claim 13, wherein the program includes further instructions for performing mapping according to the quality of service parameter of the radio bearer to obtain a quality of service parameter of an evolved high rate packet data (eHRPD) network.

17. The user terminal according to claim 13, wherein the program includes further instructions for receiving a local IP address sent by the AN entity.

18. The user terminal according to claim 17, wherein the program includes further instructions for sending a local IP data packet to the AN entity of the second network, wherein the local IP data packet is a local IP data packet obtained after the user terminal encapsulates the service data, and an address of the local IP data packet is the local IP address.

19. The user terminal according to claim 18, wherein the program includes further instructions for selecting, according to the service identified by the traffic flow template information, the data corresponding to the service and encapsulating the selected data into the local IP data packet whose address is the local IP address.

20. The user terminal according to claim 17, wherein the program includes further instructions for receiving a local IP data packet sent by the AN entity of the second network, wherein the local IP data packet is a local IP data packet obtained after the AN of the second network encapsulates the service data, the service data is received from the AN entity of the first network, and an address of the local IP data packet is the local IP address.

* * * * *